United States Patent
Meaney et al.

(10) Patent No.: US 8,418,082 B2
(45) Date of Patent: Apr. 9, 2013

(54) CROSS-TRACK EDIT INDICATORS AND EDIT SELECTIONS

(75) Inventors: Brian Meaney, San Jose, CA (US); Colleen Pendergast, Livermore, CA (US); Charles Lyons, San Francisco, CA (US); Douglas DeVore, Campbell, CA (US)

(73) Assignee: Apple Inc., Cupertino, CA (US)

( * ) Notice: Subject to any disclaimer, the term of this patent is extended or adjusted under 35 U.S.C. 154(b) by 719 days.

(21) Appl. No.: 12/434,617

(22) Filed: May 1, 2009

(65) Prior Publication Data
US 2010/0281379 A1  Nov. 4, 2010

(51) Int. Cl.
*G06F 3/048* (2006.01)
*G06F 3/01* (2006.01)

(52) U.S. Cl. ........ 715/856; 715/723; 715/763; 715/731; 715/862; 715/830; 386/278; 386/281

(58) Field of Classification Search .................. 715/723, 715/763, 202, 203, 204, 208, 530, 500, 731; 715/862, 830; 386/278, 281; 345/473
See application file for complete search history.

(56) References Cited

U.S. PATENT DOCUMENTS

| | | | |
|---|---|---|---|
| 5,471,578 A | 11/1995 | Moran et al. | |
| 5,519,828 A | 5/1996 | Rayner | |
| 5,550,563 A | 8/1996 | Matheny et al. | |
| 5,581,670 A | 12/1996 | Bier et al. | |
| 5,664,216 A | 9/1997 | Blumenau | |
| 5,682,326 A | 10/1997 | Klingler et al. | |
| 5,781,188 A | 7/1998 | Amiot et al. | |
| 5,861,886 A | 1/1999 | Moran et al. | |
| 5,892,506 A | 4/1999 | Hermanson | |
| 5,933,141 A * | 8/1999 | Smith | 725/39 |
| 5,969,708 A * | 10/1999 | Walls | 715/857 |
| 6,134,380 A * | 10/2000 | Kushizaki | 386/281 |
| 6,154,600 A | 11/2000 | Newman et al. | |
| 6,154,601 A | 11/2000 | Yaegashi et al. | |
| 6,243,096 B1 | 6/2001 | Takanashi | |
| 6,324,335 B1 | 11/2001 | Kanda | |
| 6,404,978 B1 * | 6/2002 | Abe | 386/281 |
| 6,414,686 B1 | 7/2002 | Protheroe et al. | |

(Continued)

FOREIGN PATENT DOCUMENTS

| | | |
|---|---|---|
| WO | WO 2007/120694 | 10/2007 |
| WO | WO 2009/128227 | 10/2009 |
| WO | WO 2010/106586 | 9/2010 |

OTHER PUBLICATIONS

Chisan, James, et al., "Video Bench—Final Report: SEng 480a/CSc 586a," Apr. 11, 2003, University of Victoria.

(Continued)

*Primary Examiner* — Nicholas Augustine
*Assistant Examiner* — Toan Vu
(74) *Attorney, Agent, or Firm* — Adeli & Tollen LLP

(57) ABSTRACT

A method of defining a media editing application for creating media presentations. The method provides a composite display area for displaying a set of clip shapes that represent media clips. It also provides a consolidated editing tool for (1) identifying clip-shape edit points that are near a cursor's location as the cursor moves from track to track in the composite display area and (2) collectively selecting the identified clip-shape edit points along multiple track in order to receive an edit operation to collectively perform on said the clip-shapes of the identified edit points.

18 Claims, 41 Drawing Sheets

U.S. PATENT DOCUMENTS

| | | | |
|---|---|---|---|
| 6,477,315 B1* | 11/2002 | Ohomori | 386/281 |
| 6,546,188 B1 | 4/2003 | Ishii et al. | |
| 6,658,194 B1* | 12/2003 | Omori | 386/284 |
| 7,062,713 B2* | 6/2006 | Schriever et al. | 715/723 |
| 7,313,755 B2 | 12/2007 | Rahman et al. | |
| 7,325,199 B1 | 1/2008 | Reid | |
| 7,356,242 B2 | 4/2008 | Nagasawa | |
| 7,434,155 B2 | 10/2008 | Lee | |
| 7,653,550 B2 | 1/2010 | Schulz | |
| 7,889,975 B2 | 2/2011 | Slone | |
| 2001/0020953 A1 | 9/2001 | Moriwake et al. | |
| 2001/0036356 A1 | 11/2001 | Weaver et al. | |
| 2002/0018640 A1* | 2/2002 | Bolduc | 386/52 |
| 2002/0023103 A1 | 2/2002 | Gagne | |
| 2002/0154140 A1* | 10/2002 | Tazaki | 345/620 |
| 2002/0154156 A1 | 10/2002 | Moriwake et al. | |
| 2002/0156805 A1 | 10/2002 | Schriever et al. | |
| 2003/0117431 A1 | 6/2003 | Moriwake et al. | |
| 2003/0146915 A1* | 8/2003 | Brook et al. | 345/473 |
| 2004/0071441 A1 | 4/2004 | Foreman et al. | |
| 2005/0024322 A1* | 2/2005 | Kupka | 345/156 |
| 2005/0058430 A1* | 3/2005 | Nakamura et al. | 386/52 |
| 2005/0132293 A1 | 6/2005 | Herberger et al. | |
| 2005/0216840 A1 | 9/2005 | Salvucci | |
| 2005/0216841 A1* | 9/2005 | Acker et al. | 715/730 |
| 2006/0008247 A1 | 1/2006 | Minami et al. | |
| 2006/0036971 A1 | 2/2006 | Mendel et al. | |
| 2006/0059426 A1* | 3/2006 | Ogikubo | 715/723 |
| 2006/0236245 A1* | 10/2006 | Agarwal et al. | 715/716 |
| 2006/0277500 A1 | 12/2006 | Sawano | |
| 2007/0016872 A1 | 1/2007 | Cummins et al. | |
| 2007/0168873 A1 | 7/2007 | Lentz | |
| 2007/0192748 A1 | 8/2007 | Martin et al. | |
| 2008/0044155 A1* | 2/2008 | Kuspa | 386/52 |
| 2008/0244414 A1 | 10/2008 | Marcoullier et al. | |
| 2009/0106093 A1* | 4/2009 | Folgner et al. | 705/14 |
| 2010/0281385 A1 | 11/2010 | Meaney et al. | |
| 2011/0103772 A1 | 5/2011 | Suzuki | |
| 2011/0131526 A1 | 6/2011 | Vronay et al. | |
| 2011/0258547 A1 | 10/2011 | Symons et al. | |

OTHER PUBLICATIONS

Casares, Juan, et al., "Simplifying Video Editing Using Metadata," Proceedings of Designing Interactive Systems (DIS 2002), Jun. 2002, pp. 157-166, London, United Kingdom.

Diakopoulos, Nicholas, et al., "Videotater: An Approach for Pen-Based Digital Video Segmentation and Tagging," Proceedings of the $19^{th}$ Annual ACM Symposium on User Interface Software and Technology (UIST'06), Oct. 15-18, 2006, pp. 221-224, Montreux, Switzerland.

U.S. Appl. No. 12/434,616, filed May 1, 2009, Meaney, Brian, et al.

Portions of prosecution history of U.S. Appl. No. 12/434,616, Feb. 16, 2012, Meaney, Brian, et al.

Author Unknown, "Apple Announces Final Cut Pro 4," NAB, Apr. 6, 2003, 3 pages, Apple Inc., Las Vegas, Nevada, USA.

Author Unknown, "Using Adobe Premiere Elements 8 Editor," last updated Aug. 12, 2010, 313 pages, Adobe Systems Incorporated, San Jose, California, USA.

Author Unknown, "Adobe Premiere Pro CS3: User Guide," Apr. 1, 2008, 455 pages, Adobe Systems Incorporated, San Jose, California, USA.

Author Unknown, "iMovie '08 Getting Started," Month Unknown, 2008, pp. 1-50, Apple Inc., USA.

Brenneis, Lisa, "Final Cut Pro 3 for Macinotsh: Visual QuickPro Guide," Apr. 2002, 288 pages, Peachpit Press, Berkely, California, USA.

* cited by examiner

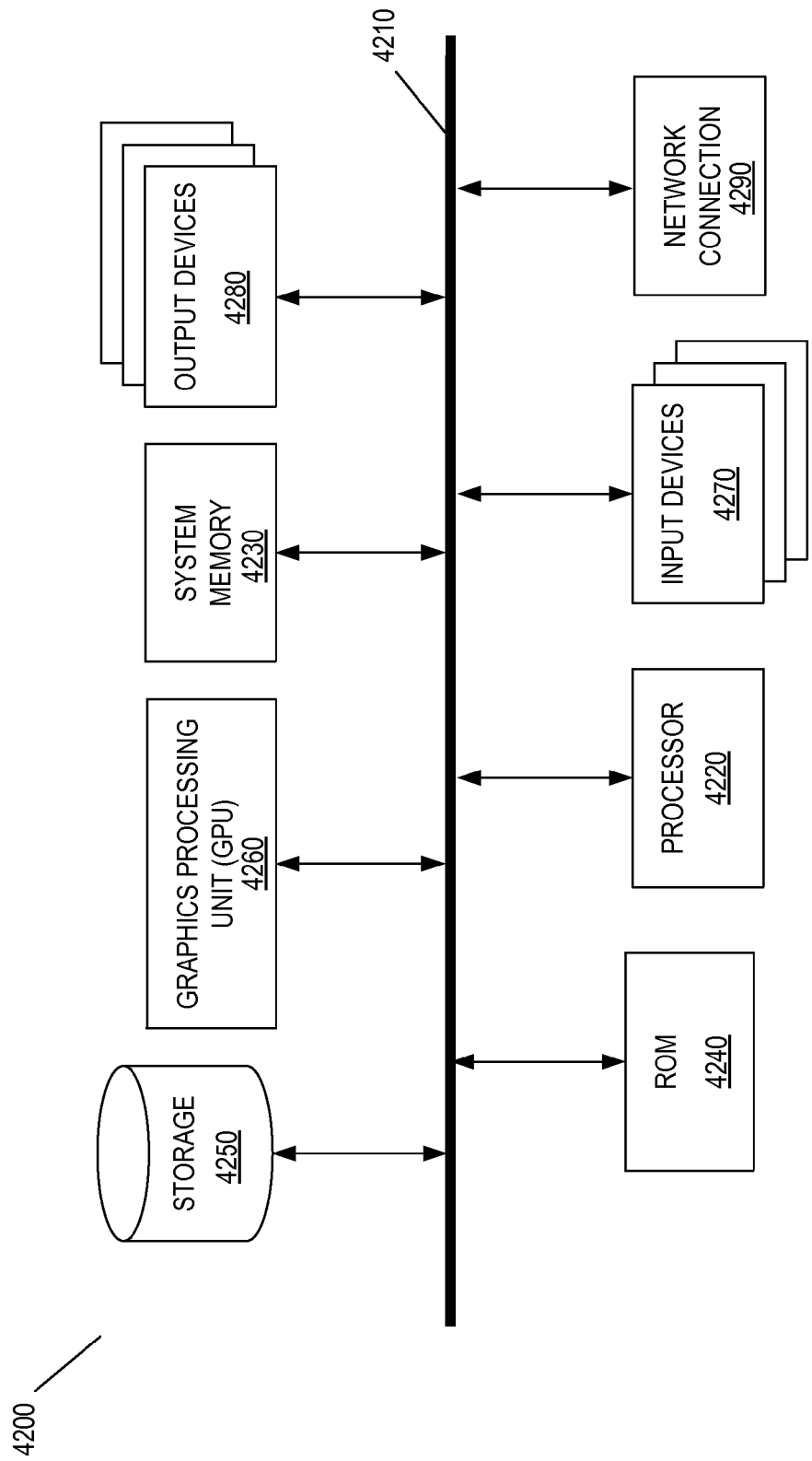

CROSS-TRACK EDIT INDICATORS AND EDIT SELECTIONS

CROSS REFERENCE TO RELATED APPLICATIONS

This Application is related to the following application: U.S. patent application Ser. No. 12/434,616, filed May 1, 2009, now published as U.S. Publication No. 2010/0281385.

FIELD OF THE INVENTION

The present invention relates to media content editing applications. In particular, the invention provides a media content editing application having tools for optimizing user operation of editing tasks.

BACKGROUND OF THE INVENTION

Digital graphic design, image editing, audio editing, and video editing applications (hereinafter collectively referred to as media content editing applications or media editing applications) provide graphical designers, media artists, and other users with the necessary tools to create a variety of media content. Examples of such applications include Final Cut Pro® and iMovie®, both sold by Apple Computer, Inc. These applications give users the ability to edit, combine, transition, overlay, and piece together different media content in a variety of manners to create a resulting media project. The resulting media project specifies a particular sequenced composition of any number of text, audio clips, images, or video content that is used to create a media presentation.

Various media editing applications facilitate such composition through electronic means. Specifically, a computer or other electronic device with a processor and computer readable storage medium executes the media content editing application. In so doing, the computer generates a graphical interface whereby designers digitally manipulate graphical representations of the media content to produce a desired result.

FIG. 1 illustrates a typical graphical user interface ("GUI") 100 of a media editing application used in creating a composite media presentation based on several media clips. As shown in this figure, the GUI 100 includes a composite display area 105 and tool palette 110 that has various tool selection buttons. On several tracks that span a timeline, the composite display area can display many rectangles that represent many media clips that are used to create a composite media presentation.

One difficulty in media editing is the frequency at which a user switches tools to perform editing different tasks. For example, a user may switch among four trim tools, such as a roll trim tool, a ripple trim tool, a slip trim tool, and a slide trim tool, dozens of times per minute while editing media clips on the tracks in the composite display area. Consequently, the user is required to look back and forth between tool palette 110 and composite display area 105 while selecting the appropriate tools and applying the editing operations to the clips in the composite display area.

Accordingly, there is a need for a media editing application that provides a GUI element for a user to select among several editing tools without needing to select a tool from outside the composite display area.

Another difficulty in electronic media editing, as compared with manual manipulation of film in mechanical editing, is the loss of information regarding the physical dimensions of the media content that is being edited.

FIG. 2 illustrates a typical representation of media content on tracks 200. Source media 210 represents a media file having a video component and one or more audio components. Source media 210 is inserted into tracks 200 to form a composite media presentation. A media editing application may split source media into its individual video and audio components, and place each of the components, also referred to as clip elements, into separate tracks, such as video track V1 and audio track A1 as shown in FIG. 2. A user may include the whole length of source media 210, or include only a portion. The included portion is referred to as a clip. The portion is delineated by setting edit points 220-221 that define the beginning and the end of the clip. The portion of source media 210 that is inserted into tracks 200 is represented as clip shapes 230-231. Clip shape 230 corresponds to the inserted video clip element, and clip shape 231 corresponds to the inserted audio clip element. Once inserted into tracks 200, the portions of source media 210 that are not included, shown in FIG. 2 as shaded areas, are not displayed or indicated along track 200.

When performing editing operations on clips in tracks 200, edit points 220-221 may be adjusted to extend or to shorten media from the beginning or the end of the clip elements. Edit point 220 can be adjusted from within tracks 200. However, because the shaded areas are not displayed or indicated along track 200, the user is provided with no information regarding where boundaries of source media 210 lie.

Information regarding source media boundaries is useful in helping the user to determine the available range of editing operations as the operations are performed in tracks 200. Without such information, the user does not know how much of the source media remains to be included until, for example, when performing the roll edit operation, the cursor is arrested when the cursor reaches a boundary that is not visible to a user.

There is a need for a media editing application to indicate to the user the location of a media boundary before the cursor reaches the boundary while editing within a composite display area.

SUMMARY OF THE INVENTION

Some embodiments of the invention provide a media editing application for creating a media presentation (e.g., movie) by compositing several media clips (e.g., audio clips, video clips, etc.). The media editing application of some embodiments provides: (1) a composite display area for displaying a set of clip shapes representing a set of media clips that are part of the composite presentation, and (2) a consolidated editing tool for providing several user-selectable editing operations within the composite display area.

In some of these embodiments, the consolidated editing tool provides multiple user-selectable editing operations simultaneously near the location where the user wishes to perform an edit in order to allow the user to select one of these editing operations. In other embodiments, the consolidated editing tool (1) detects the location of a user-controlled cursor on or near a clip shape inside the composite display area, and (2) based on the location, automatically presents an associated editing operation from a set of multiple editing operations for selection and activation near the cursor location. In some such embodiments, the editing tool detects a change of the location of the cursor and automatically presents, based on the new cursor location, another associated editing operation for selection and activation.

In some embodiments, the associated editing operation that is automatically presented based on the cursor location is one that the media editing application predicts is the operation that the user most likely wishes to perform based on that location. After automatically presenting the user with a particular editing operation for a particular clip shape, the consolidated editing tool presents the user with another editing operation for the same particular clip shape, or presents the user with the same or another editing operation for the another clip shape. This would occur when the tool detects that the cursor has moved significantly with respect to the particular clip shape which it still overlaps, or detects that the cursor has moved onto or near the other clip shape.

The editing tool's prediction of the editing operation to present for a particular cursor location is defined differently in different embodiments. In some embodiments, this prediction is based on a location rule set that is specified by the media editing application's author. In other embodiments, the location rule set is specified by the media application's user. In still other embodiments, this rule set is initially specified by the media editing application's author, but later can be modified by the media application's user.

BRIEF DESCRIPTION OF THE DRAWINGS

The novel features of the invention are set forth in the appended claims. However, for purpose of explanation, several embodiments of the invention are set forth in the following figures.

FIG. 42 illustrates a computer system with which some embodiments of the invention are implemented.

DETAILED DESCRIPTION OF THE INVENTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a media editing application for creating a media presentation (e.g., movie) by compositing several media clips (e.g., audio clips, video clips, etc.). The media editing application of some embodiments provides: (1) a composite display area for displaying a set of clip shapes representing a set of media clips that are part of the composite presentation, and (2) a consolidated editing tool for providing several user-selectable editing operations within the composite display area.

In some of these embodiments, the consolidated editing tool provides multiple user-selectable editing operations simultaneously near the location where the user wishes to perform an editing operation in order to allow the user to select one of these editing operations. In other embodiments, the consolidated editing tool (1) detects the location of a user-controlled cursor on or near a clip shape inside the composite display area, and (2) based on the location, automatically presents an associated editing operation from a set of multiple editing operations for selection and activation near the cursor location. In some such embodiments, the editing tool detects a change of the location of the cursor and automatically presents, based on the new cursor location, another associated editing operation for selection and activation.

In some embodiments, the associated editing operation that is automatically presented based on the cursor location is one that the media editing application predicts is the operation that the user most likely wishes to perform based on that location. These embodiments or other embodiments also allow the user to define the editing operation that is associated with different locations of the cursor with respect to a clip in the composite display area.

Figure 1:
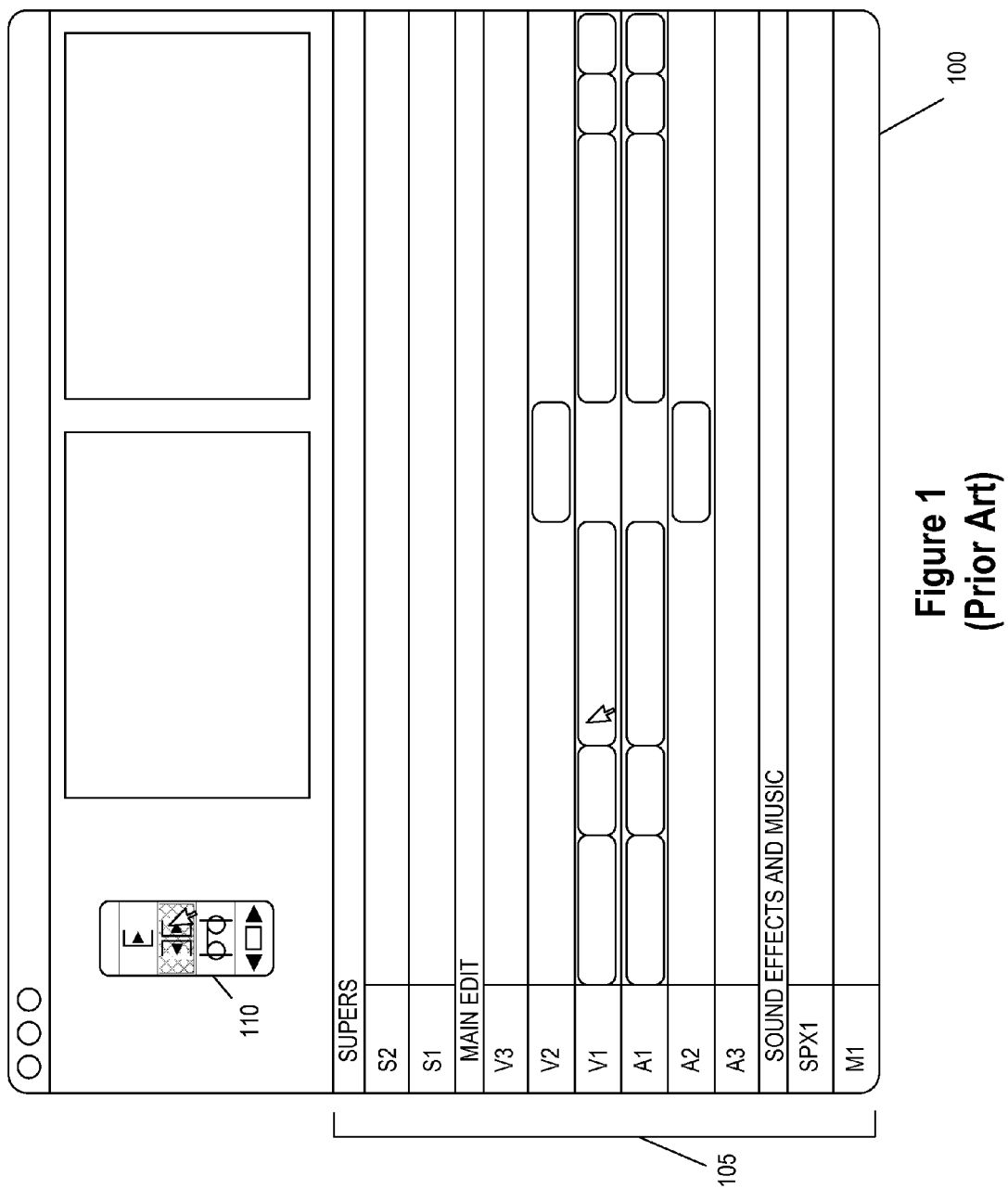
FIG. 1 illustrates a typical graphical user interface ("GUI") of a media editing application used in creating a composite media presentation based on several media clips.
Figure 2:
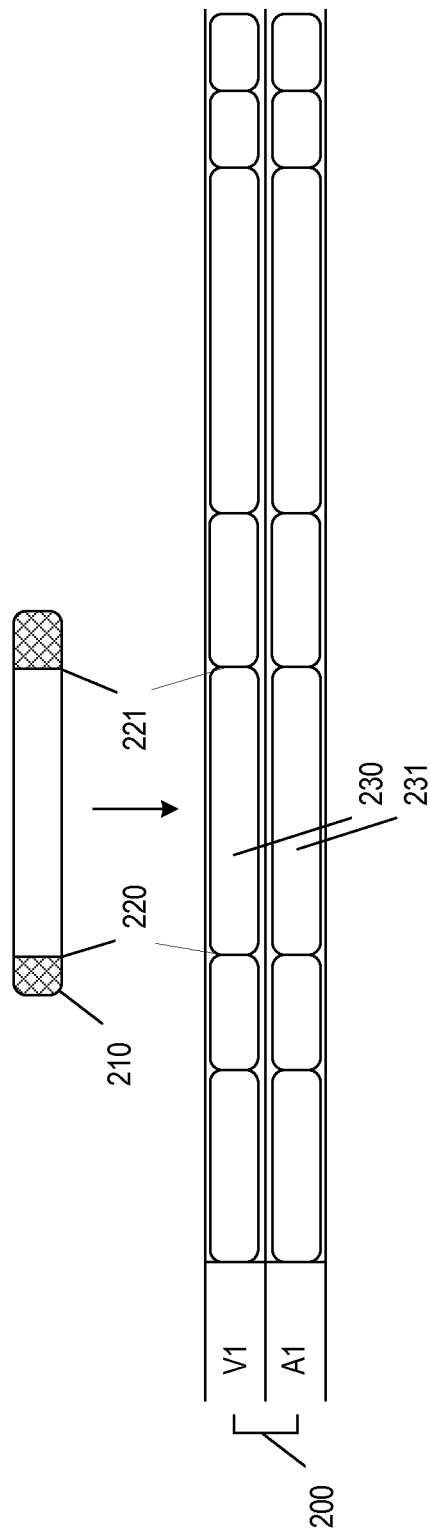
FIG. 2 illustrates a typical representation of media content on tracks.
Figure 3:
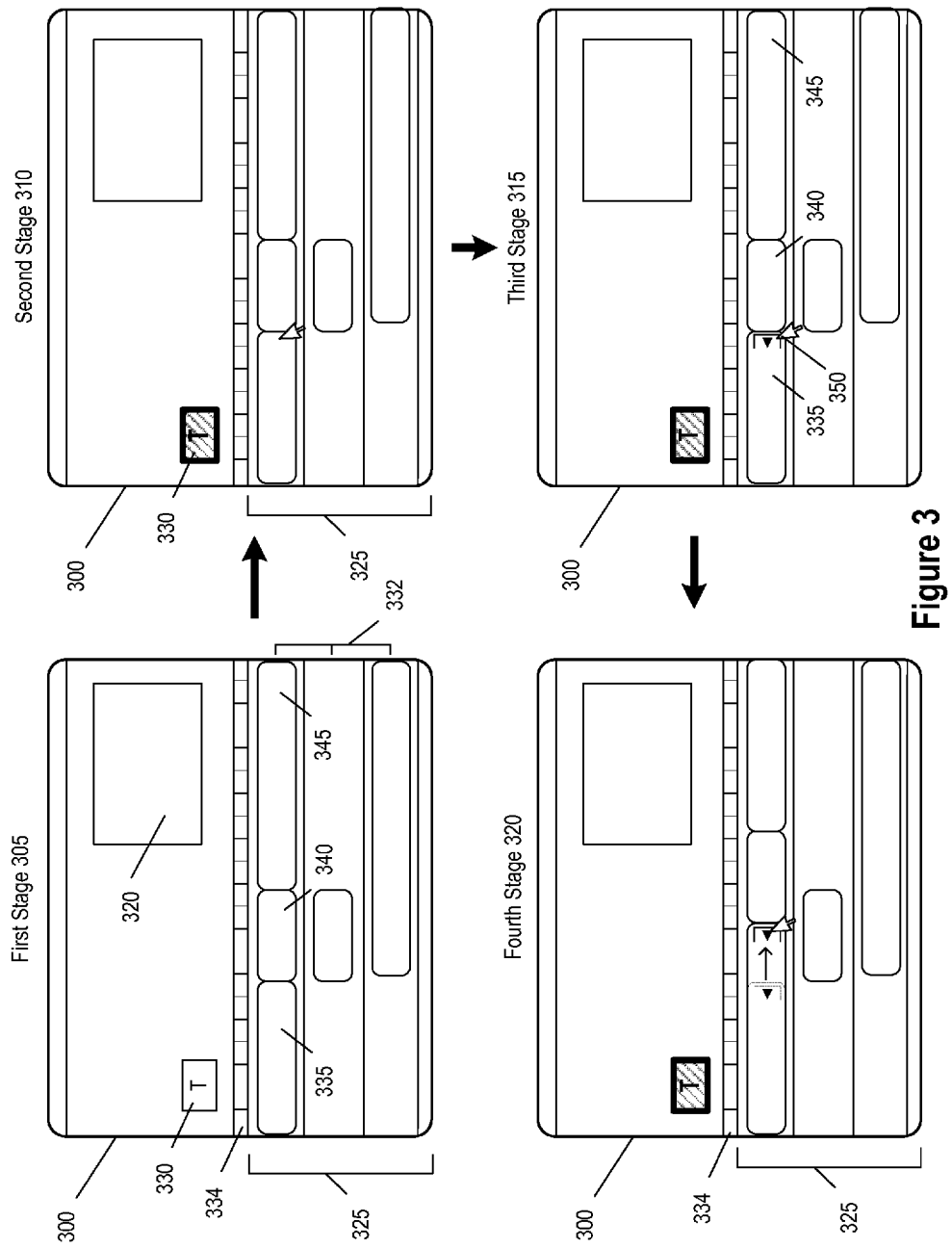
FIG. 3 illustrates a consolidated editing tool that automatically presents an associated editing operation for selection and activation based on the cursor location as implemented in some embodiments of the invention.

For some embodiments of the invention, FIG. 3 illustrates a graphical user interface ("GUI") 300 of a media application with such a consolidated editing tool that automatically presents an associated editing operation for selection and activation based on the cursor location. Specifically, this figure illustrates the GUI 300 at four different stages, a first stage 305 that is before any editing tool is activated, a second stage 310 that is after a consolidated editing tool is activated, a third stage 315 that is after an associated editing operation is automatically presented, and a fourth stage 320 that is after the associated editing operation is performed.

As shown in FIG. 3, the GUI 300 includes a display area 320, a composite display area 325, and a tool-activate UI item 330. The display area 320 displays a preview of a composite presentation that the application creates by compositing several media clips. The composite display area 325 provides a visual representation of the composite presentation created by the user. Specifically, it displays one or more clip shapes representing one or more media clips that are part of the composite presentation. In the example illustrated in FIG. 3, the composite display area 325 is an area that includes multiple tracks 332 that span a timeline 334. Each track can receive and hold one or more clip shapes. In the example of FIG. 3, the composite display area 325 is shown with three tracks, each of which holds several clip shapes, including a first clip shape 335, a second clip shape 340, and a third clip shape 345. In some embodiments, the x-direction in the composite display area 325 represents time that is defined along a timeline.

The tool-activate UI item 330 is a conceptual illustration of a UI item in the media editing application with which users interact to activate the consolidating editing tool. In some embodiments, the UI item 330 also provides feedback to the user to indicate that the consolidated editing tool is activated. The consolidated editing tool (1) detects the location of a user-controlled cursor on or near a clip shape in the composite display area, and (2) based on the location, automatically presents an associated editing operation from a set of multiple editing operations for selection and activation near the cursor location. In some such embodiments, the editing tool detects a change of the location of the cursor, and it automatically presents, based on the new cursor location, another associated editing operation for selection and activation.

Different embodiments of the invention implement the tool-activate UI item 330 differently. Some embodiments implement it as an UI button, others as an editing tool command that can be selected in a pull-down or a drop-down menu, and still others as an editing tool activation command that can be invoked through one or more keystroke operations. Other embodiments allow the user to access the editing tool feature through two or more such UI implementations or other UI implementations. In some embodiments, the tool-activate UI item 330 has two components: (1) an input component that is an editing tool activation command that can be invoked through one or more keystroke operations to activate the consolidated editing tool, and (2) an output component that is a graphical UI element that changes its appearance to indicate to the user whether the consolidating editing tool is activated.

The operation of the GUI 300 will now be described by reference to the state of the GUI during first stage 305, second stage 310, third stage 315, and fourth stage 320 that are illustrated in FIG. 3. In first stage 305, the composite display area 325 displays a composite presentation comprising several clip shapes along the timeline 334. A user might have added these clip shapes to the composite presentation in a current editing session or by opening a composite project that was defined in a previous editing session. In first stage 305, no editing tool has been activated for performing editing operations on any clip shapes.

Second stage 310 displays composite display area 325 after the consolidated editing tool is activated by the media editing application after receiving input from a user through tool-activate UI item 330. While FIG. 3 illustrates an embodiment in which the activation of the consolidated trim editing tool is shown by a change in appearance of UI item 330, in some other embodiments, the activation occurs without any change in appearance in any UI items. For instance, in some embodiments, the UI item 330 is implemented as an editing tool command that is invoked through one or more keystrokes (or a selection from a drop-down menu, etc.), and activation of the consolidated editing tool does not cause any change in appearance in any UI items.

Third stage 315 displays the operation of the consolidated editing tool after it is activated through tool-activate UI item 330. The consolidated editing tool invokes an editing tool logic that (1) detects the location of a user-controlled cursor on or near a clip shape in the composite display area, and (2) based on the location, automatically presents an associated editing operation from a set of multiple editing operations for selection and activation near the cursor location. In the example illustrated in FIG. 3, the consolidating editing tool detects in the third stage 315 that the cursor location is near the right end of clip shape 335, and thereby presents a ripple trim editing operation for the user's selection and activation. The ripple trim editing operation is presented in this example in terms of a graphical symbol associated with the ripple operation on the affected clip.

For some embodiments, the consolidated editing tool analyzes the location of the user-controlled cursor relative to a clip shape to determine which editing operation from a set of multiple editing operations to present for selection and activation. In such embodiments, a clip shape is logically divided into different zones, each of which is associated with a particular editing operation. When the location of a cursor is within a particular zone within the clip shape, a corresponding editing operation is presented for selection and activation. Different embodiments of the invention can divide a clip shape into different zones, and different embodiments can associate different editing operations with the established zones. For some embodiments of the invention, the different editing operations include a ripple trim editing operation, a roll trim editing operation, a slip trim editing operation, and a slide trim editing operation, as well as any other editing operations that affect the size, composition, or location of clip shapes along tracks 332.

The fourth stage 320 displays the media editing application having received the user's selection of the ripple trim editing operation at location 350 (e.g., through a cursor click-and-hold operation). This selection activates the ripple trim editing operation of the editing tool. The fourth stage 320 also illustrates that the editing tool performs the editing operation as a user drags the cursor to the left while still maintaining the tool active (e.g., while continuing to maintain the click event). As further described below, a ripple trim editing operation extends the end of the affected clip while shifting other clips on other selected tracks along the timeline in the direction of the selected clip's extension. The editing tool terminates the editing operation when the user de-activates the tool (e.g., through a click-release command).

Figure 4:
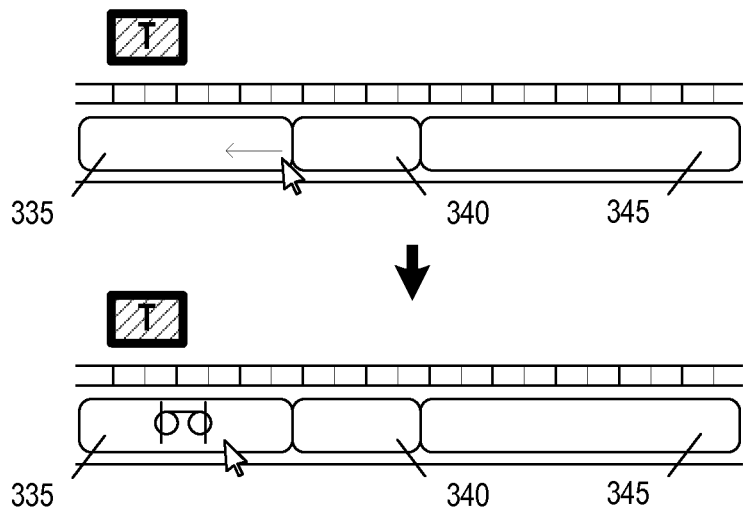
FIG. 4 illustrates presentation of a slip trim editing operation by the editing tool of some embodiments based on the detection of a cursor within a particular zone of a clip.
Figure 5:
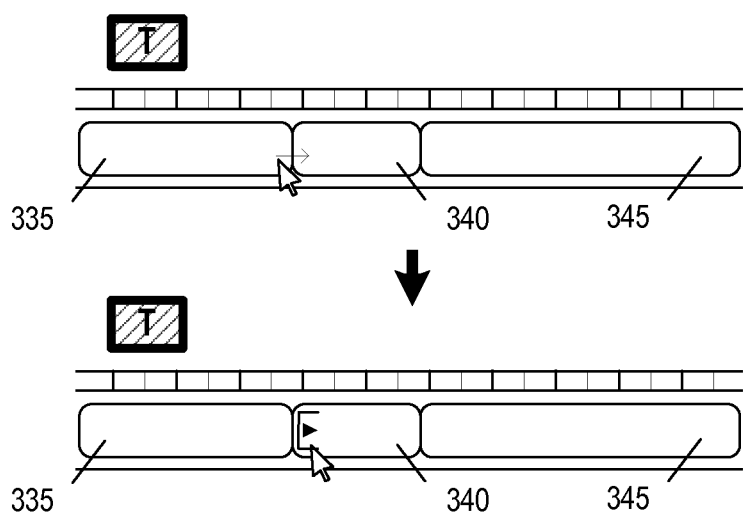
FIG. 5 illustrates the editing tool presenting a ripple trim editing operation on a clip to indicate to the user the option of performing a ripple trim editing operation on the clip.

In the example illustrated in FIG. 3, the user selects the first editing operation (i.e., the ripple trim editing operation) that the editing tool presents to the user in the third stage 315. However, the user might not always select the first tool that is presented, as the user might move the cursor to see other editing operations for the same clip, or the same or other editing operations for other clips. For instance, after being presented the ripple trim editing operation at the third stage 315, the user might move the cursor to the left sufficiently along the clip shape 335 such that the editing tool (1) detects that the cursor is within another zone of the clip shape 335 and (2) presents the user with a slip trim editing operation, as shown in FIG. 4. Alternatively, after the third stage 315, the user might move the cursor to the right so that it now overlaps the clip shape 340. In this case, the editing tool detects that the cursor is now over another clip shape 340 in a zone of that clip that is associated with a ripple trim editing operation. Accordingly, as shown in FIG. 5, the editing tool presents a ripple trim editing operation on the clip shape 340 to indicate to the user the option of performing a ripple trim editing operation on the clip shape 340.

Because certain editing operations are naturally associated with particular regions of a clip shape, zones can be established so that the consolidated editing tool will automatically present to a user the editing operation that the user would likely desire to choose for the cursor location. For example, a roll trim editing operation is naturally associated with a boundary between two clips because the roll trim editing operation simultaneously changes the edit points of two clips in one editing movement. Accordingly, a user would likely desire to perform a roll trim editing operation when the user moves the cursor to the boundary between two clip shapes. To present to the user the editing operation that the user would likely desire at a boundary, a roll trim editing operation zone is established that abuts the boundary of the clip shape. When a cursor is detected at a boundary, the media editing application presents to the user a roll trim editing operation for selection and activation, thereby matching the user's expected editing operation selection.

Figure 6:
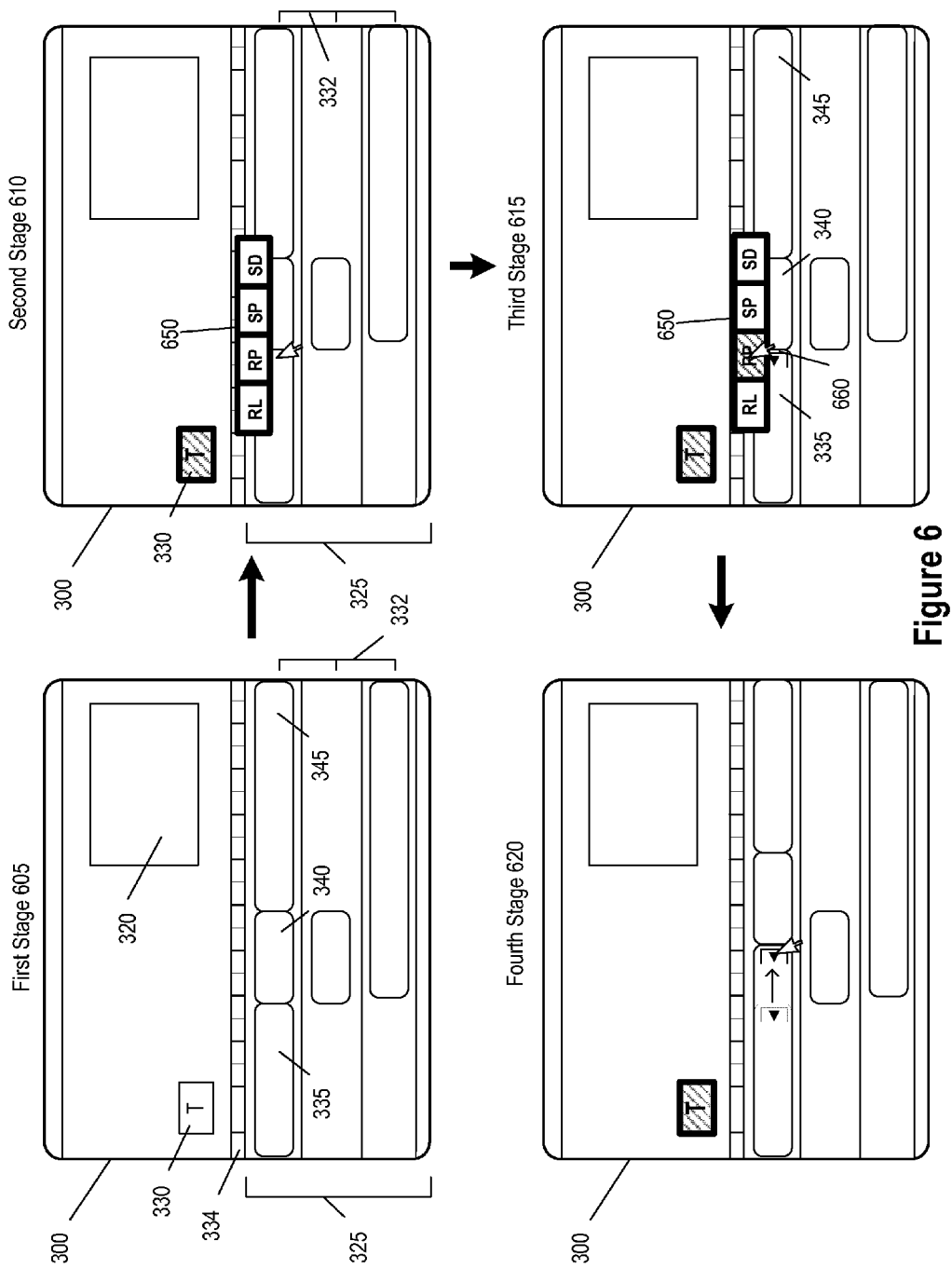
FIG. 6 illustrates a consolidated editing tool that presents multiple editing operations simultaneously near a cursor's location in the composite display area when the user activates the consolidated editing tool as implemented in some embodiments of the invention.

Instead of automatically presenting an editing operation from a group of editing operations based on a cursor's location with respect to a clip, some embodiments simply present multiple editing operations simultaneously near a cursor's location in the composite display area when the user activates the consolidated editing tool, as shown in FIG. 6. Specifically, this figure illustrates a graphical user interface ("GUI") 600 of a media application with a consolidated editing tool that provides multiple user-selectable editing operations simultaneously near the location where the user wishes to perform an editing operation in order to allow the user to select one of these editing operations.

Like the GUI 300 of FIG. 3, the GUI 600 of FIG. 6 includes a display area 320, a composite display area 325, and a tool-activate UI item 330. Also, like FIG. 3, FIG. 6 illustrates its GUI 600 at four different stages. In this example, (1) the first stage 605 is before any editing tool is activated; (2) the second stage 610 is after the activation of the consolidated editing tool when multiple user-selectable editing operations are presented simultaneously near the current cursor location; (3) the third stage 615 is after an editing operation is selected by a user, and (4) the fourth stage 620 is after the associated editing operation is performed.

The first stage 605 in FIG. 6 is like the first stage 305 in FIG. 3. This stage 605 displays the composite display area 325 with a composite presentation that includes five clip shapes along the timeline 334. In first stage 605, no editing tool has been activated for performing editing operations on any clip shapes.

The second stage 610 displays the composite display area 325 after the consolidated editing tool is activated by the media editing application after receiving input from a user through tool-activate UI item 330. While FIG. 6 illustrates an embodiment in which the activation of the consolidated trim editing tool is shown by a change in appearance of tool-activate UI item 330, in some other embodiments, the activation occurs without any change in appearance in any UI items. After activation, a user-selectable editing operations UI item 650 appears near the cursor to display several user-selectable editing operations. In some embodiments, user-selectable editing operations UI item 650 remains displayed until the editing tool has received the user's selection of the editing operation (e.g., through a cursor click event.) In some embodiments, user-selectable editing operations UI item 650 is made transparent or invisible during the performing of the editing operation, allowing the user a less obstructed view of the composite display. In still other embodiments, receiving additional input through tool-activate UI item 330 when the cursor is at a new location causes user-selectable editing operations UI item 650 to be displayed near the new cursor location.

Third stage 615 displays the operation of the consolidated editing tool after an editing operation has been selected (e.g., through a cursor click event) from user-selectable editing operations UI item 650. The third stage 615 displays the media editing application having received the user's selection of the ripple trim editing operation. In some embodiments, the selected editing operation UI button changes appearance to indicate a selection. In some embodiments, selecting another editing operation button changes the selection to another editing operation. In some embodiments, after the editing operation has been selected, a graphical symbol associated with the operation is displayed at the affected clip shape.

The fourth stage 620 illustrates that the editing tool performs the editing operation as a user selects (e.g., through a cursor click-and-hold operation) on the edit point, and drags the cursor to the left while still maintaining the tool active (e.g., while continuing to maintain the click event.) The editing tool terminates the editing operation when the user de-activates the tool (e.g., through a click-release command). In some embodiments, the consolidating editing tool is de-activated when the editing operation is terminated. In some other embodiments, the consolidating editing tool remains activated until a de-activation command is received.

The example illustrated in FIG. 6 shows one possible implementation for presenting multiple selectable editing operations simultaneously within the composite display area near the cursor location. One of ordinary skill will realize that many other possible implementations exist. For instance, in some embodiments, user-selectable editing operations UI item 650 is implemented as a bar of editing operations UI buttons that display all available editing operations. In some other embodiments, user-selectable editing operations UI item 650 is a scrollable UI. The scrollable UI displays fewer than the total number of available editing operations UI buttons. In the scrollable UI, the currently displayed UI buttons can be shifted out of view to the left or right by invoking scrolling commands to display other editing operations UI buttons that were not displayed. In these embodiments, the scrollable UI can sequentially display all available editing UI buttons in user-selectable editing operations UI item 650. One example of such a scrollable UI is described in U.S. patent application Ser. No. 12/433,891, now published as U.S. Patent Publication 2010/0281374, entitled "Scrollable Menus and Toolbars", filed Apr. 30, 2009. Editing operations include a ripple trim editing operation, a roll trim editing operation, a slip trim editing operation, and a slide trim editing operation, as well as any other editing operations that affect the size, composition, or location of clip shapes along tracks 632. One of ordinary skill will understand that any changes to the clip shapes will also affect the underlying clip data represented by the clip shapes.

It is advantageous to present multiple selectable editing operations simultaneously in the composite display area near the cursor location, irrespective of the implementation of such presentation. Presenting multiple user-selectable editing operations simultaneously near the location where the cursor is located allows the user to keep the user's visual focus at the location where the user wishes to perform the edit and also requires less cursor movement. Because the user's visual focus is not shifted far away from the desired edit location when choosing a new editing operation, the consolidated editing tool allows a user to perform editing tasks faster.

Several more detailed embodiments of the invention are described in the sections below. In some of the examples below, the editing operations are trimming operations. However, one of ordinary skill in the art will realize that the consolidated editing tool of some embodiments may also be used for presenting, either sequentially or conjunctively, other types of editing operations. Section I describes some embodiments of the invention that provide a consolidated editing tool that automatically presents an associated editing operation for selection. Next, Section II describes some embodiments of the invention that provide a consolidated editing tool that provides multiple user-selectable editing operations simultaneously near the location where the user wishes to perform an edit in order to allow the user to select one of these editing operations. After that, Section III describes some embodiments of the invention that provide an editing tool having a set of indicator lines for guiding the user with respect to source media boundaries when editing operations are performed. Section IV then describes some embodiments of the invention that provide an editing tool that provides (1) cross-track ripple trim indicators when a ripple trim editing operation is performed, and (2) a track de-selection feature to allow a user to exclude certain tracks from the ripple trim editing operation. Following that discussion, Section V describes the software architecture of some embodiments of the invention. Section VI then describes a process for defining the media editing application of some embodiments. Finally, Section VII describes the computer system and components with which some embodiments of the invention are implemented.

I. Automatic Presentation of Associated Editing Operation for Selection

As discussed above, several embodiments provide a consolidated trimming tool that (1) detects the location of a user-controlled cursor on or near a clip shape inside the composite display area, and (2) based on the location, automatically presents an associated editing operation from a set of multiple editing operations for selection and activation near the cursor location. Sub-section I.A will describe several more detailed examples by reference to FIGS. 7-18. Sub-section I.B will then describe a machine-executed process used by some embodiments for automatically presenting an associated editing operation from a set of multiple editing operations for selection and activation based on detecting the location of a user-controlled cursor by reference to FIG. 19. Sub-section I.C will then describe a keystroke override operation of some embodiments for allowing a user to override the auto-presentation of editing operations. Finally, sub-section I.D describes a multi-track selection functionality of some embodiments that allows a user to select multiple tracks for editing by simply sweeping the cursor across several tracks.

A. Examples of Automatic Presentation of Selected Editing Operations

Figure 7:
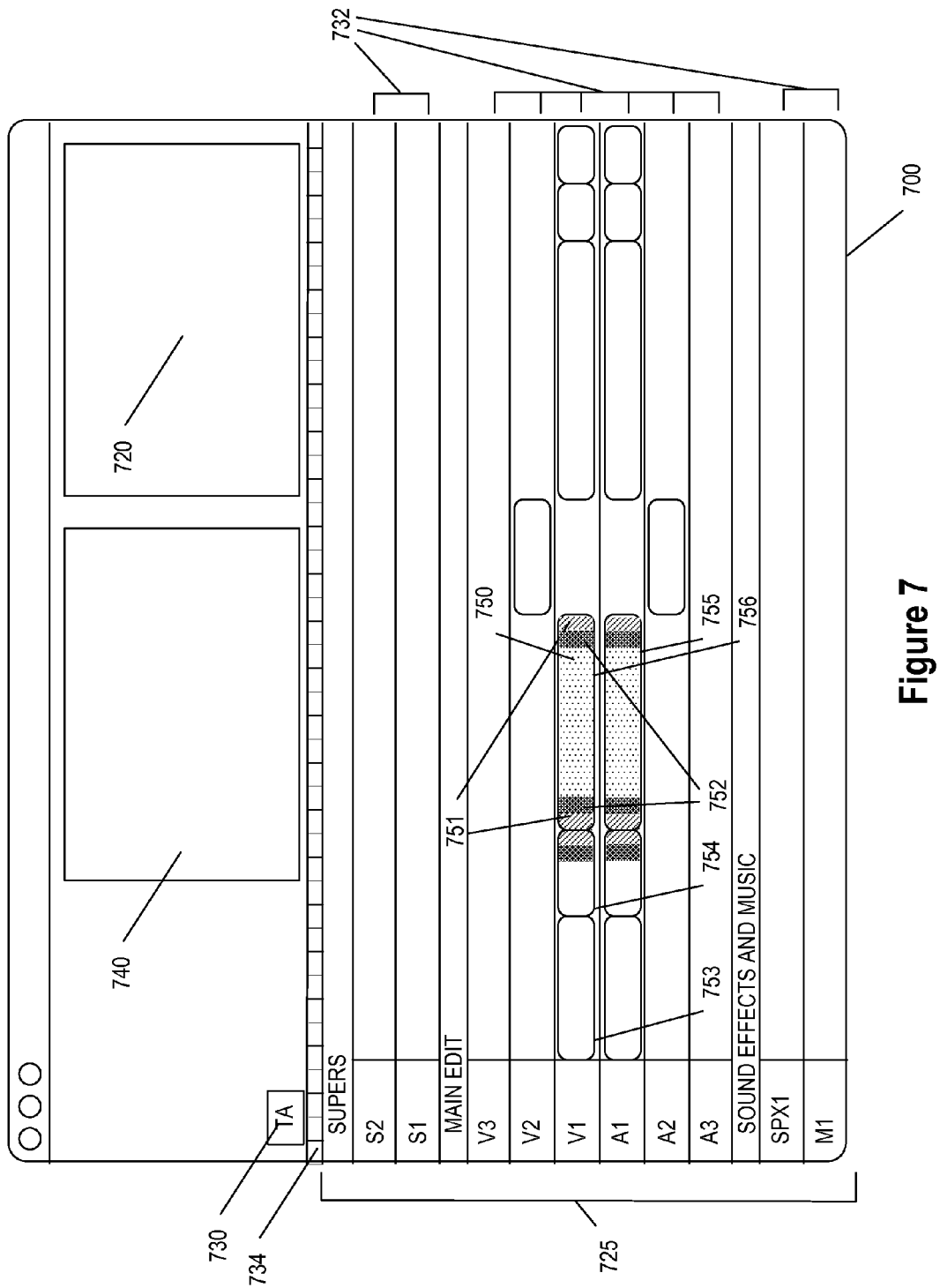
FIG. 7 illustrates a more detailed example of a GUI that provides to a user access to the consolidated editing tool as implemented in some embodiments of the invention.

FIG. 7 illustrates a more detailed example of a GUI that provides to a user access to the consolidated trimming tool that (1) detects the location of a user-controlled cursor on or near a clip shape inside the composite display area, and (2) based on the location, automatically presents an associated editing operation from a set of multiple editing operations for selection and activation near the cursor location. Like GUI 300 of FIG. 3, GUI 700 of FIG. 7 includes a preview display area 720, a composite display area 725 with multiple tracks 732 that span a timeline 734, and a tool-activate UI item 730.

FIG. 7 also illustrates GUI 700 to include a media file display area 740 for displaying unedited media files that are used to generate media clips. The GUI 700 also includes a tool active indicator 730 that provides an indication when an application's trimming tool has been enabled for activation. In addition, multiple tracks 732 are labeled with track labels, and are separated into track categories, such as "Main Edit," "Supers," and "Sound Effects and Music," to help the user manage the elements of a composite presentation.

Each of multiple tracks 732 is illustrated to hold a particular clip type. For example, tracks V1, V2, and V3 hold video clips, and tracks A1, A2, and A3 hold audio clips. Certain tracks are synchronized. For example, video track V1, which holds video clips showing subjects who are speaking, is synchronized with audio track A1, which holds the audio clips corresponding to the speech of the subjects in the video clips. In this example, video track V1 and audio track A1 are also linked such that editing operations performed on one track are automatically applied to the corresponding clips on the other track. Included in the multiple tracks 732 are clips 753-756

In addition, FIG. 7 illustrates zones 750-752 within linked clip shapes 755-756. Detecting the location of a user-controlled cursor within a particular zone within a clip shape causes the consolidated trimming tool to automatically present the editing operation associated with the zone for selection and activation. Zones 750-752 are defined identically for both clip shapes 755-756 because they are linked. Each zone is shaded to represent different editing operations associated with each shade. Different embodiments of the invention can divide a clip shape into different zones, and different embodiments can associate different editing operations with the established zones.

As shown in GUI 700 in FIG. 7, zone 750 spans the middle region of clip shape 756. In some embodiments of the invention, zone 750 corresponds to either a slip trim or a slide trim editing operation. Zones 751 span the region from the edge of the clip shape. In some embodiments, zones 751 correspond to a roll trim editing operation. Zones 752 span the regions flanking zone 750, but not reaching the edges of the clip shape. In some embodiments of the invention, zones 752 correspond to a ripple trim editing operation.

The sizes of zones 750-752 are defined differently according to different embodiments of the invention. In some embodiments, zones 750-752 span the entire height of the clip shape, and have a defined width. For some embodiments, some zones have widths defined in units of pixels; other zones have widths defined relative to other clip features. For example, zones 751 are defined to span a width of two pixels, extending from and including the edge of clip shape 756. Zones 752 are defined to span a width of twenty pixels, extending from, but not overlapping with, the edges of zones 751. Zone 750 is defined to span the remaining width of clip shape 756 that is between, but not overlapping with, zones 752.

In other embodiments, the sizes of zones 750-752 may also depend on the size of a particular clip shape, and may be adjusted when the length of a clip changes. For example, if the length of a clip shape 756 is changed to be narrower, then the widths of zones 750-752 are automatically adjusted to be narrower as well. For some embodiments, the automatic adjustments of the widths of zones are limited by both lower and upper thresholds.

Several operations change the length of clip shapes as displayed in the tracks. For example, a clip shape may be lengthened or shortened in an editing operation. In another example, a clip shape may appear wider or narrower in composite display area 725 depending on the zoom level chosen by the user. For example, when composite display area 725 is set at a zoom level such that composite display area 725 spans one minute in a timeline, a clip that is 30-seconds long would be represented as a clip shape that spans half the length of a track as displayed in composite display area 725. When the zoom level is adjusted such that composite display area 725 spans ten minutes in the timeline, the same 30-second-long clip is now represented as a clip shape that is one-tenth the size of the previous clip shape. In some embodiments, while the widths of the zones of the clip shape are adjusted depending on the two different sizes, the widths are the zones are not adjusted proportionally. Instead, the widths are adjusted until they reach an upper threshold, such as twenty pixels for a ripple trim zone, or until they reach a lower threshold, such as one pixel for a roll trim zone.

For some embodiments, the zones are assigned an order of priority such that a zone may "disappear" from the clip shape if the clip shape is too narrow. For example, as described above, zones 751 and 752 are defined in units of pixels, and zone 750 is defined to span the remaining width of clip shape 756 that is between, but not overlapping with, zones 752. If (1) clip shape 756 is narrowed by an editing operation, or by a zoom level change, such that clip shape 756 is considerably narrowed, and (2) the widths of zones 751 and 752 are both narrowed to their respective lower threshold limits, then the consolidated trimming tool removes zone 750 from the clip shape.

Accordingly, the editing operation that corresponds to zone 750 is not presented when the cursor is detected at any location inside clip shape 756. Instead, an editing operation that corresponds to one of the other remaining zones is presented. Thus, for this zoom level, in some embodiments, an overriding keystroke or other input must be received by the media editing operation to present the editing operation that corresponds to zone 750 for selection and activation. Otherwise, the user may increase the zoom level to expand the width of the clip shape such that zone 750 is again defined for the clip shape and can again be selected.

The following discussion will describe in detail several different examples with reference to FIGS. 8-18. FIGS. 8-18 illustrate different stages of performing possible editing operations that are automatically presented by the consolidated trimming tool, including, but not limited to, (1) the ripple trim editing operation, (2) the roll trim editing operation, (3) the slip trim editing operation, and (4) the slide trim editing operation.

Figure 8:
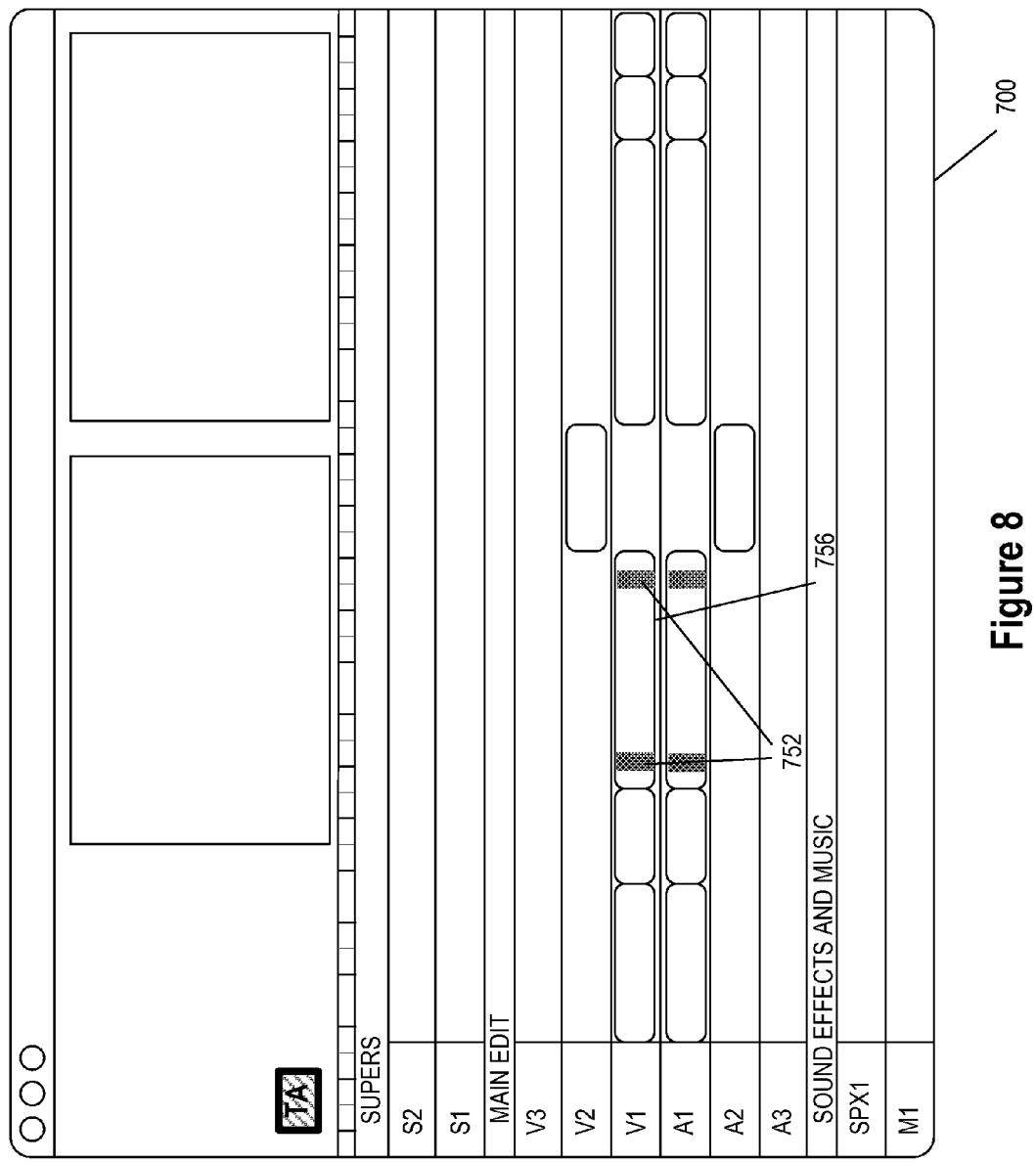
FIGS. 8-10 illustrate three stages of a user's interaction with a GUI to perform a ripple trim editing operation as implemented in some embodiments of the invention.
Figure 9:
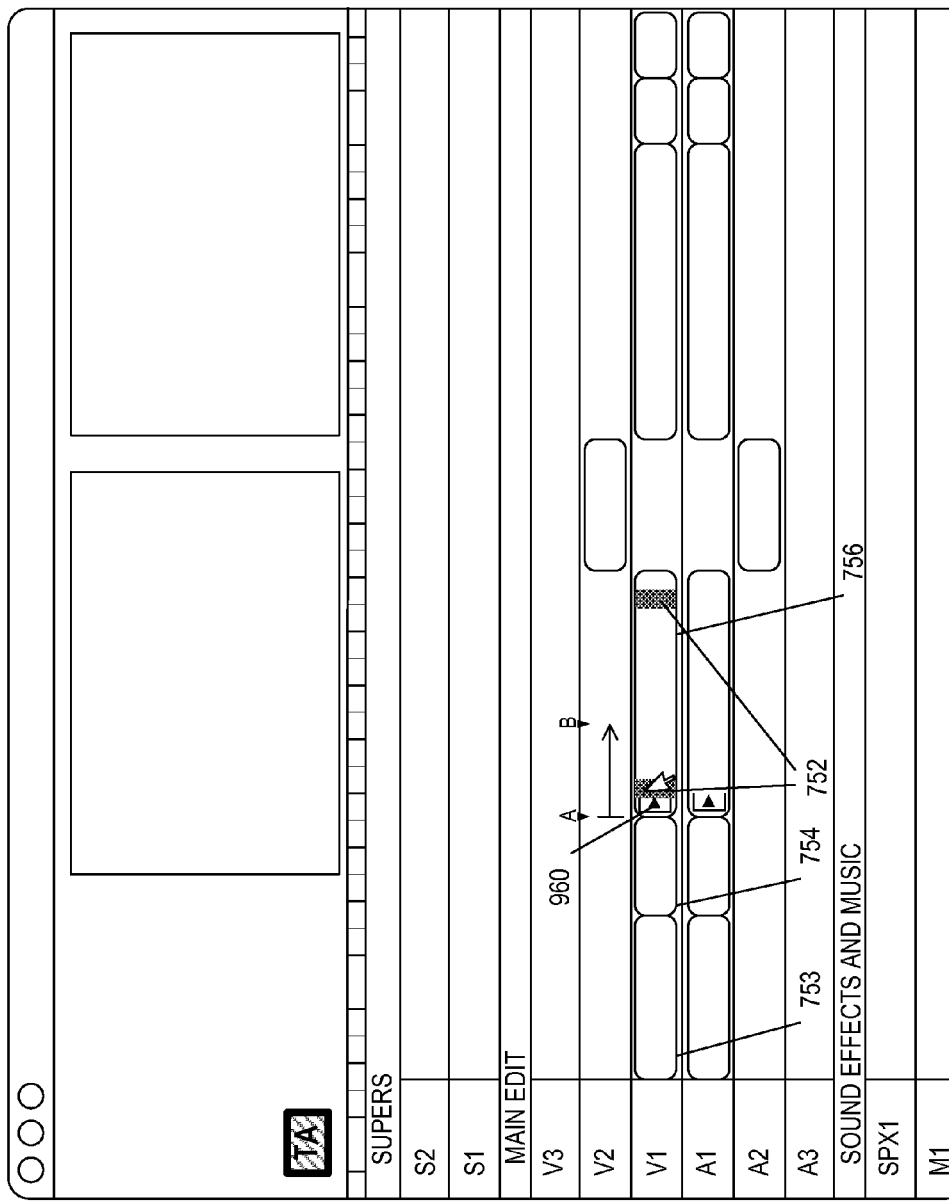
Figure 10:
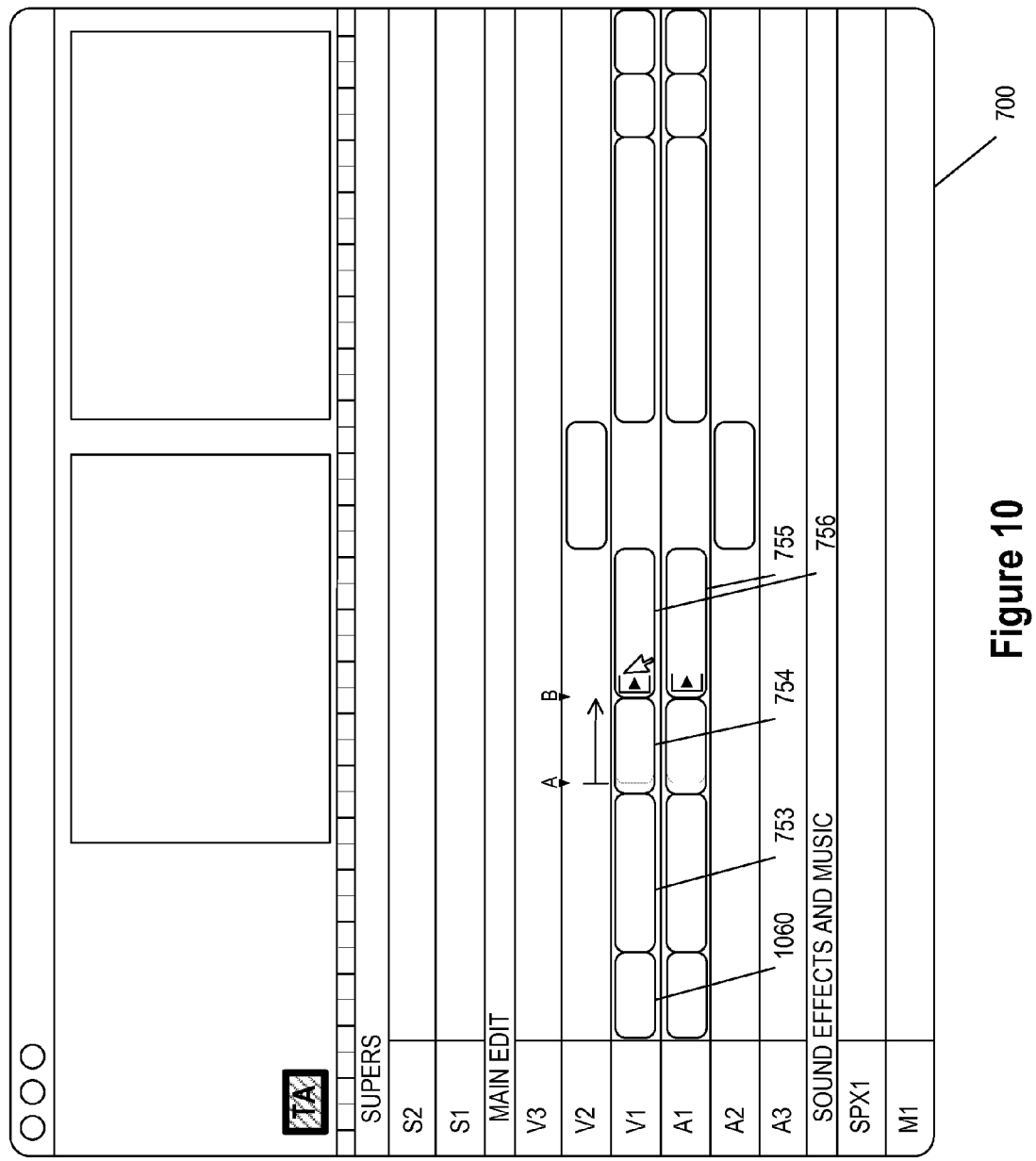

FIGS. 8-10 illustrate three stages of a user's interaction with GUI 700 to perform a ripple trim editing operation according to some embodiments of the invention. FIG. 8 illustrates the stage after the consolidated trimming tool has been enabled for activation. The enablement of this tool is indicated through the highlighting of the tool active indicator 730. FIG. 8 also illustrates zones 752 that, for some embodiments, correspond to a ripple trim editing operation, which moves a clip boundary to the left or to the right while also moving all other clips along the track to the left or right along the timeline. In some embodiments, the zones that are indicated in FIG. 8 as well as those indicated on the following GUI examples provided below, are not actually illustrated in the GUI of FIG. 8 or the other figures, but rather, are displayed in these examples to highlight their location on the clips. Other embodiments, however, might display some or all such zones to visually provide an indication of their existence to the user.

Moving a clip boundary by a ripple trim editing operation either expands or reduces the overall width of a clip shape. Expanding or reducing the overall width of a clip shape adjusts the clip content represented by the clip shape by including more or less media content from the clip shape's corresponding media file. In some embodiments, the left zone of the clip shape is associated with a ripple trim editing operation that moves the left boundary of the clip shape. Likewise, the right zone of the clip shape is associated with a ripple trim editing operation that moves the right boundary of the clip shape.

FIG. 9 illustrates the stage where the consolidated trimming tool, based on detecting the cursor within the left zone of zones 752, automatically presents a ripple trim editing operation for selection and activation. According to some embodiments, presenting the ripple trim editing operation includes displaying a graphical symbol corresponding to the ripple trim near or at the location where the editing operation is to be applied. As shown in FIG. 9, ripple trim indicator 960 is presented near the left boundary of clip 756 when the user-controlled cursor is detected within the left zone of zones 752.

FIG. 10 illustrates the stage after the ripple trim editing operation has been applied to clip shape 756. FIG. 10 illustrates clip shape 756 being made smaller when the left boundary is rippled from point A to point B. The ripple trim editing operation as shown in FIG. 10 shortens the content of clip shape 756 by removing the content that was previously represented by the span between point A and point B.

Clip shape 755, which is linked to clip shape 756, is also affected by the ripple trim. In some embodiments, only the selected clip shape, and other clips shape that are linked to the selected clip shape are affected by the ripple trim editing operation. In this example, the clip shapes to the left of the clips 755-756 that are affected by the ripple trim editing operation, such as clip shapes 753 and 754, are shifted to the right by a distance equal to the span between point A and point B. As a result of the rightward shift, clip shape 1060, which was previously out of view of the composite display area, is now brought into view. In some other embodiments, all tracks are affected the ripple trim editing operation.

Figure 11:
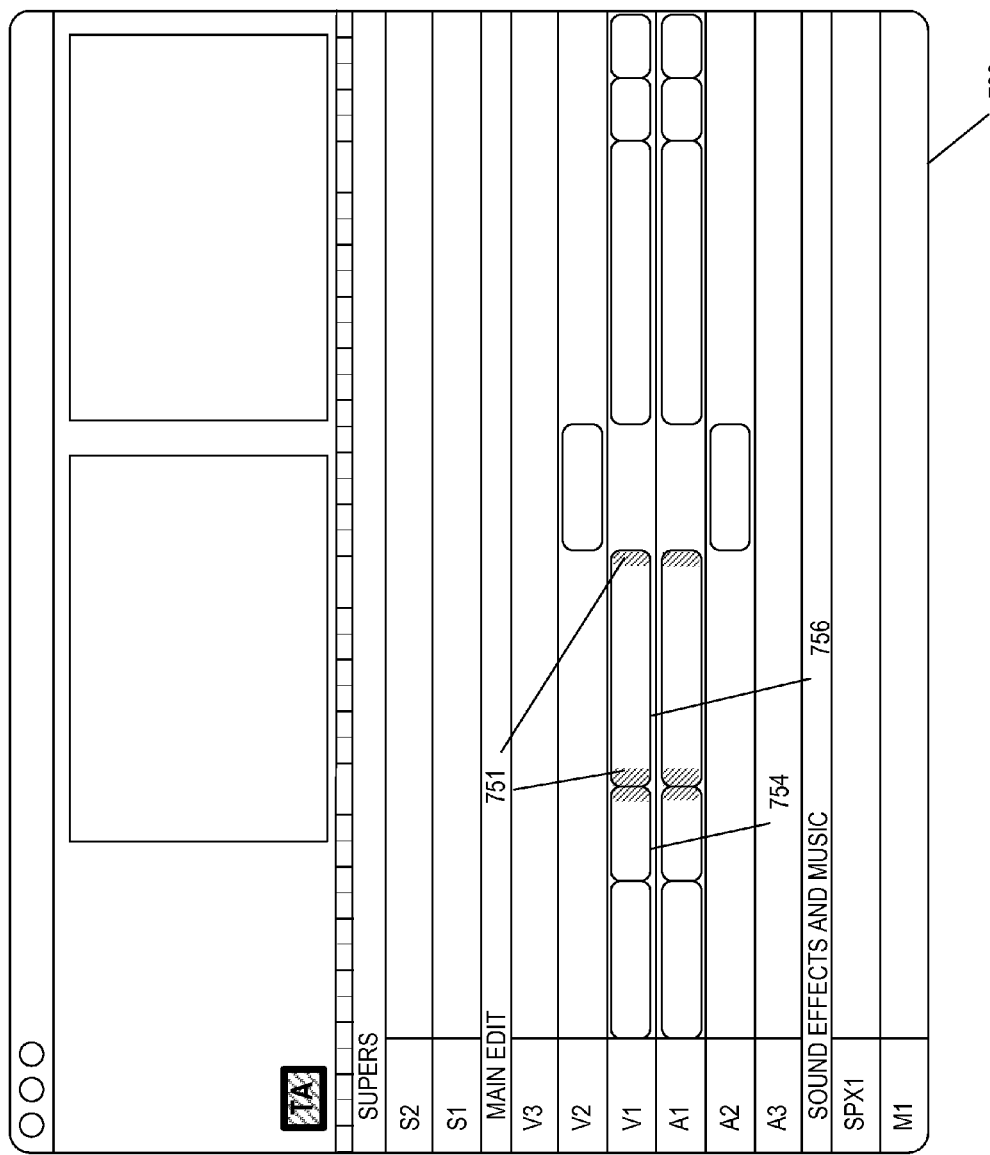
FIGS. 11-13 illustrate three stages of a user's interaction with a GUI to perform a roll trim editing operation as implemented in some embodiments of the invention.
Figure 12:
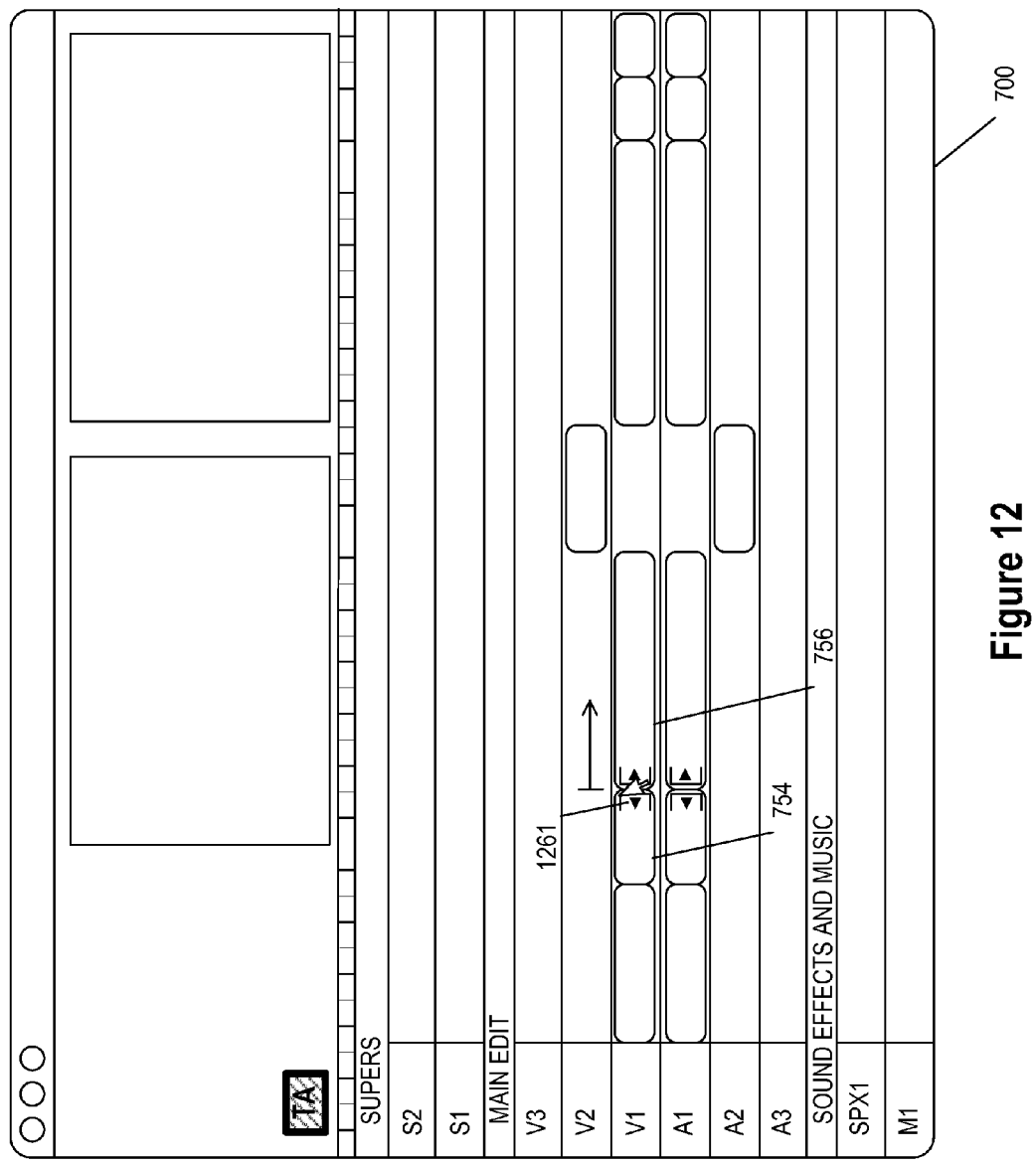
Figure 13:
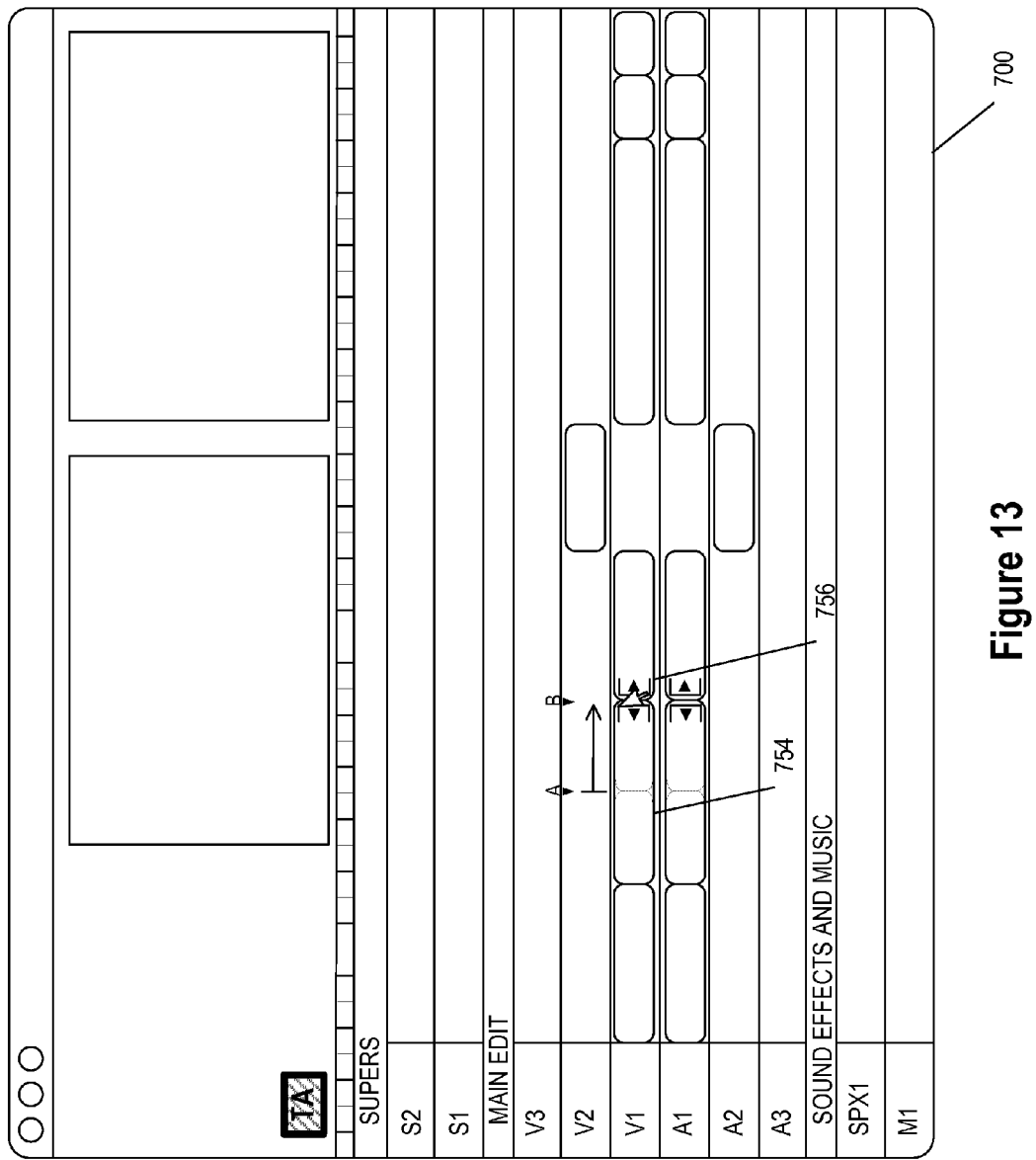

FIGS. 11-13 illustrate three stages of a user's interaction with GUI 700 to perform a roll trim editing operation according to some embodiments of the invention. FIG. 11 illustrates the stage after the consolidated trimming tool has been activated, and illustrates zone 751 as defined in these embodiments. In some embodiments of the invention, zones 751 are associated with a roll trim editing operation. A roll trim editing operation functions to move two clip boundaries simultaneously to the left or to the right. As shown in FIG. 11 the right boundary of clip shape 754 abuts the left boundary of clip shape 756. A roll trim editing operation moves the abutting boundaries simultaneously. Moving a clip boundary by a roll trim editing operation expands the overall width of one clip shape while reducing the overall width of the other clip shape in such a manner that leaves the unmoved boundaries of clip shapes 754 and 756 in fixed positions. Expanding or reducing the overall width of a clip shape adjusts the clip content represented by the clip shape by including more or less media content from the clip shape's corresponding media file.

FIG. 12 illustrates the stage where the consolidated trimming tool, based on detecting the cursor within the zones 751 as shown in FIG. 11, automatically presents a roll trim editing operation for selection and activation. According to some embodiments, presenting the roll trim editing operation includes displaying a graphical symbol corresponding to the roll trim near or at the location where the editing operation is to be applied. As shown in FIG. 12, roll trim indicator 1261 is presented at the abutting boundaries of clips 754 and 756 when the user-controlled cursor is detected within the one of the zones 751.

FIG. 13 illustrates the stage after the roll trim editing operation has been applied to clip shapes 754 and 756. FIG. 13 illustrates clip shape 754 being made larger when the left boundary of clip shape 754 is rolled from point A to point B, while clip shape 756 is made smaller when the right boundary of clip shape 756 is simultaneously rolled from point A to point B. The roll trim editing operation lengthens the content of clip shape 754 by adding more content to the end of the clip shape to fill the span between point A and point B. Simultaneously, the roll trim editing operation shortens content of clip shape 756 by removing the content that was previously represented by the span between point A and point B. The clip shapes linked to clip shapes 754 and 756 are also affected by the roll trim. The clip shapes to the left or right of the clips to which the roll trim editing operation is applied are not affected by the roll trim editing operation. That is, only the composition of the clips to which the roll trim edit is applied is affected, not the location or size of the clip shapes.

Figure 14:
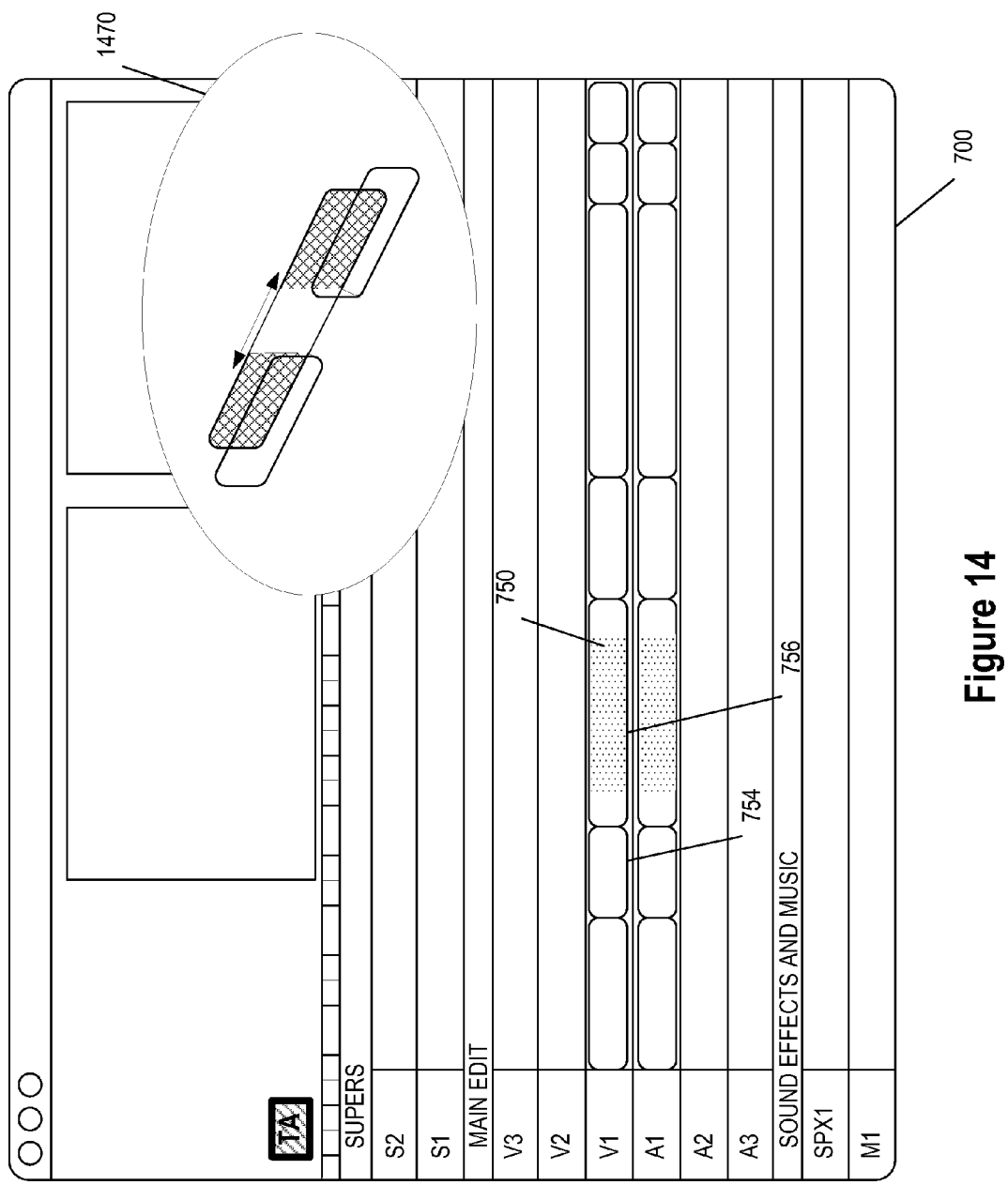
FIGS. 14-16 illustrate three stages of a user's interaction with a GUI to perform a slip trim editing operation as implemented in some embodiments of the invention.
Figure 15:
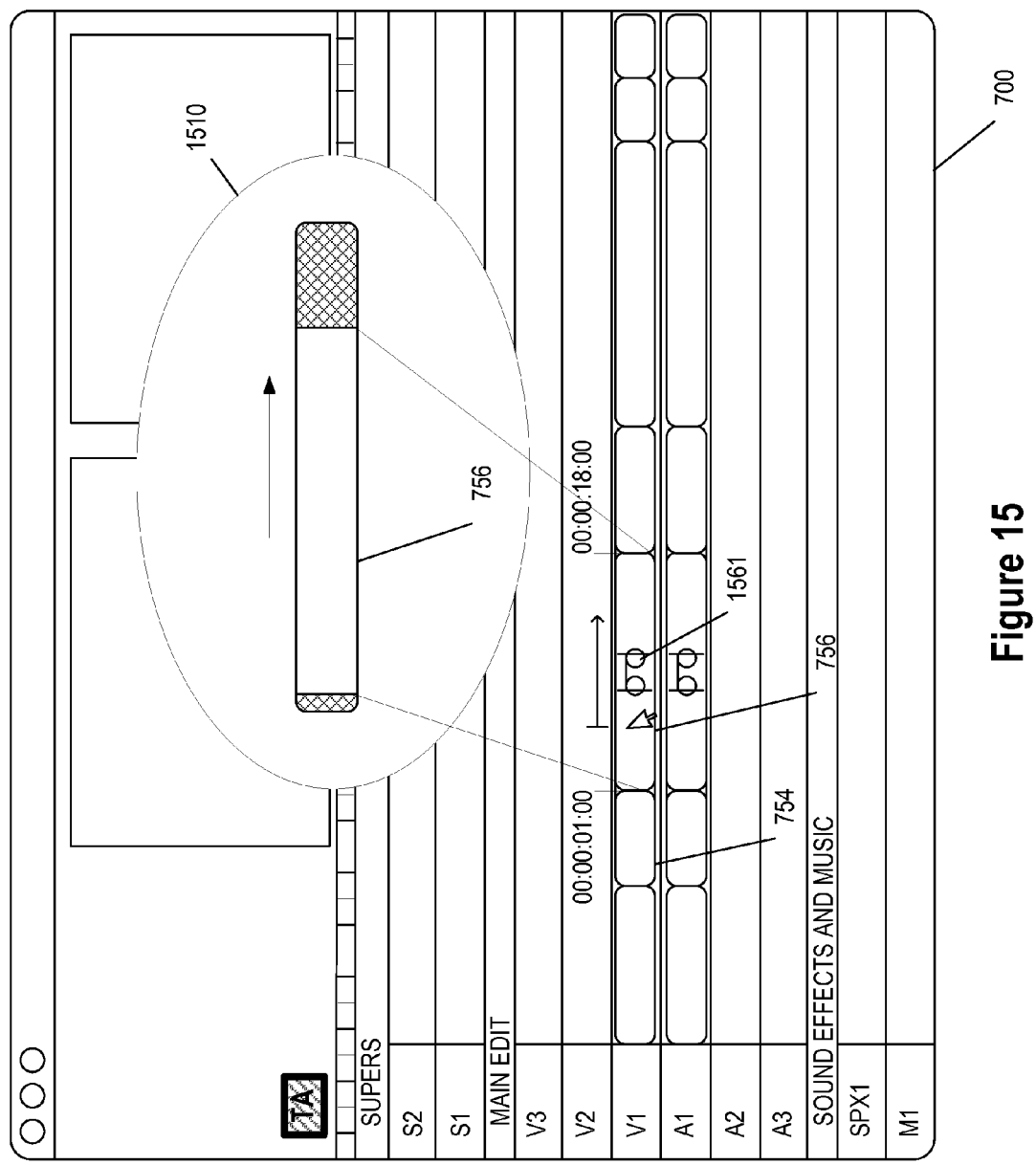
Figure 16:
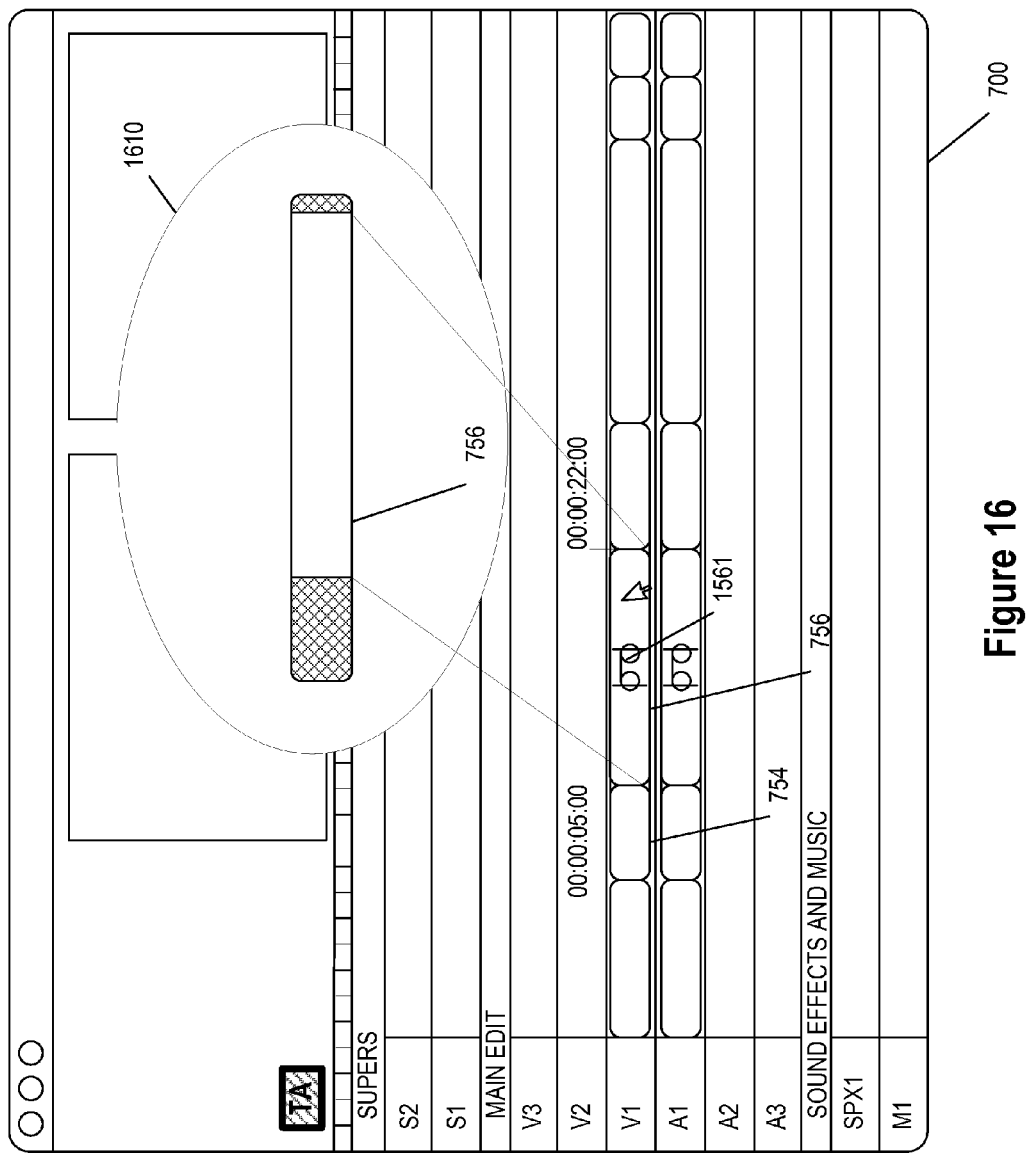

FIGS. 14-16 illustrate three stages of a user's interaction with GUI 700 to perform a slip trim editing operation according to some embodiments of the invention. FIG. 14 illustrates the stage after the consolidated trimming tool has been activated, and illustrates zone 750 as defined in these embodiments. In some embodiments of the invention, zone 750 is associated with a slip trim editing operation. In some embodiments, a keystroke may be invoked to toggle between a slip trim editing operation and a slide trim editing operation.

A slip trim editing operation functions to change the content of that is included in the clip represented by clip shape 756 without changing duration of the clip. Accordingly, the length of the clip shape does not change when a slip trim editing operation is performed. Conceptually, as shown in inset illustration 1470, when a slip trim editing operation is performed, media content from the source media is shifted earlier or later along the timeline, and the adjacent clip shapes form a fixed window through which the content from the slipped clip is visible.

FIG. 15 illustrates the stage where the consolidated trimming tool, based on detecting the cursor within zone 750, automatically presents a slip trim editing operation for selection and activation. FIG. 15 also includes inset illustration 1510, which shows that clip shape 756 is positioned near the beginning of the media source for clip shape 756.

According to some embodiments, presenting the slip trim editing operation includes displaying a graphical symbol corresponding to the slip trim editing operation inside the clip shape where the editing operation is to be applied. As shown in FIG. 15, slip trim indicator 1561 is presented when the user-controlled cursor is detected within zone 750.

Also shown in FIG. 15 is the timecode "00:00:01:00" indicating the start of the content, and timecode "00:00:18:00" indicating the end of the content that is included in the clip represented by clip shape 756. In some embodiments, these timecodes are displayed in the composite display area when a slip trim editing operation is being performed. In some other embodiments, the timecodes are not displayed, and some other feedback mechanism is employed to provide the user with an indication of the content at the start and the end of the clip. Other feedback includes displaying, in a video display, the frames that correspond to the start and the end of the clip.

FIG. 16 illustrates the stage after the slip trim editing operation has been applied to clip shape 756. Clip shape 756, as shown in inset illustration 1610, is now shown to have moved rightward, and is positioned near the end of the media source for clip shape 756.

FIG. 16 also illustrates each of the timecodes for clip shape 756 advancing by four seconds to "00:00:5:00" and "00:00:22:00" respectively, which indicates that the content included in the clip has conceptually moved leftward by a length representing four seconds along a timeline. No clip shapes are affected by the slip trim editing operation.

Figure 17:
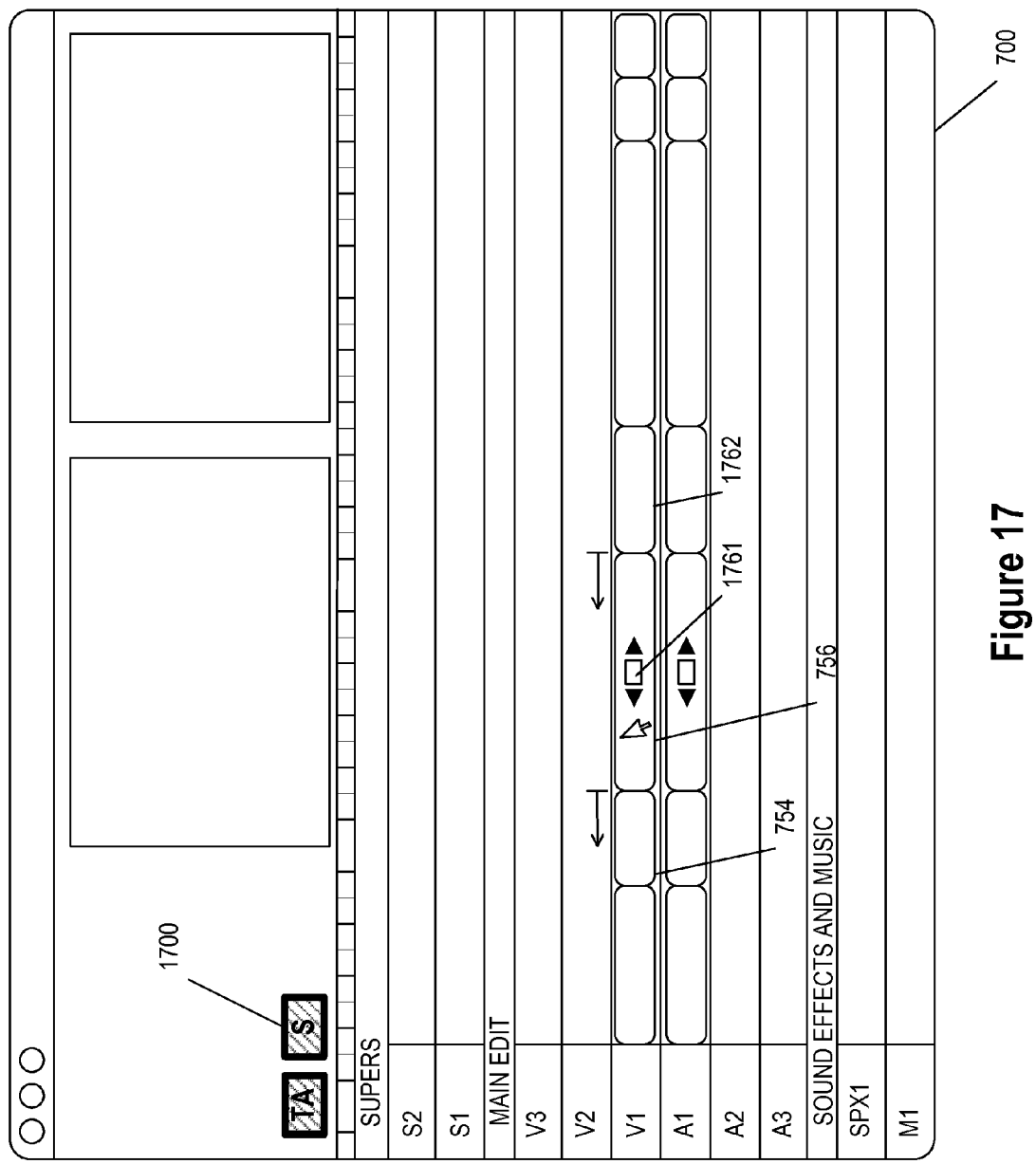
FIGS. 17-18 illustrate three stages of a user's interaction with a GUI to perform a slide trim editing operation as implemented in some embodiments of the invention.
Figure 18:
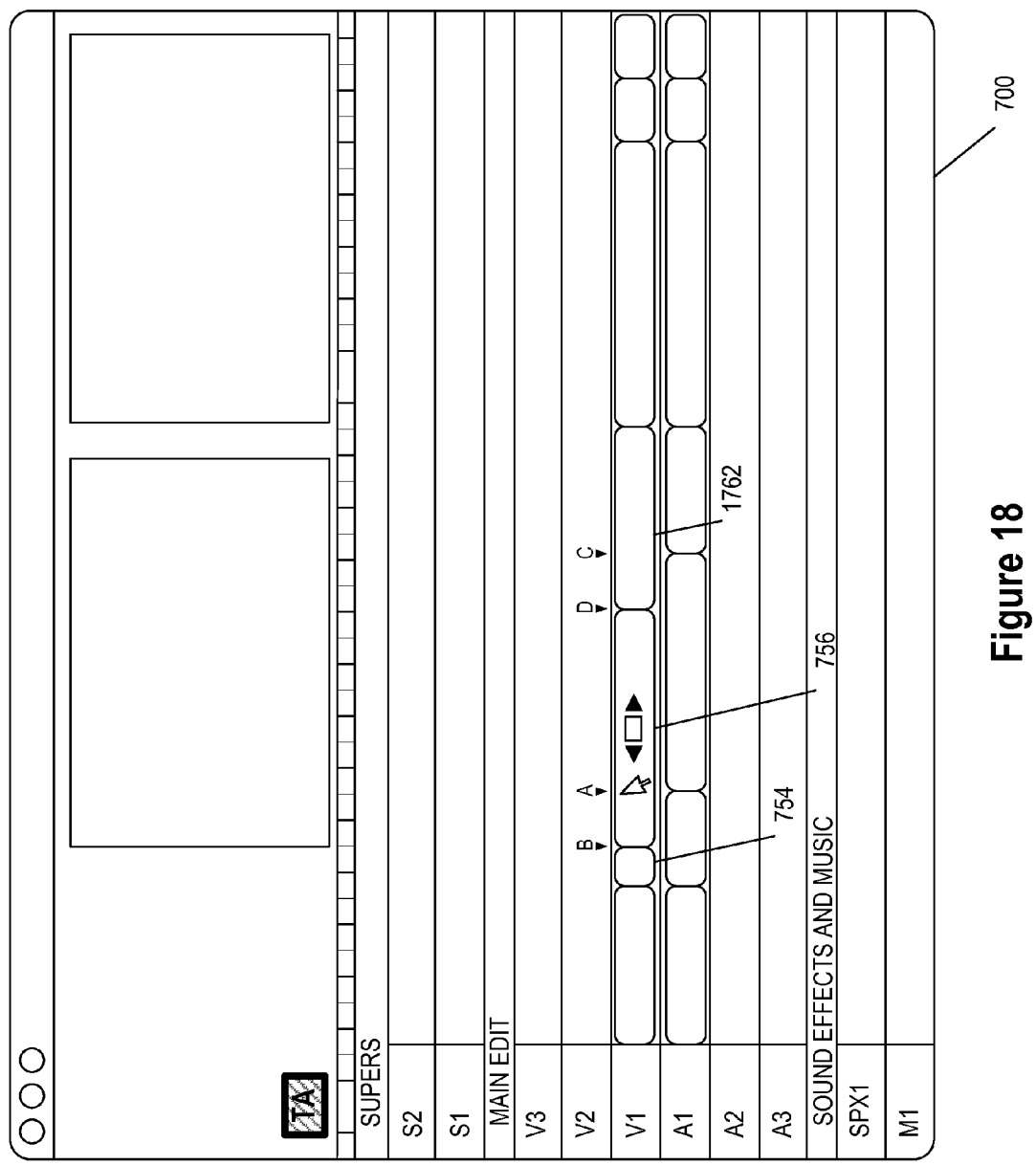

FIGS. 17-18 illustrate two stages of a user's interaction with GUI 700 to perform a slide trim editing operation according to some embodiments of the invention. As mentioned above, in some embodiments of the invention, zone 750 is also associated with a slide trim editing operation in addition to a slip trim editing operation. In the example as shown in FIGS. 14, 15, 16, a slip trim editing operation is the default editing operation that is presented for zone 750. In such situations, some embodiments allow the user to invoke an override command to direct the application to present the slide trim editing operation instead of the slip trim editing operation, to be automatically presented when the user-controlled cursor is detected within zone 750, or to be presented at the cursor location after the slip trim editing operation has first been presented In other embodiments of the invention, the slide trim editing operation is automatically presented first, and invoking an override command causes the slip trim editing operation to be presented.

FIG. 17 illustrates the stage after the consolidated trimming tool has been activated, and after the slip trim editing operation, automatically presented as shown in FIG. 15, is overridden by a slide trim editing operation. Override UI item 1700, as shown in FIG. 17, is a conceptual illustration for an indication that the application would provide to highlight the user's selection of the override functionality. Different embodiments implement the override command differently. Examples of such implementations for the override command include a keystroke, a selection in a pop-up menu, etc. While override UI item 1700 is shown as a visible graphical UI item in GUI 700, it is understood that in some embodiments, override UI item 1700 is not visible in a GUI.

A slide trim editing operation functions to shorten one clip shape 754 and to lengthen another clip shape 1762 simultaneously by moving to the left or to the right clip shape 756, which is in between clip shape 754 and clip shape 1762. As a clip is slid in a slide trim editing operation, the slid clip covers up a portion of clip shape 754, while unveiling a portion of clip shape 1762. When a slide trim editing operation is performed, clip shape 756 is conceptually sliding over the top of clip shapes 754 and 1762.

As shown in FIG. 17, according to some embodiments, presenting the slide trim editing operation includes displaying a graphical symbol corresponding to the slide trim operation inside the clip shape where the editing operation is to be applied. As shown in FIG. 17, slide trim indicator 1761 is presented when the user-controlled cursor is detected within zone 750.

FIG. 18 illustrates the stage after the slide trim editing operation has been applied by sliding clip shape 756. FIG. 18 illustrates clip shape 754 being made smaller when the left boundary abutting clip shape 756 is moved from point A to point B, while clip shape 1762 is made larger when the right boundary abutting clip shape 756 is simultaneously moved from point C to point D. The slide trim editing operation shortens the content associated with of clip shape 754 by removing content that was previously represented by the span between point A and point B. Simultaneously, the slide trim editing operation lengthens the content associated with clip shape 1762 by adding more content to the beginning of the clip shape to fill the span between point C and point D. The clip shapes to the left or right of the clips shapes 754 and 1762 are not affected by the slide trim editing operation.

B. Process for Automatic Presentation of Editing Operations for Selection

Figure 19:
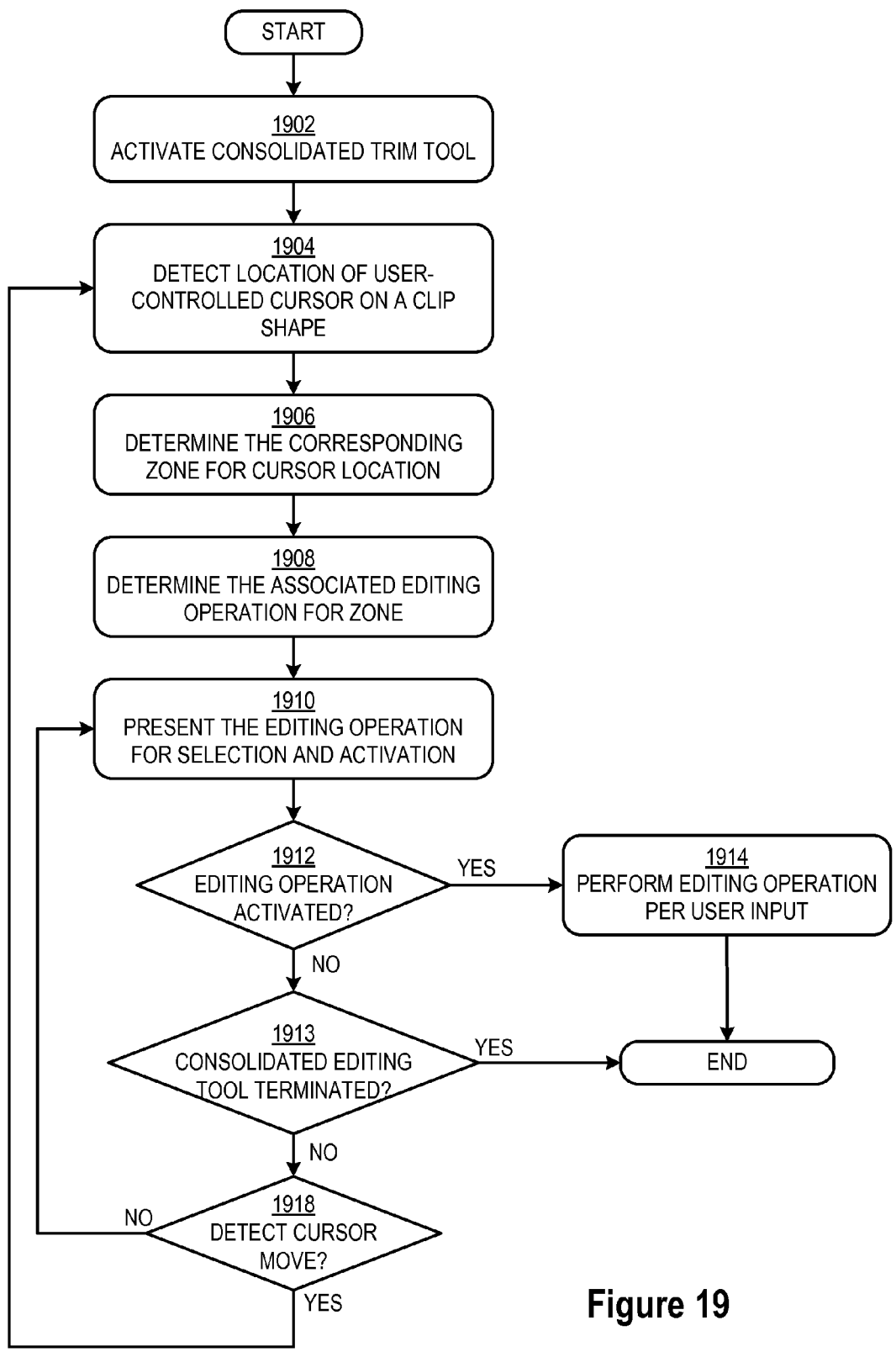
FIG. 19 illustrates an example of a conceptual machine-executed process that provides a consolidated editing tool that automatically presents an associated editing operation for selection and activation based on the cursor location as implemented in some embodiments of the invention.

FIG. 19 illustrates an example of a conceptual machine-executed process that provides a consolidated trimming tool that (1) detects the location of a user-controlled cursor on or near a clip shape inside the composite display area, and (2) based on the location, automatically presents an associated editing operation from a set of multiple editing operations for selection and activation near the cursor location. The process is a conceptual representation of the operations that are performed in operating the consolidating trimming tool. The specific operations of the process may not be performed in the exact order described. The specific operations may not be performed one continuous series of operations. Different specific operations may be performed in different embodiments. Furthermore, the process could be implemented using several sub-processes, or as part of a larger macro-process.

The process starts when a request is received to activate a consolidated trimming tool. The request to activate the consolidated trimming tool may be received in various ways. For example, the request can be received through the tool-activate UI item 330 as described with reference to FIG. 3. In some embodiments, ways of receiving a request through the tool-activate UI item 330 includes receiving a click event on a trimming tool UI button, receiving a command through a pull-down or a drop-down menu, or receiving one or more keystroke operations that correspond to a trimming tool activation command. In other embodiments, the request is received by a combination of two or more of such ways.

After the request is received, the process activates (at 1902) the consolidated trimming tool. In some embodiments, the consolidated trimming tool remains activated until another request is received to deactivate the consolidated trimming tool. In other embodiments, the consolidated trimming tool remains activated until another tool is activated. In still other embodiments, the consolidated trimming tool is deactivated after an editing operation is performed.

Once the consolidated trimming tool is activated, the process detects (at 1904) the location of the user-controlled cursor on a clip shape. The process then determines (at 1906) the associated zone for the cursor location that was detected.

As described above in reference to FIG. 3, zones may be established so that the consolidated trimming tool will present the editing operation that a user would likely desire to choose for the cursor location. The sizes of the zones can be dependent on the size of a clip shape in the composite display area, as described above in reference to FIG. 7. Also as described above in reference to FIG. 7, another process may be simultaneously executed that controls the availability of certain zones depending on the size of the clip shapes currently displayed in the composite display area.

Then, based on the zone that is associated with the location where the user-controlled cursor is detected, the process determines (at 1908) the associated editing operation for the zone. As described above in reference to FIGS. 8-18, different embodiments of the invention have different associated editing operations for the zones. In some embodiments, zones are established that are associated uniquely with a ripple trim editing operation, or with a roll trim editing operation. Some embodiments establish shared zones, where a default editing operation, such as a slip trim editing operation, is determined (at 1908) for the zone, and where receiving a keystroke operation causes another editing operation, such as a slide trim editing operation, to be determined for the zone.

The process presents (at 1910) the associated editing operation for selection and activation by the user. As described above in reference to FIGS. 8-18, in some embodiments, a graphical symbol that represents the editing operation is displayed near location where the editing operation will be applied, such as at a clip shape boundary or on a clip shape. In some other embodiments, the graphical symbol is unique to each of the particular editing operation. In other embodiments, the graphical symbol is generic to the consolidated trimming tool. In still other embodiments, different editing operations may share the same graphical symbol.

After the process presents (at 1910) the editing operation for selection and activation by the user, the process waits for the user to select and activate the editing operation. The process determines (at 1912) whether the editing operation is activated. If the editing operation is activated, the process performs (at 1914) the editing operation according to user input received through a user interface. The process terminates when the editing operation has ended according to user input received through a user interface.

If the editing operation is not activated, the process determines (at 1913) whether the editing operation has been deactivated. If so, the process ends. Otherwise, the process determines (at 1918) whether the user-controlled cursor has been moved. If the cursor has been moved, the process loops back to 1904 to detect the new location of the user-controlled cursor. If the cursor has not been moved, the process loops back to 1910 to continue presenting the editing operation for selection and activation.

While the process of providing a consolidated trimming tool that (1) detects the location of a user-controlled cursor on or near a clip shape inside the composite display area, and (2) based on the location, automatically presents an associated editing operation from a set of multiple editing operations for selection and activation near the cursor location has been described with reference to certain features and actions, one of ordinary skill in the art will recognize that the process may be implemented using other specific embodiments without departing from the spirit of the invention. For instance, the process may be executed on a device with a touch-screen interface, and may detect (at 1904) a location of a touch event instead of a location of a user-controlled cursor. In addition, some potential operations have been omitted for clarity. For instance, if the zoom level is changed while the consolidated trimming tool is activated, zones may change, or may become unavailable as described in reference to FIG. 7. If the process has presented (at 1910) an editing operation that becomes changed or unavailable due to a change in clip shape size, the process determines (at 1906) a new corresponding zone for the cursor location, determines (at 1908) the associated editing operation for the updated corresponding zone, and presents (1910) the updated editing operation for selection and activation.

C. Special Case: Small Clip Keystroke Override

Figure 20:
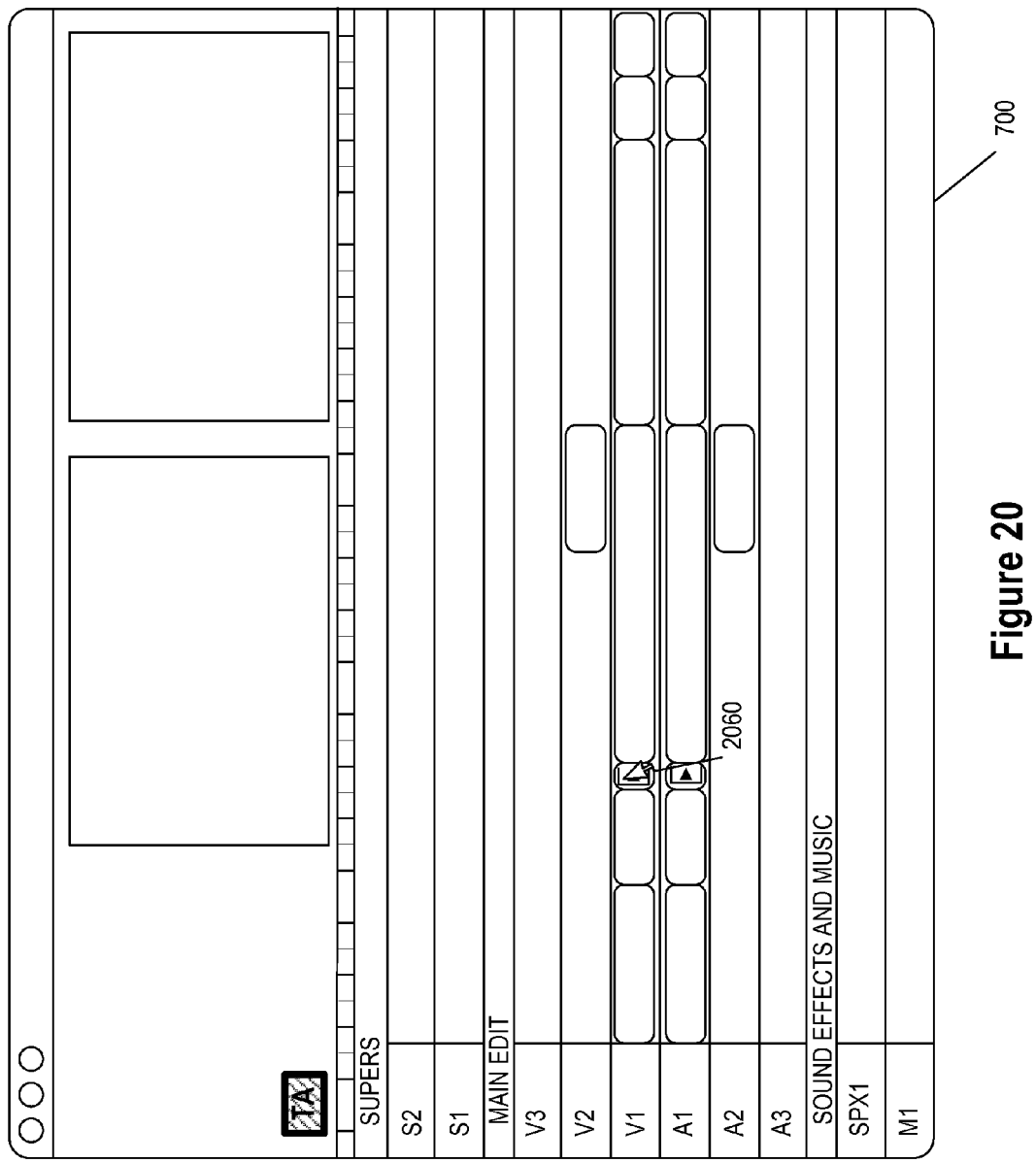
FIGS. 20-21 illustrate two stages of a user's interaction with a GUI to perform a slip or slide trim editing operation when a clip shape is considerably narrowed as implemented in some embodiments of the invention.
Figure 21:
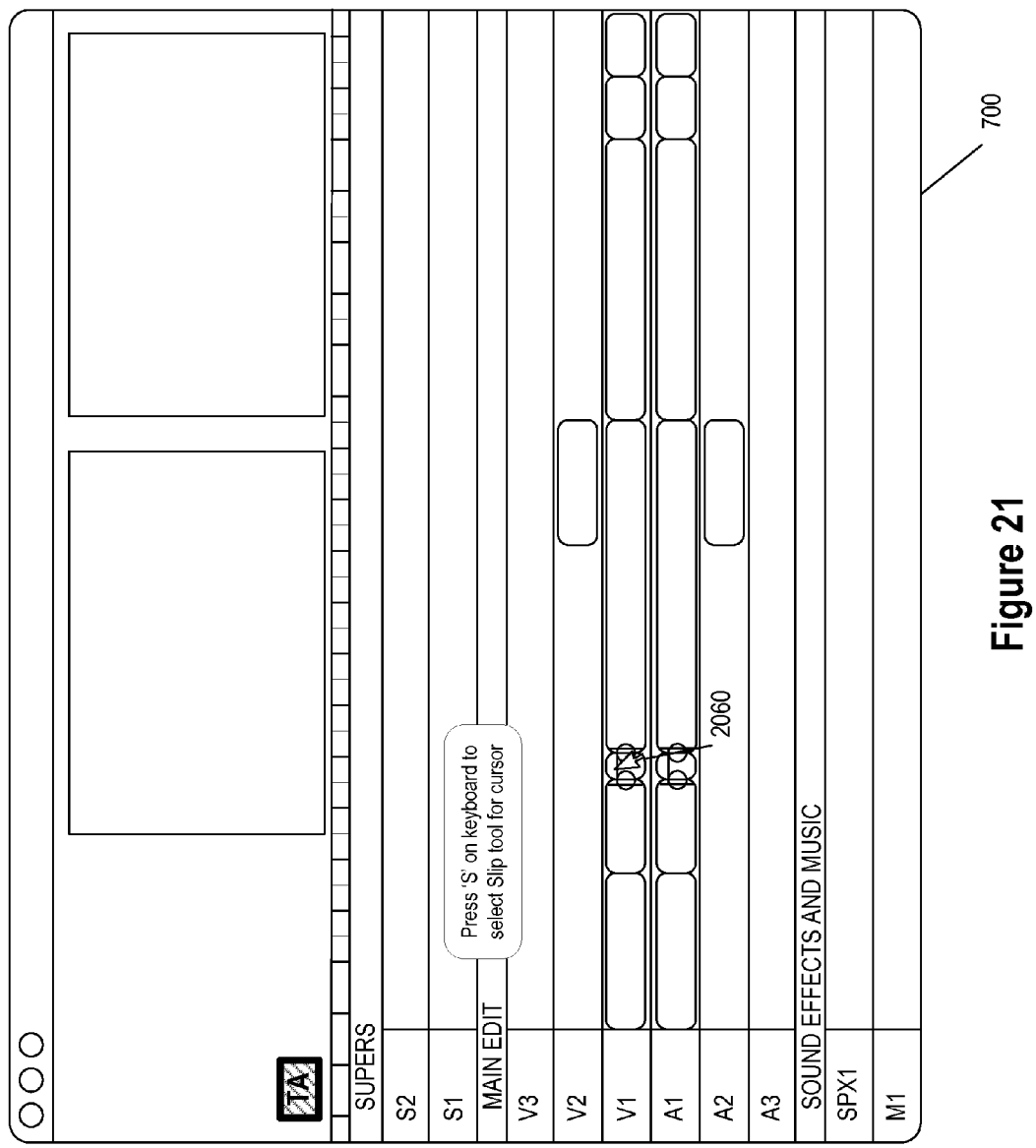

As briefly discussed in reference to FIG. 7, the sizes of zones 750-752 may depend on the size of a particular clip shape, and may be adjusted when the length of a clip changes. For some embodiments, the zones are assigned an order of priority such that a zone may "disappear" from the clip shape if the clip shape is too narrow. FIGS. 20-21 illustrate two stages of a user's interaction with GUI 700 to perform a slip or slide trim editing operation when a clip shape is considerably narrowed.

FIG. 20 illustrates the stage after the consolidated trimming tool has been activated, and after the consolidated trimming tool automatically presents a ripple trim editing operation for selection based on detecting that the cursor is located inside clip shape 2060. In this example, automatically presenting a ripple trim editing operation includes displaying a graphical symbol corresponding to the ripple trim editing operation.

For some embodiments, as shown FIG. 20, clip shape 2060 has a small width, for example, a total width of four pixels. In these embodiments, clip shapes are not divided into different zones when further division would produce zones that are too small to be suitable for practical use. The size at which a clip shape is not divided can be different among different embodiments. For some embodiments, when the clip shape is below the threshold size, the consolidated trimming tool defines the entire length of the clip shape as a single zone that is associated with a default editing operation. In some embodiments of the invention, the default editing operation is a ripple trim editing operation.

For some embodiments, an overriding command is invoked to present an editing operation other than the default editing operation. FIG. 21 illustrates the stage where the consolidated trimming tool receives a keystroke that overrides the previous automatically presented ripple trim editing operation, and instead presents a slip trim editing operation for activation and selection. For some embodiments, different overriding keystrokes are associated with different particular editing operations. A single overriding keystroke may also cause the consolidated trimming tool to iterate through some or all the available editing operations. For example, after the consolidated trimming tool first presents a ripple trim editing operation for selection and activation, a user presses 'S' on a keyboard to cause a slip trim editing operation to be presented, or presses the 'TAB' key multiple times to iterate through the available editing operations.

Figure 22:
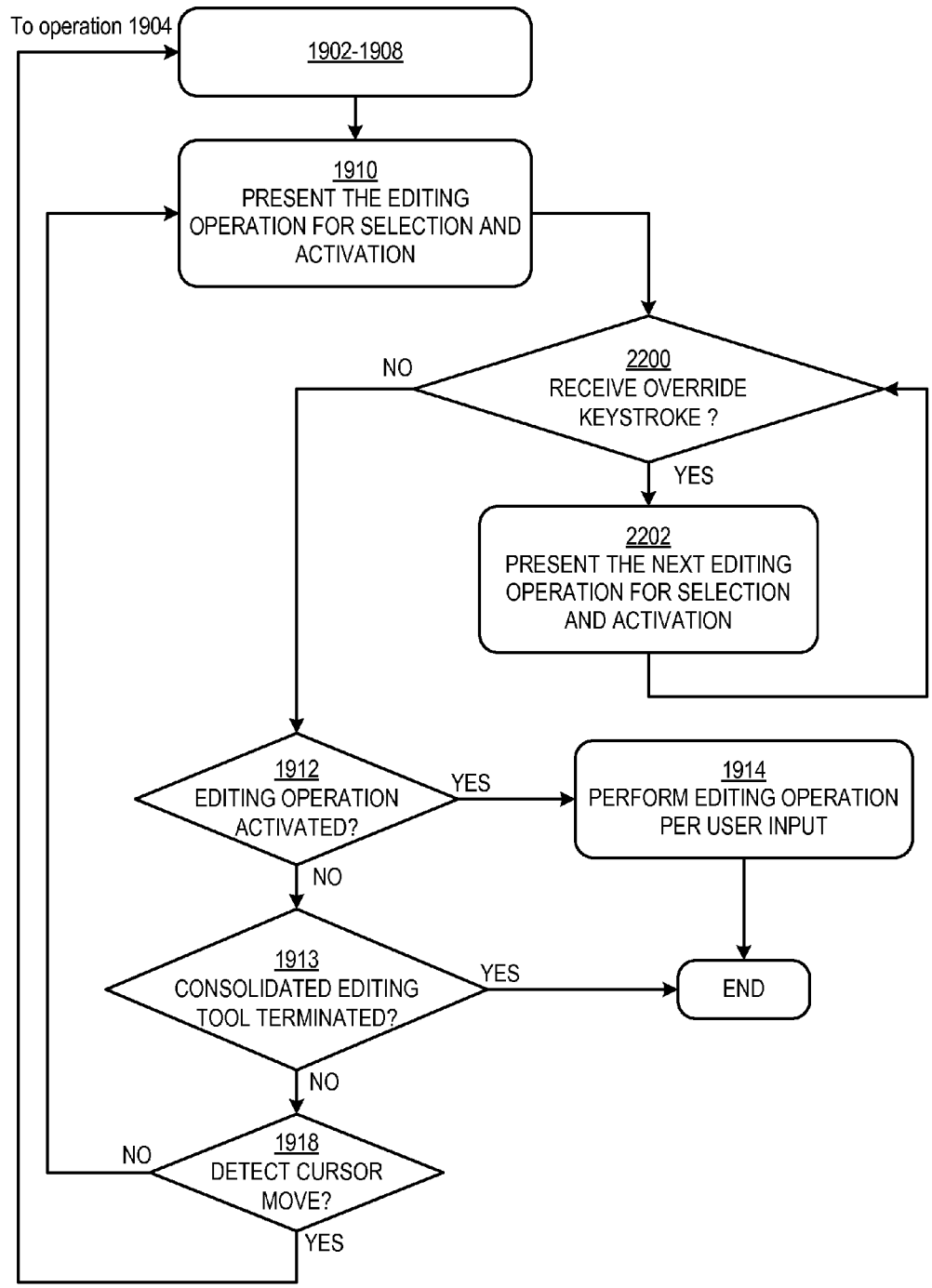
FIG. 22 illustrates an example of a conceptual machine-executed process that provides a consolidated editing tool that provides the features discussed in reference to FIGS. 20-21.

FIG. 22 illustrates an example of a conceptual machine-executed process that provides a consolidated trimming tool that provides the features discussed above in reference to FIGS. 20-21. The flow diagram as shown in FIG. 22 is a continuation of the flow diagram illustrated in FIG. 19. In the example illustrated in FIG. 22, the process executes operations 1900-1910 as described above in reference to FIG. 19. In addition, after presenting the editing operation for selection and activation, which, in the example of illustrated in FIGS. 20-21, is a default editing operation associated with the single zone for the small clip shape, the process determines (at 2200) whether an override keystroke has been received. If an override keystroke has been received, then the process presents (at 2202) a next editing operation for the user. As mentioned above, the next editing operation may be uniquely associated with a particular override keystroke, or may be an editing operation that is next in an ordered list of editing operations. After 2202, the process loops back to 2200 to determine if another override keystroke has been received. If an override keystroke is not received, then the process proceeds to 1912.

D. Multi-Track Selection

Figure 23:
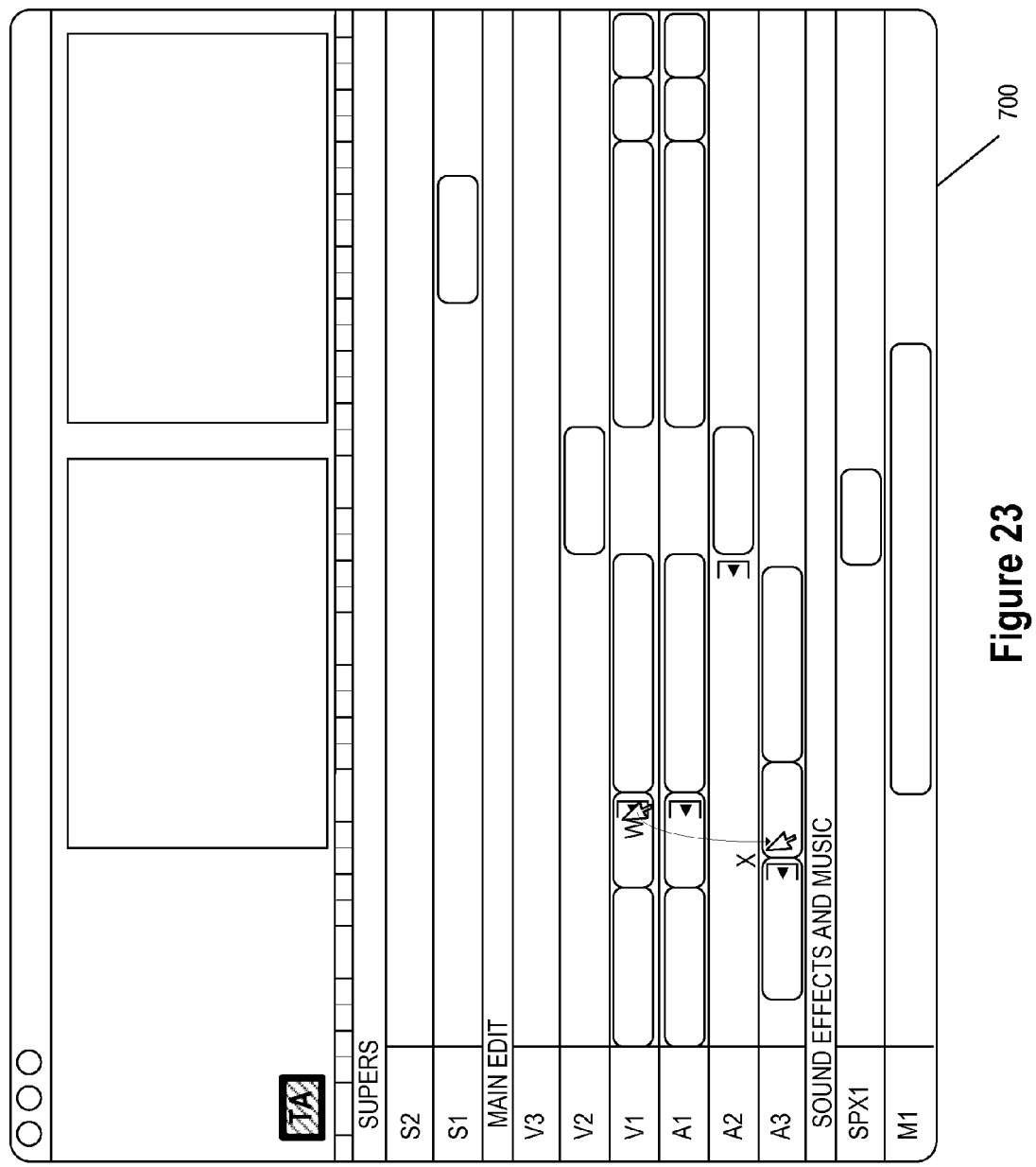
FIGS. 23-25 illustrate three stages of a user's interaction with a GUI to simultaneously apply a ripple trim or a roll trim editing operation on selected clip shapes across multiple tracks as implemented in some embodiments of the invention.
Figure 24:
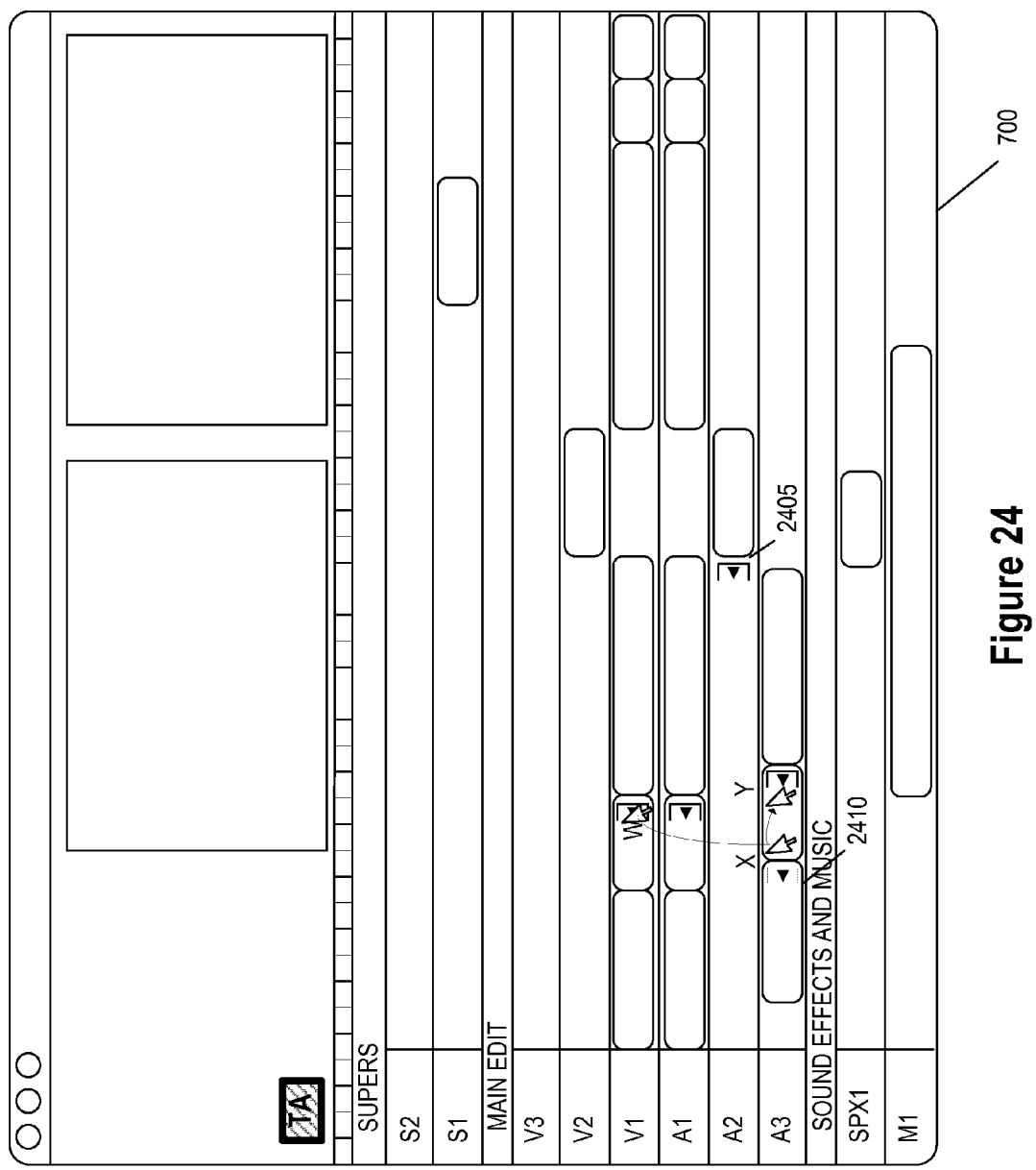
Figure 25:
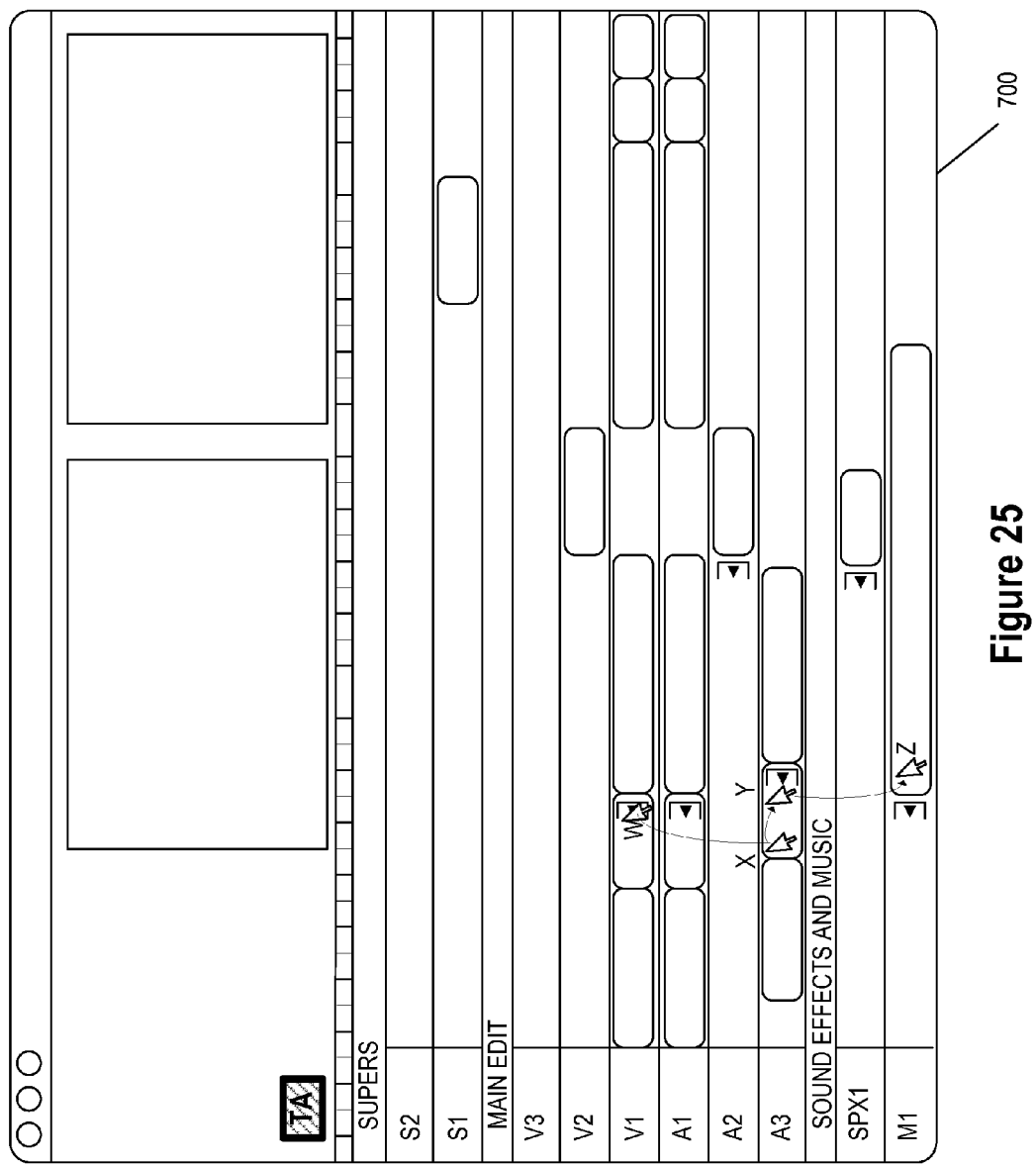

The discussion above has presented embodiments related to presenting, selecting and activating an editing operation with respect to (1) one clip shape, (2) one mutual clip boundary, or (3) more than one clip shape when the clip shapes are linked clip shapes. The following introduces some embodiments that provide a multi-track edit point selection feature that (1) detects the location of a user-controlled cursor on or near a clip shape inside the composite display area, (2) based on the location, automatically presents an associated editing operation from a set of multiple editing operations for selection and activation, (3) detects the movement of the cursor across other tracks in a composite display area, and (4) based on the location of the cursor as it moves across each track, selects a particular clip shape or clip boundary along each track at which to simultaneously apply the editing operation. FIGS. 23-25 illustrate three stages of a user's interaction with GUI 700 to simultaneously apply a ripple trim or a roll trim editing operation on selected clips across multiple tracks according to some embodiments of the invention.

FIG. 23 illustrates the first stage of one example of some embodiments after the user selects and activates an editing operation and moves the cursor from Point W to Point X. In this example, an out point ripple trim editing operation has been selected and activated as described above in reference to FIGS. 8-10. An out point refers to the end of a clip, and an out point ripple trim editing operation adds or removes content from the end of the rippled clip. Instead of selecting a ripple trim editing operation, other editing operations may be selected and activated at Point W by other approaches not described herein.

After the user has selected and activated an editing operation by applying, for example, a mouse-down operation and drag operation, the cursor is moved from Point W to Point X. As the cursor is detected moving into new tracks, the same editing operation that was selected at Point W is selected for clips in the other tracks. For example, if a user selects a roll trim editing operation at Point W, the roll trim editing operation is the operation that will be selected for the other tracks.

As the cursor is detected moving into the new tracks, the consolidated trimming tool detects the location of the cursor relative to a clip shape, and chooses the clip shape boundaries that are closest to the cursor's travel path for applying the editing operation. For some embodiments, a left clip boundary is chosen if the cursor is detected in the left half of the clip shape, and a right clip boundary is chosen if the cursor is detected in the right half of the clip shape. If the selected editing operation is not available at the chosen clip boundary (e.g., when the selected operation is an out point ripple trim edit, if there is no clip to the left of the clip which the cursor is over the left half of), then a different clip boundary is chosen in some embodiments.

Graphical symbols corresponding to the selected editing operation are displayed at the clip shape boundaries that are closest to the cursor's travel path to indicate where the editing operation is to be applied. As shown in FIG. 23, graphical symbols corresponding to out point ripple trim editing operations are displayed at the out point boundaries that are closest to the cursor's travel path from Point W to Point X. Out point boundaries can be selected even when the cursor's travel path does not cross or come near the boundary. For example, out point 2405 is selected in spite being located far from the cursor's travel path.

FIG. 24 illustrates the stage after the user has moved the cursor from Point X to Point Y. When a cursor is moved laterally within a track, the consolidated trimming tool detects the location of the cursor relative to a clip shape, and chooses a different clip shape boundary that is now close to the new travel path of the cursor for applying the editing operation. As shown in FIG. 24, as cursor moves laterally from Point X to Point Y, the graphical indicator for the out point ripple trim selection moves from clip 2410 to clip 2411.

FIG. 25 illustrates the stage after the user has moved the cursor from Point Y to Point Z, and has completed selection of the boundaries at which the editing operation is to be applied. As shown in FIG. 25, edit points are selected that are closest to the travel path, in spite of the distance between the closest edit point and the travel path. After the stage as shown in FIG. 25, the user performs a mouse-release operation, followed by a click and drag operation on any one of the graphical symbols to simultaneous perform the editing operation on the selected tracks.

The multi-track edit point selection feature allows the user fine control over which clips or edit points are selected for the editing operation, while integrating the automatic presentation of a trim tool. The cursor-path analysis also allows the user to precisely select clips without having to move the cursor to the exact location where the user desires the editing operation to be applied.

Figure 26:
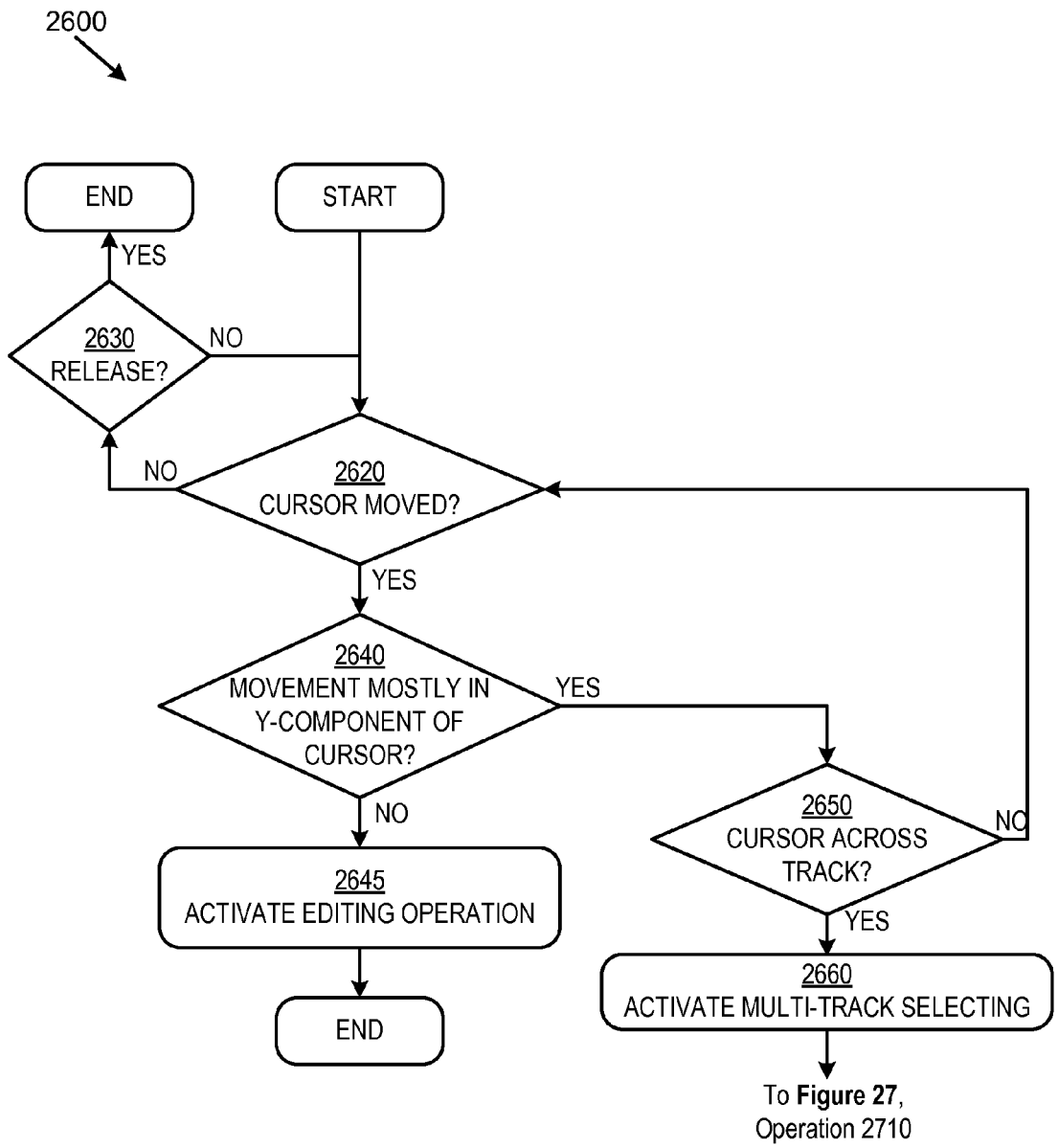
FIG. 26 illustrates an example of a conceptual machine-executed process that provides a consolidated editing tool that provides the multi-track edit point selection feature discussed above in reference to FIGS. 23-25.

FIG. 26 illustrates an example of a conceptual machine-executed process 2600 that provides a consolidated trimming tool that provides the multi-track edit point selection feature discussed above in reference to FIGS. 23-25. This multi-track edit selection operation is shown here as part of a process that also activates a trim edit operation when the user moves the cursor primarily in a horizontal direction after selecting the presented operation. Like FIG. 19, the process is a conceptual representation of the operations that are performed in operating the consolidating trimming tool. The specific operations of the process may not be performed in the exact order described. The specific operations may not be performed in one continuous series of operations. Different specific operations may be performed in different embodiments. Furthermore, the process could be implemented using several sub-processes, or as part of a larger macro-process.

The process as shown in FIG. 26 starts after the editing operation has been (1) presented for an edit point of a clip shape on a track and (2) selected by a user through a cursor click operation. The process then determines (at 2620) whether the cursor has moved. If not, the process proceeds to 2630 and determines whether the click operation has terminated. If so, the process ends. If not, the process returns to 2620.

When the process determines (at 2620) that the cursor has moved, the process transitions to 2640 to determine the primary direction of the motion. Some embodiments apply one or more thresholds to determine whether the cursor has moved (at 2620) sufficiently, and to determine (at 2640) the direction of move.

When the process detects (at 2640) that the cursor has moved mostly side-to-side (i.e., in the x-direction), the process activates (at 2645) the editing operation and then ends. On the other hand, when the process determines (at 2640) that the cursor movement is mostly in the up-down direction (i.e., in the y-direction), the process determines (at 2650) whether the cursor has crossed into another track. When the cursor has not crossed into another track, then the process proceeds back to operation 2620 to determine whether the cursor has moved. When the process has detected (at 2650) that the cursor has crossed into another track, the process activates (at 2660) the multi-track selecting process that will be described in more detail below.

Figure 27:
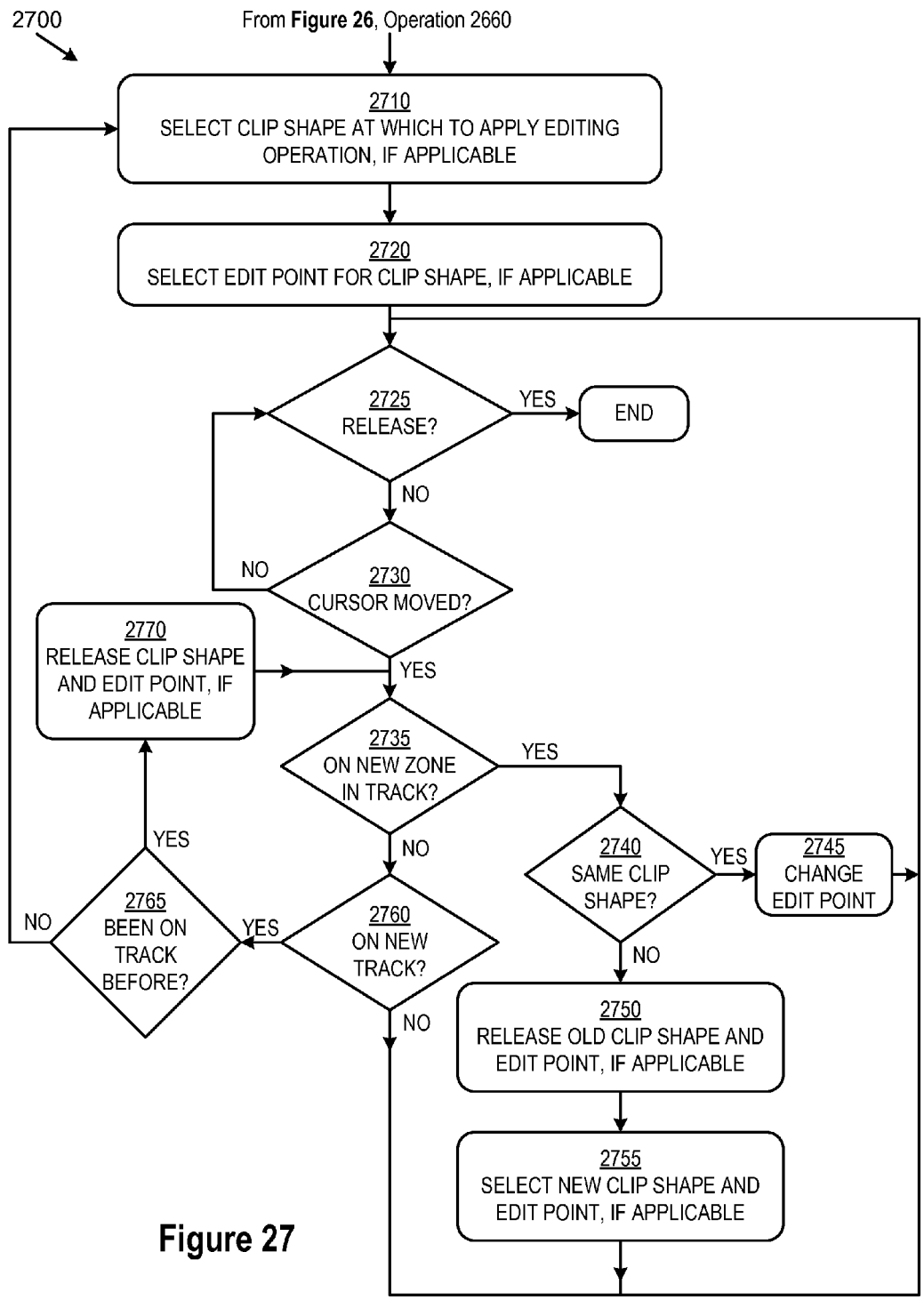
FIG. 27 illustrates an example of a conceptual machine-executed process that determines a multi-track selection for the multi-track edit point selection feature discussed above in reference to FIGS. 23-25.

FIG. 27 illustrates an example of a conceptual machine-executed process 2700 that determines a multi-track selection for the multi-track edit point selection feature discussed above in reference to FIGS. 23-25. Like FIG. 26, the process is a conceptual representation of the operations that are performed in operating the consolidating trimming tool. The specific operations of the process may not be performed in the exact order described. The specific operations may not be performed in one continuous series of operations. Different specific operations may be performed in different embodiments. Furthermore, the process could be implemented using several sub-processes, or as part of a larger macro-process.

The process as shown in FIG. 27 starts when multi-track selecting is activated (at 2660) by process 2600. The process 2700 selects (at 2710) a clip shape to which it should apply the selected editing operation, if applicable. The clip shape selected (at 2710) is added to a list of active clip shapes. This list keeps the inventory of all clip shapes that the user selects during the multi-track selection operation. Next, the process selects (at 2720) an edit point for the clip shape, if applicable. When an edit point is selected, the selected edit point will be added to a list of active selected edit points.

The process then determines (at 2725) whether the editing operation has been released (e.g., through a click-release operation), and, if so, the process ends. When the process determines (at 2725) that the editing operation has not been released, the process determines (at 2730) whether the cursor has moved. When the process determines (at 2730) that the cursor has not moved, the process returns to operation 2725 to determine whether the editing operation has been released. Thus, operations 2725-2730 are repeated until the process determines (at 2725) that the editing operation has been released, or the process determines (at 2730) that the cursor has moved.

When the process determines (at 2730) that the cursor has moved, the process then determines (at 2735) whether the cursor has moved to a new zone in the current track. When the process determines (at 2735) that the cursor has moved to a new zone in the track, the process next determines (at 2740) whether the cursor is over the same clip shape. When the cursor is over the same clip shape, the process changes (at 2745) the edit point for that clip, and returns to operation 2725. When the process determines (at 2740) that the cursor is not over the same clip shape, the process releases a previously-selected clip shape and edit point, if applicable. Next, the process selects the new clip shape and edit point, if applicable (i.e., if there is a valid clip shape and edit point at the new cursor location) before returning to operation 2725.

When the process determines (at 2735) that the cursor is not in a new zone on the track, the process next determines (at 2760) whether the cursor has moved to a new track (i.e., a different track that before the cursor move). When the process determines that the cursor has not moved to a new track (i.e., the cursor has moved, but is still located in the same zone of the same track as prior to the move), the process returns to operation 2725.

When the process determines (at 2760) that the cursor has moved to a new track, the process then determines (at 2765) whether the cursor has previously been on that track. When the cursor has been on that track before, the process (at 2770) releases any previously-selected clip shape and edit point (if applicable) for the track which the cursor was over previously. Thus, for example, when a user moves the cursor from a first track to a second track (making a multi-track selection), but then moves back to the first track, any clip shape and edit point associated with the second track is released. After releasing (at 2770) any clip shape and edit point, the process returns to operation 2735 to determine whether the cursor has moved to a new zone in the previously-visited track. In some cases, multiple clip shapes and/or edit points are released.

When the process determines (at 2765) that the cursor has not been on the new track before, the process returns to operation 2710. Process 2700 continues in this manner until it determines (at 2725) that the editing operation has been released, at which point the process ends.

When the process ends, the list of selected clips and edit points specifies which clips and which edit points should receive the edit operations which will then follow. In some embodiments, the subsequent edit operation is initiated by the user performing a click-and-drag operation that performs a trim operation on the selected edit points of the selected clips. One of ordinary skill will recognize that the trim operations can be performed in response to other inputs such as a series of keystrokes, a pull-down or pop-up menu command or selection, a hotkey, etc.

While the above multi-track selection has been described with reference to trim operations, one of ordinary skill will understand that other types of editing operations may also be performed in a similar manner. Examples of such other editing operations include audio and/or video effects (e.g., cross-dissolve, etc.), color correction, etc.

The multi-point selection generated by processes such as 2600 and 2700 allows a user to select multiple edit points by passing a cursor within a certain proximity of each edit point, where the edit points may be spread across multiple clips and multiple tracks. This is in contrast to a traditional multi-point selection, where a user may select multiple edit points by selecting an area (e.g., by selecting all the edit points that are within a bounding box). When using the traditional multi-point selection, a user is not able to select individual points within the selection area while excluding other individual points within the selection area. In addition, one of ordinary skill in the art will realize that although the multi-point selection described above was described in reference to a trim edit function, some embodiments may use the multi-point selection to select multiple edit points from various clips and/or tracks for other types of edit operations.

One of ordinary skill will recognize that some embodiments may activate the trim tool differently than the manner described above in reference to FIGS. 26-27. In the process 2600, some embodiments activate a sweep selection directly by first activating an edit selection that is presented for one clip and then performing a cursor sweep to traverse several clips near their edit points. However, in other embodiments, no editing operation is selected/activated until the first edit point is selected by the cursor sweep. Thus, a user may first select an edit point which then determines the editing operation to be applied to any other edit points that are selected during the cursor sweep. In some embodiments, this would occur when the user (1) activates the trim tool (e.g., through the use of a hotkey), (2) performs a click operation on a track that does not have a clip in the vicinity of the cursor and the cursor is not near another clip on another track, and (3) then drags the cursor over clips on other tracks. In some such embodiments, the consolidated editing tool would select the edit operation for all the selected edit points of the various clips on the various tracks based on the cursor's location with respect to the first clip that the cursor passes near or over after the activation of the trim tool and the commencement of the sweep operation.

II. Presenting Multiple User-Selectable Editing Operations at Cursor Location

Figure 28:
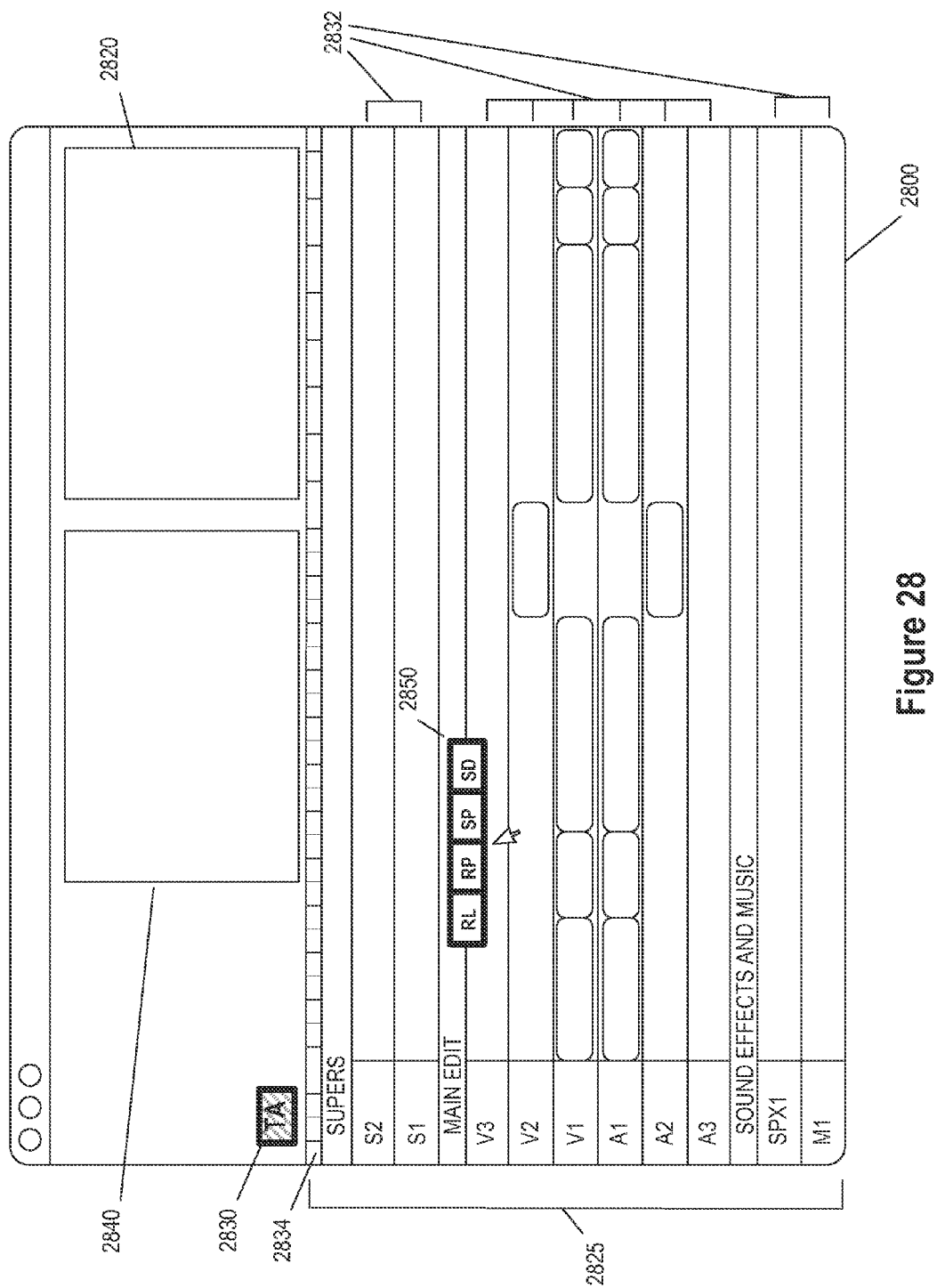
FIGS. 28-30 illustrate a more detailed example of a GUI through which the consolidated editing tool that provides multiple user-selectable editing operations simultaneously near the location where the user wishes to perform an edit as implemented in some embodiments of the invention.
Figure 29:
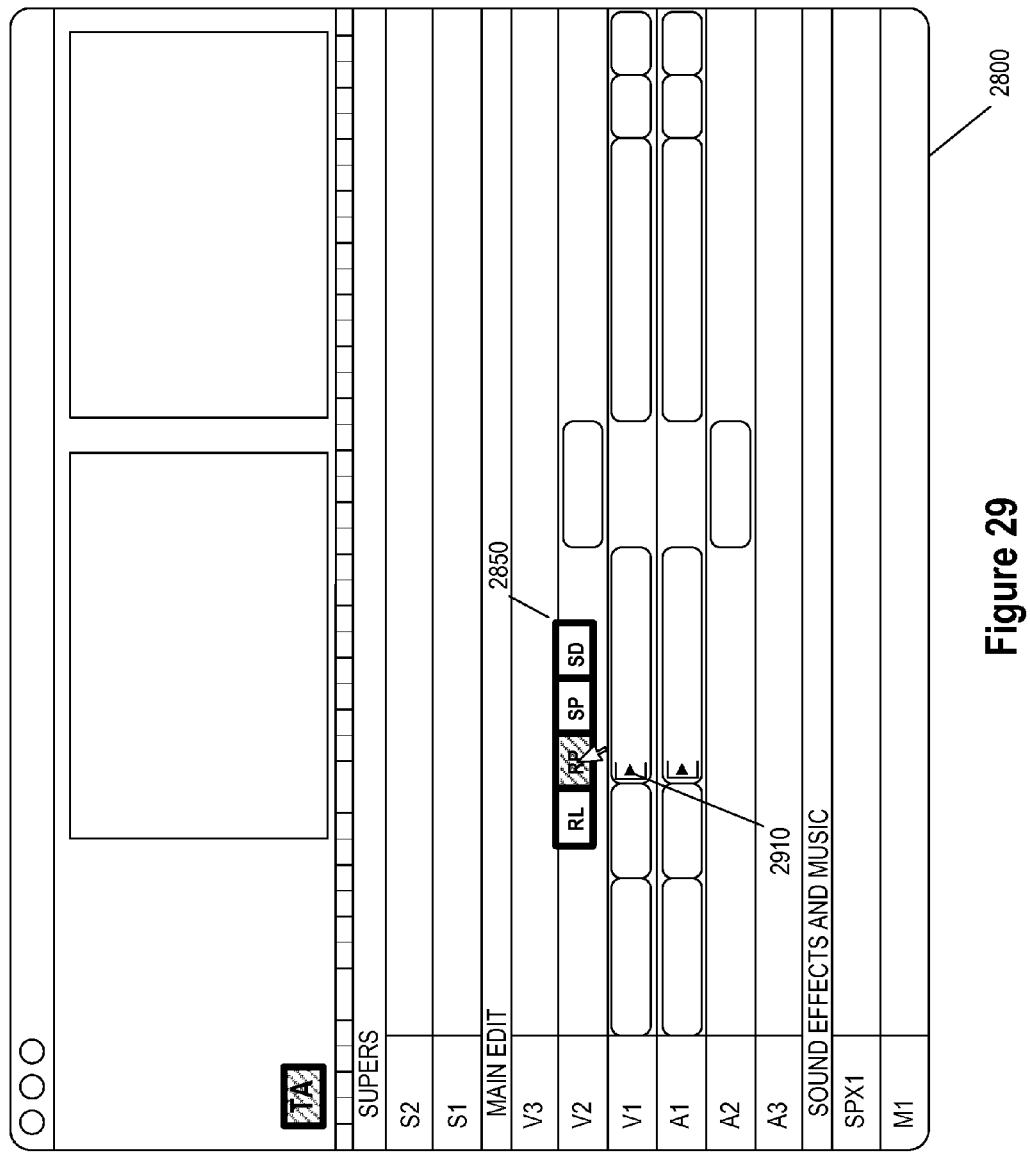
Figure 30:
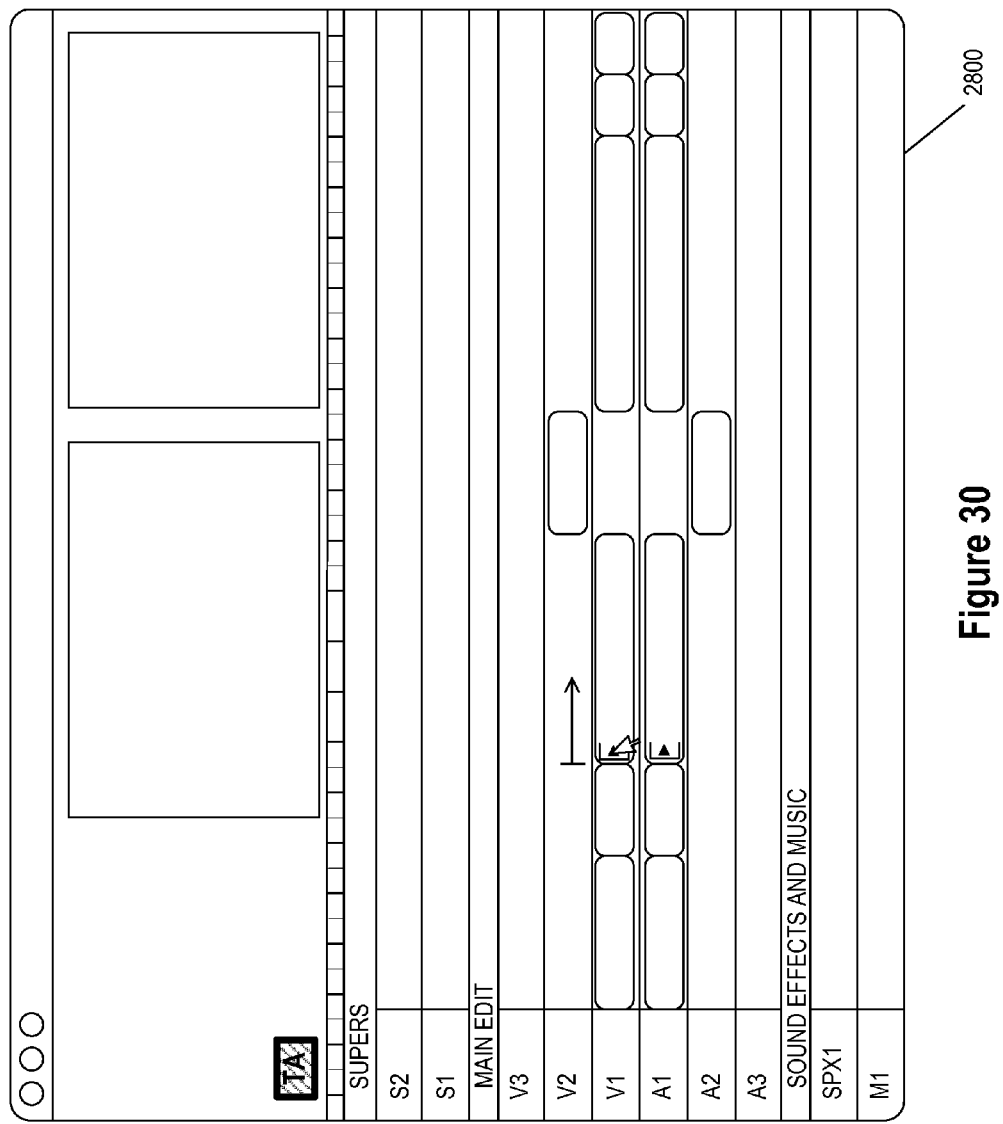

As discussed above, several embodiments provide a consolidated trimming tool that provides multiple user-selectable editing operations simultaneously near the location where the user wishes to perform an edit in order to allow the user to select one of these editing operations. FIGS. 28-30 illustrate a more detailed example of a GUI through which the consolidated trimming tool that provides multiple user-selectable editing operations simultaneously near the location where the user wishes to perform an edit.

Like GUI 600, GUI 2800 of FIG. 28 includes a preview display area 2820, a composite display area 2825 with multiple tracks 2832 that span a timeline 2834, a trimming tool UI item 2830, and user-selectable editing operations UI item 2850. FIG. 28 also illustrates GUI 2800 to include a media file display area 2840 for displaying unedited media files that are used to generate media clips. In addition, multiple tracks 2832 are labeled with track labels, and are separated into track categories, such as "Main Edit," "Supers," and "Sound Effects and Music," to help the user manage the elements of a composite presentation.

Each of multiple tracks 2832 is illustrated to hold a particular clip type. For example, tracks V1, and V2 hold video clips, and A1 and A2 hold audio clips. Certain tracks are synchronized. For example, video track V1, which holds video clips showing subjects who are speaking, are synchronized with audio track A1, which holds the audio clips corresponding to the speech of the subjects in the video clips. In this example, video track V1 and audio track A1 are also linked such that editing operations performed on one track are automatically applied to the corresponding clips on the other track.

FIGS. 28-30 illustrate three stages of a user's interaction with GUI 2800 to perform a ripple trim editing operation according to some embodiments of the invention. FIG. 28 illustrates the stage after the consolidated trimming tool has been activated, and illustrates user-selectable editing operations UI item 2850. In some embodiments of the invention, as described above in reference to FIG. 6, user-selectable editing operations UI item 2850 may be implemented as a bar of editing operations UI buttons that display all available editing operations. In some other embodiments, user-selectable editing operations UI item 2850 is a scrollable UI.

FIG. 29 illustrates the stage where the consolidated trimming tool activates an editing operation after a user selects the editing operation from user-selectable editing operations UI item 2850. In this example, a ripple trim editing operation is selected by the user. As shown in FIG. 29, user-selectable editing operations UI item 2850 changes appearance to indicate the selection. In some embodiments, user-selectable editing operations UI item 2850 remains displayed for a short period to allow the user to change the selection, and then disappears from the user interface. In some other embodiments, user-selectable editing operations UI item 2850 remains displayed until the user begins performing the editing operation. In some embodiments, the consolidated trimming tool detects the cursor location, and automatically displays graphical symbol 2910 corresponding to the selected editing operation at an associated location that is near the cursor. In some other embodiments, graphical symbol 2910 is not displayed until the user invokes a mouse-down operation on a clip to begin the editing operation.

FIG. 30 illustrates the stage as the user begins performing the editing operation. User-selectable editing operations UI item 2850 is removed from the display as soon as the user invokes a mouse-down operation to begin the editing operation.

III. Displaying Media Limit Indicators

Figure 31:
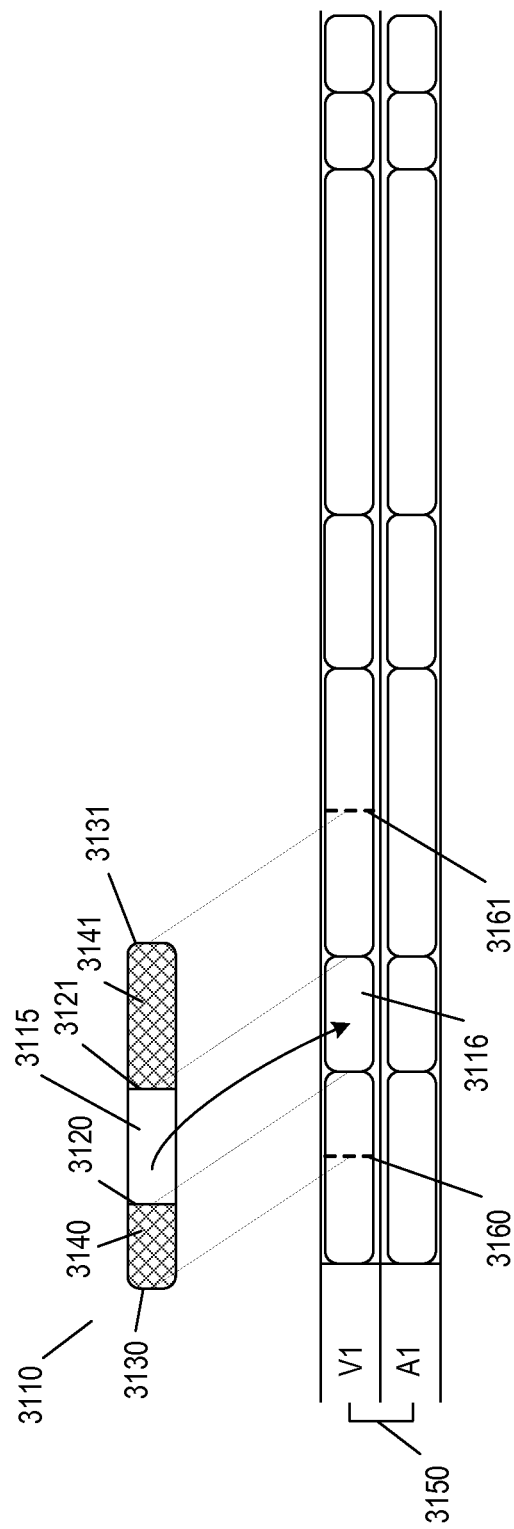
FIG. 31 illustrates a more detailed example of the relationship between source media, clips, clip shapes, and the portions of source media that are not included in generating a clip to include along a track, as implemented in some embodiments of the invention.

In some embodiments of the invention, a trimming tool provides a set of indicator lines for guiding the user with respect to source media boundaries when editing operations are performed. FIG. 31 illustrates a more detailed example of the relationship between source media, clips, clip shapes, and the portions of source media that are not included in generating a clip to include along a track.

FIG. 31 includes a conceptual illustration of source media 3110, clip 3115 that is generated from source media 3110, in point 3120 and out point 3121 that define the content of clip 3115, and media limit boundaries 3130-2431 of source media 3110. Handles 3140-3141, illustrated as shaded areas in the conceptual illustration of source media 3110, represent the portions of source media 3110 that are not included in clip 3115.

FIG. 31 also includes tracks 3150 from a composite display area, and clip shape 3116 that corresponds to clip 3115. Tracks 3150 also include media limit indicator lines 3160-3161 for source media 3110 that correspond to media limit boundaries 3130-2431. For some embodiments of the invention, one or both of media limit indicator lines 3160-3161 for source media 3110 are displayed when an editing operation is performed to indicate the user media limit boundaries.

Figure 32:
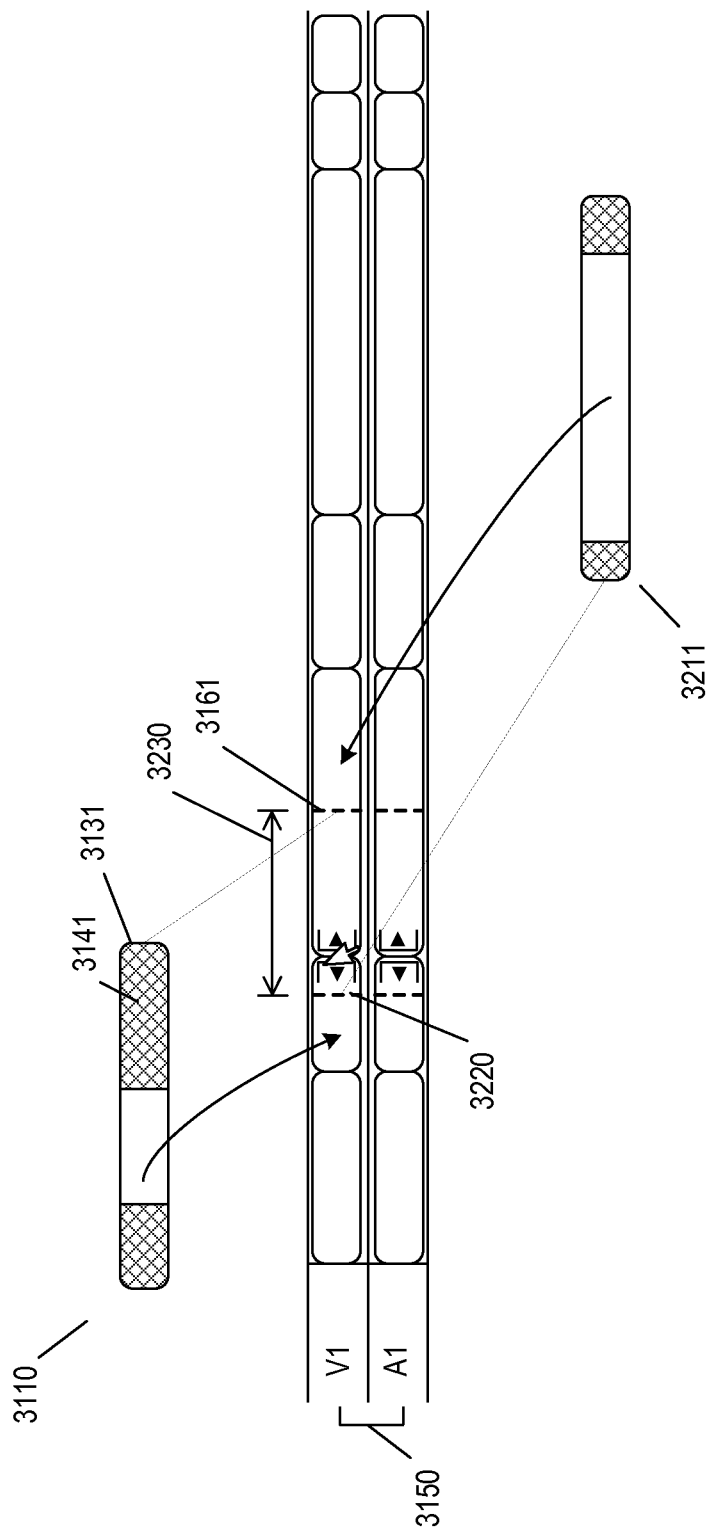
FIGS. 32-34 illustrate three examples of displaying media limit indicators when performing one of three editing operations as implemented in some embodiments of the invention.
Figure 33:
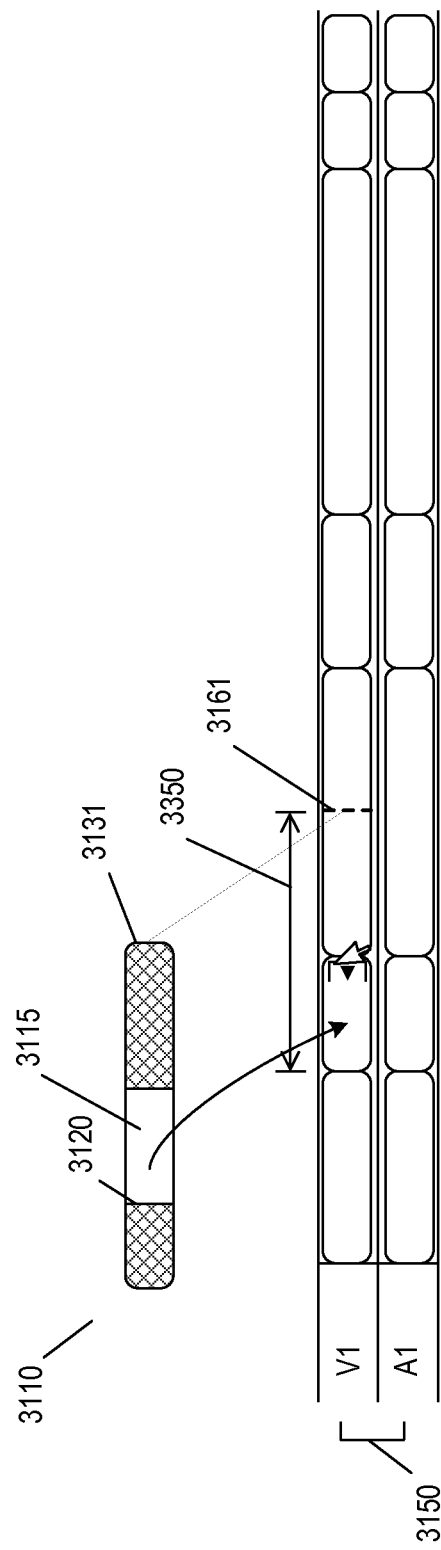
Figure 34:
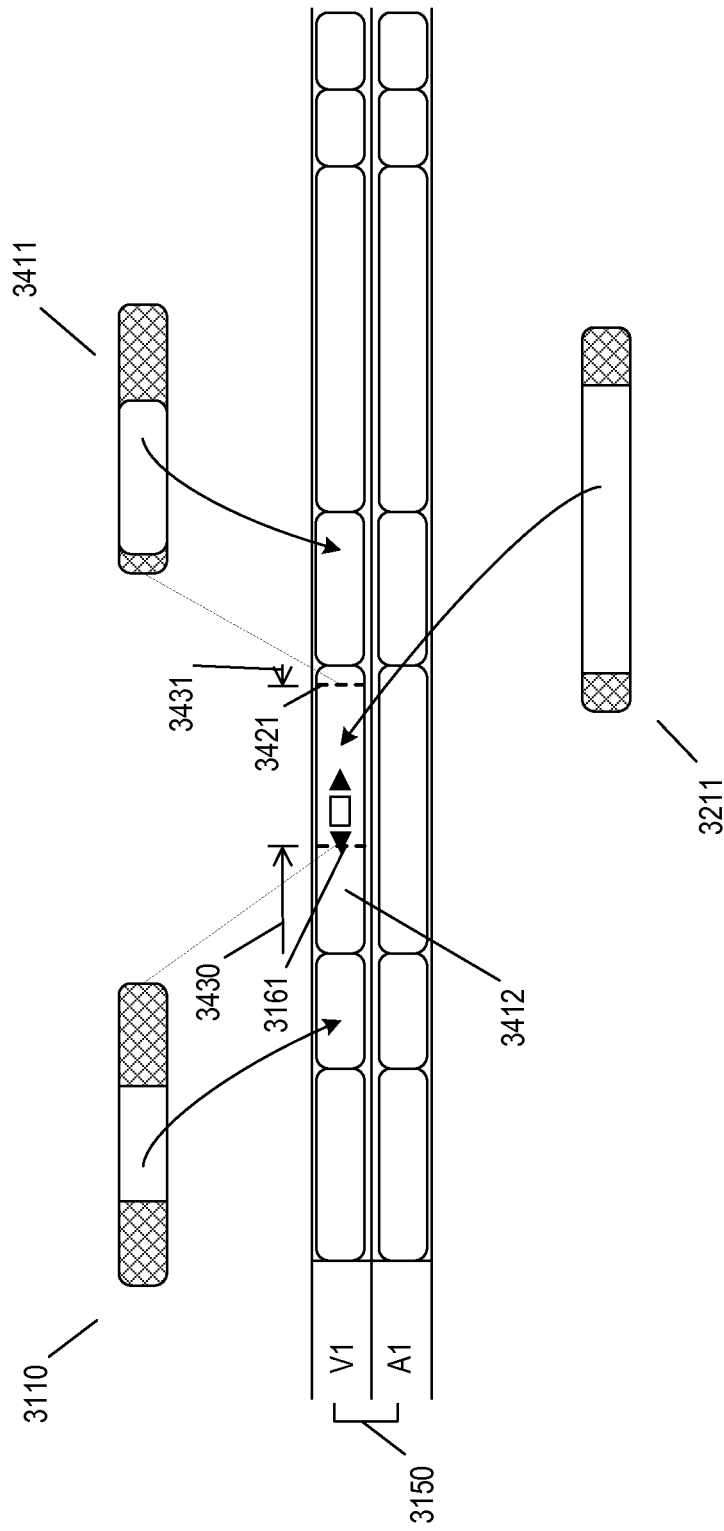

FIGS. 32-34 illustrate three examples of displaying media limit indicators when performing one of three editing operations. In some embodiments, the editing operation is selected using one of the techniques described in this application. In some other embodiments, the editing operation is selected by another editing operation selection technique without deviating from the spirit of the invention.

FIG. 32 illustrates displaying media limit indicators when a roll trim editing operation is performed. In this example with the clip shapes and source media as shown, the roll trim editing operation is limited by the end boundary of media source 3110 and the beginning boundary of media source 3211. Accordingly, left media limit indicator line 3220 that corresponds to the end of media source 3211, and right media limit indicator line 3161 that corresponds to the beginning of media source 3110 are displayed as the roll trim editing operation is performed. In some other clip arrangements, the range of a roll trim editing operation may be limited by a feature other than a media limit boundary. For example, if a media source has a handle that is longer than the adjacent clip, then the roll trim is limited by the size of the adjacent clip. FIG. 32 also illustrates conceptual roll trim range 3230, which indicates the span within which the rolled edit point can be moved. While roll trim range 3230 is shown in FIG. 32 for illustrative purposes and is not part of any GUI, it is understood that roll trim range 3230 can be implemented as a GUI element.

FIG. 33 illustrates displaying media limit indicators when a ripple trim editing operation is performed. In this example, the ripple trim editing operation is limited by in point 3120 of clip 3115 that is being rippled, and by the end boundary 3131 of media source 3110. Accordingly, one media limit indicator line 3161 corresponding to the end boundary 3131 is displayed in the track as the ripple trim editing operation is being performed. FIG. 33 also shows conceptual roll trim range 3350, which indicates the span within which the rolled edit point can be moved.

FIG. 34 illustrates displaying media limit indicators when a slide trim editing operation is performed. In this example with the clip shapes and source media as shown, the slide trim editing operation is limited by the end boundary of media source 3110 and the beginning of media source 3411. Accordingly, left media limit indicator line 3161 that corresponds to the end of media source 3110, and right media limit indicator line 3421 that corresponds to the beginning of media source 3411, are displayed as the slide trim editing operation is performed. FIG. 34 also illustrates conceptual side trim range 3430-2731 which indicates the spans that clip shape 3412 can be slid.

IV. Cross-Track Ripple Trim Indicators

Some embodiments of the invention provide a trimming tool that provides (1) cross-track ripple trim indicators when a ripple trim editing operation is performed, and (2) a track de-selection feature to allow a user to exclude certain tracks from the ripple trim editing operation. FIGS. 35-38 illustrate a detailed example of a GUI in which some embodiments of the invention are implemented, as well as several stages of a user's interaction with the GUI.

Figure 35:
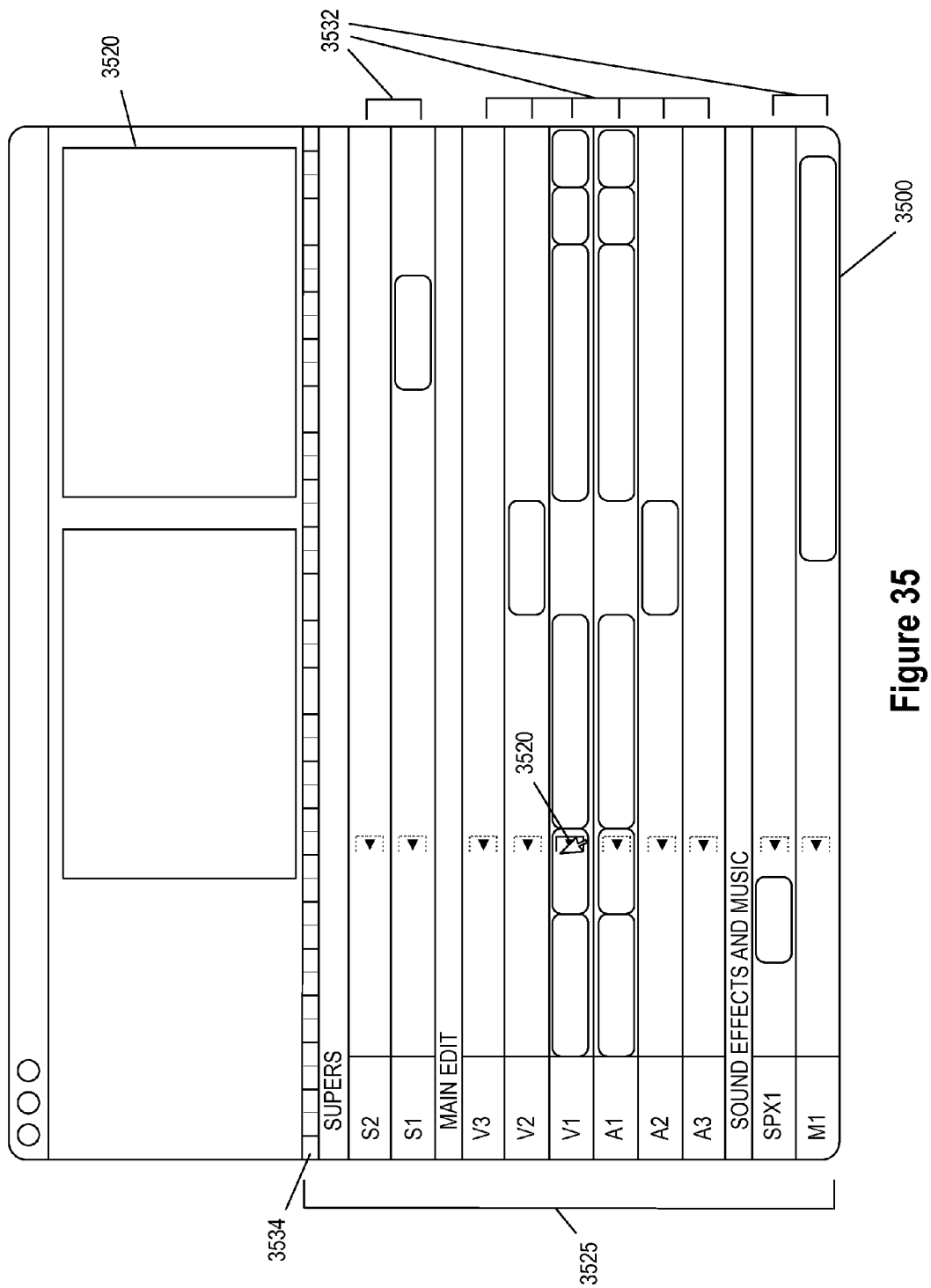
FIGS. 35-38 illustrate a detailed example of a GUI through which an editing tool provides cross-track ripple trim indicators when a ripple trim editing operation is performed, and a track de-selection feature to allow a user to exclude certain tracks from the ripple trim editing operation.

FIG. 35 illustrates a detailed example of a GUI 3500 through which a trimming tool provides (1) cross-track ripple trim indicators when a ripple trim editing operation is performed, and (2) a track de-selection feature to allow a user to exclude certain tracks from the ripple trim editing operation. Like GUI 2800, GUI 3500 of FIG. 35 includes a preview display area 3520, and a composite display area 3525 with multiple tracks 3532 that span a timeline 3534. FIG. 35 additionally illustrates graphical symbol 3540 corresponding to the ripple trim editing operation at an edit location where the user has selected to perform the edit.

FIG. 35 illustrates the stage after the user has activated the ripple trim editing operation, and has invoked a mouse-down operation to begin the editing operation. For these embodiments of the invention, performing a ripple trim editing operation for a particular clip causes all the clip shapes along the other tracks, as well as the gaps between the clip shapes, to shift in synchronicity with the rippled clip. In other words, if the rippled clip extends an end point by ten seconds, all other clips on all other tracks at or following the rippled clip also are shifted later in the timeline by ten seconds. Accordingly, for these embodiments, the default behavior of a ripple trim editing operation is that the synchronization of all the clips along all the tracks is maintained.

Figure 36:
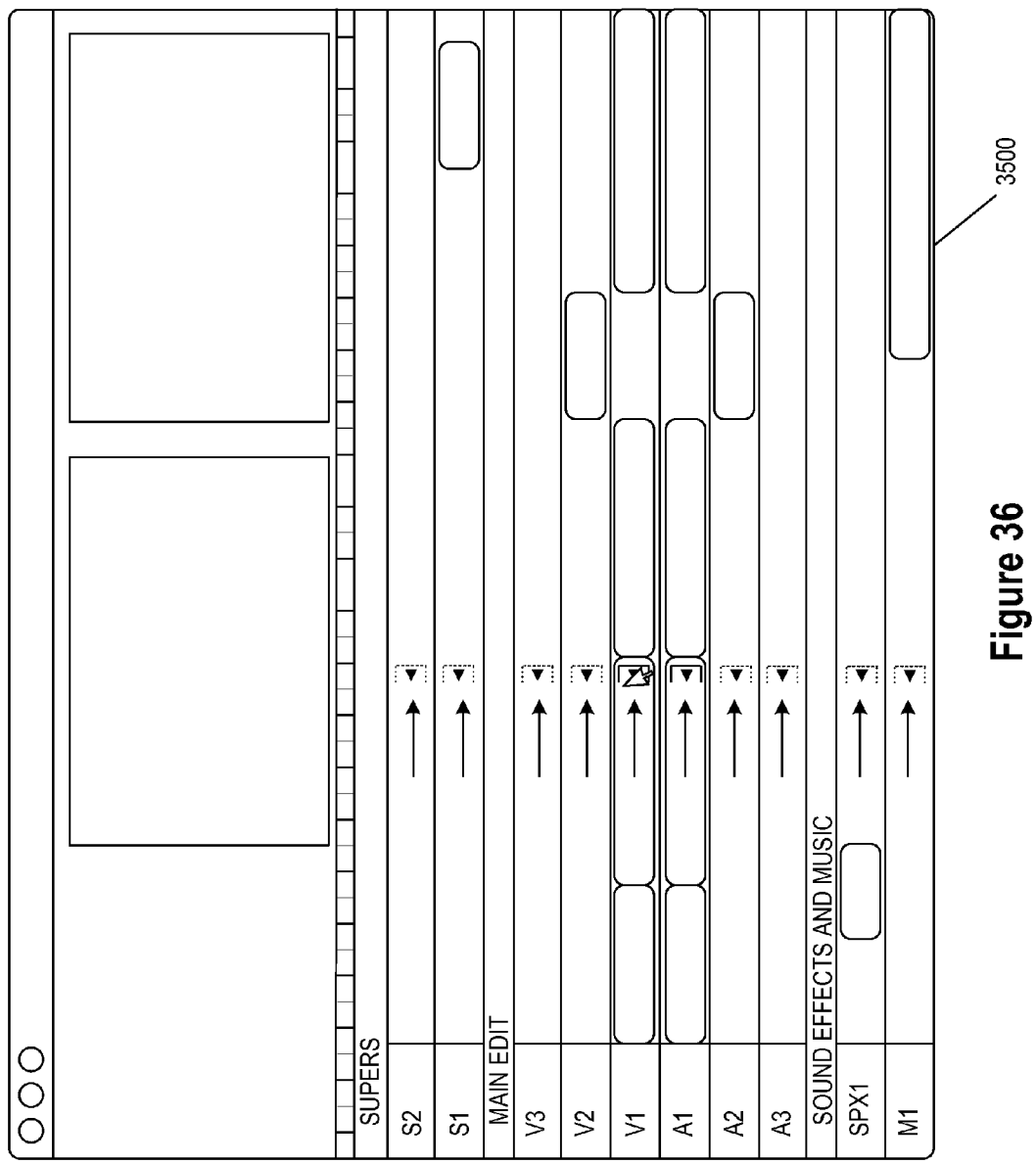

For some embodiments, the trimming tool displays a set of ghosted graphical symbols at each of the other tracks directly above and below graphical symbol 3540. The set of ghosted graphical symbols stay directly above and below graphical symbol 3540 as the editing operation is performed. Displaying such ghosted graphical symbols provides the user with feedback that the editing operation causes all the clip shapes along the other tracks, as well as the gaps between the clip shapes, to shift in synchronicity with the rippled clip, as shown in FIG. 36.

Figure 37:
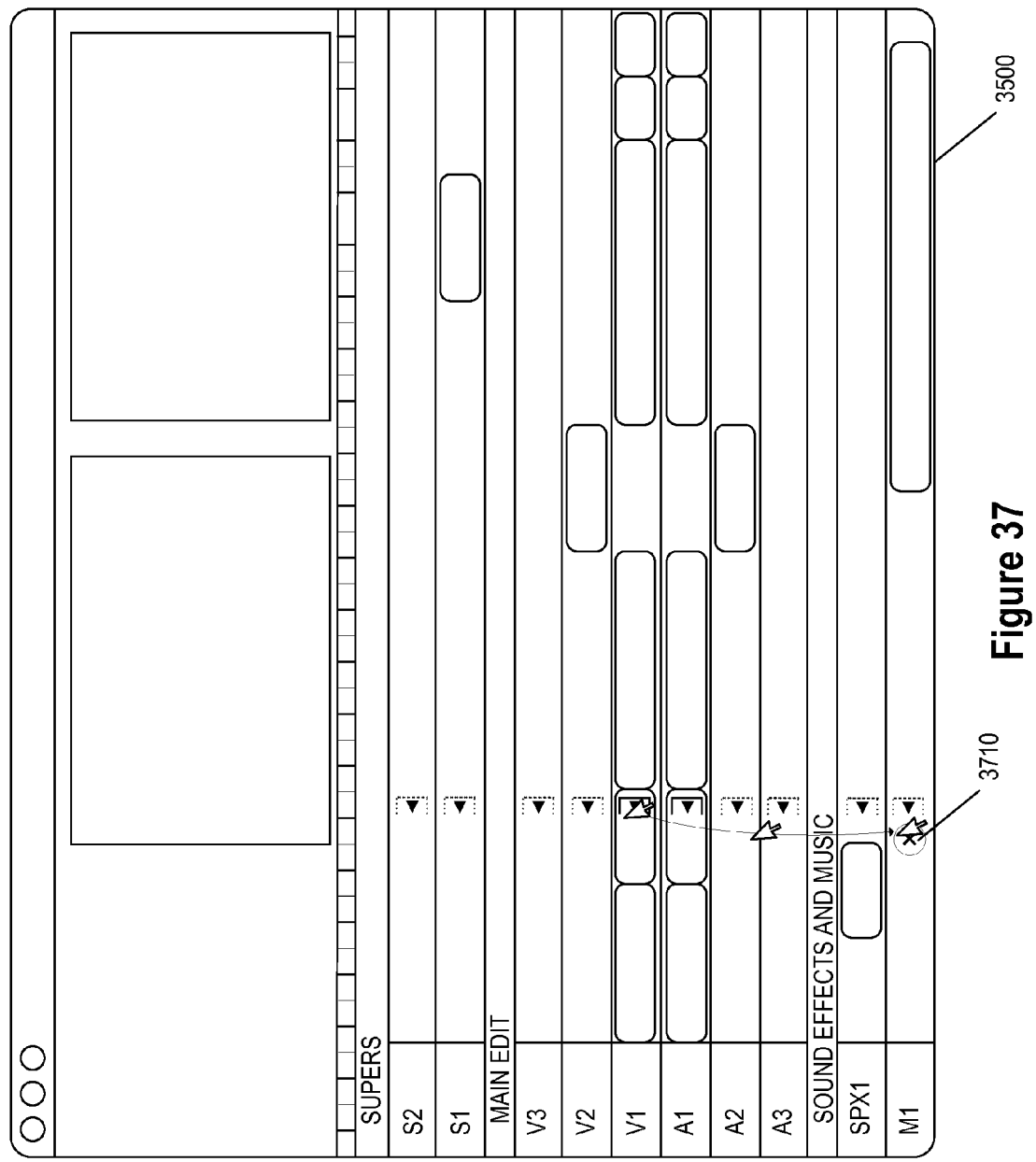

FIG. 37 illustrates the stage after a ripple trim editing operation is selected when the user de-selects a particular track in order to prevent the clips in that particular track from being shifted in synchronicity with the rippled clip. In some embodiments of the invention, the set of ghosted graphical symbols are presented when the user invokes a mouse-click operation. The set of ghosted graphical symbols are displayed until the ripple trim editing operation is performed and completed. For some embodiments, the ripple trim editing operation considered to be completed when a user moves a boundary and invokes a mouse-release operation.

Figure 38:
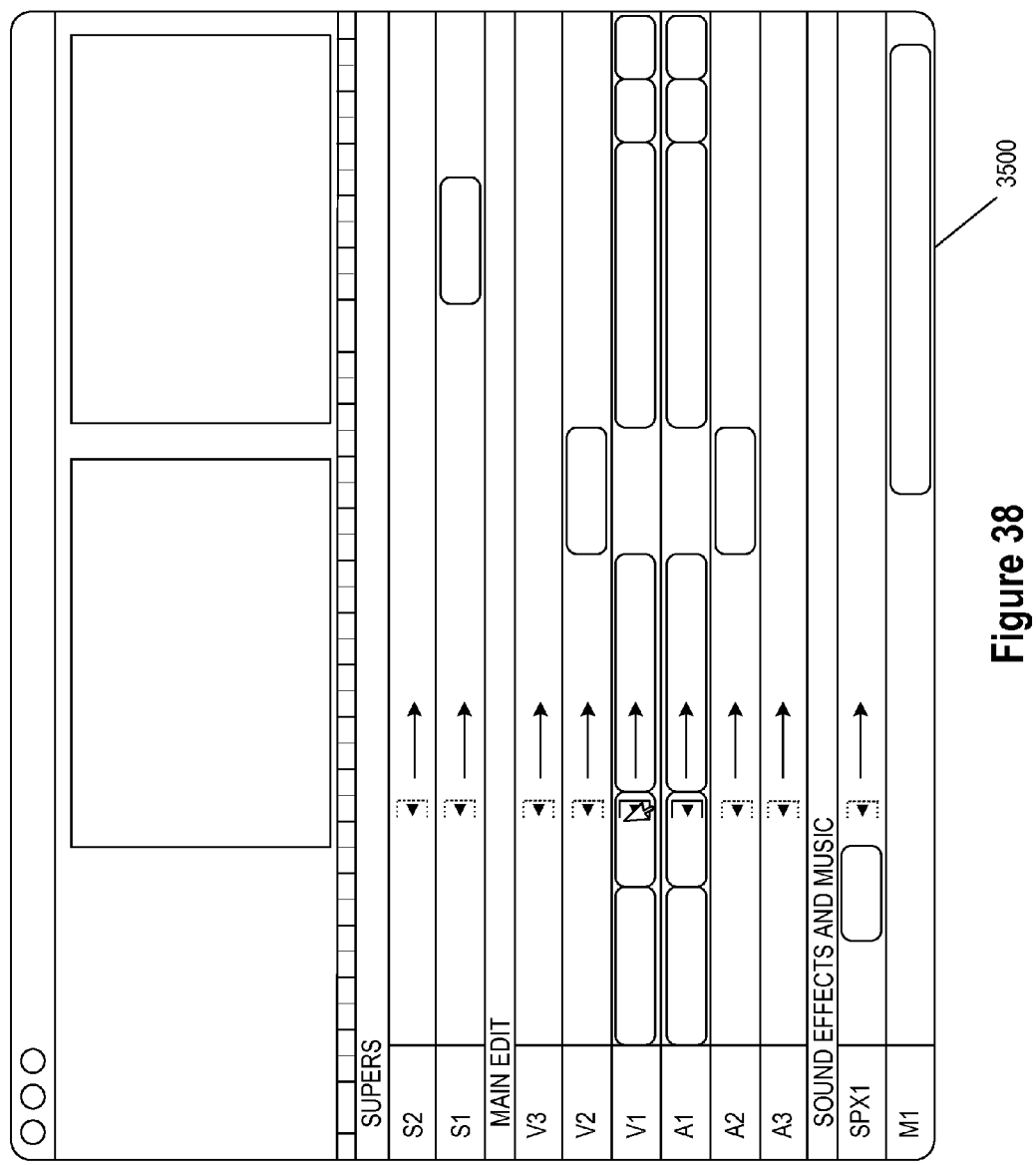

As shown in FIG. 37, while the set of ghosted graphical symbols are displayed, a user may move the cursor to any of the ghosted symbols. When the trimming tool detects the location of the mouse on any of the ghosted symbol, the trimming tool presents to the user a de-selection UI item 3710. When the trimming tool receives a click event on de-selection UI item 3710, ghosted graphical symbol for the track is removed from the track, and the track will not be included in the ripple trim editing operation, as shown in FIG. 38.

V. Software Architecture

Figure 39:
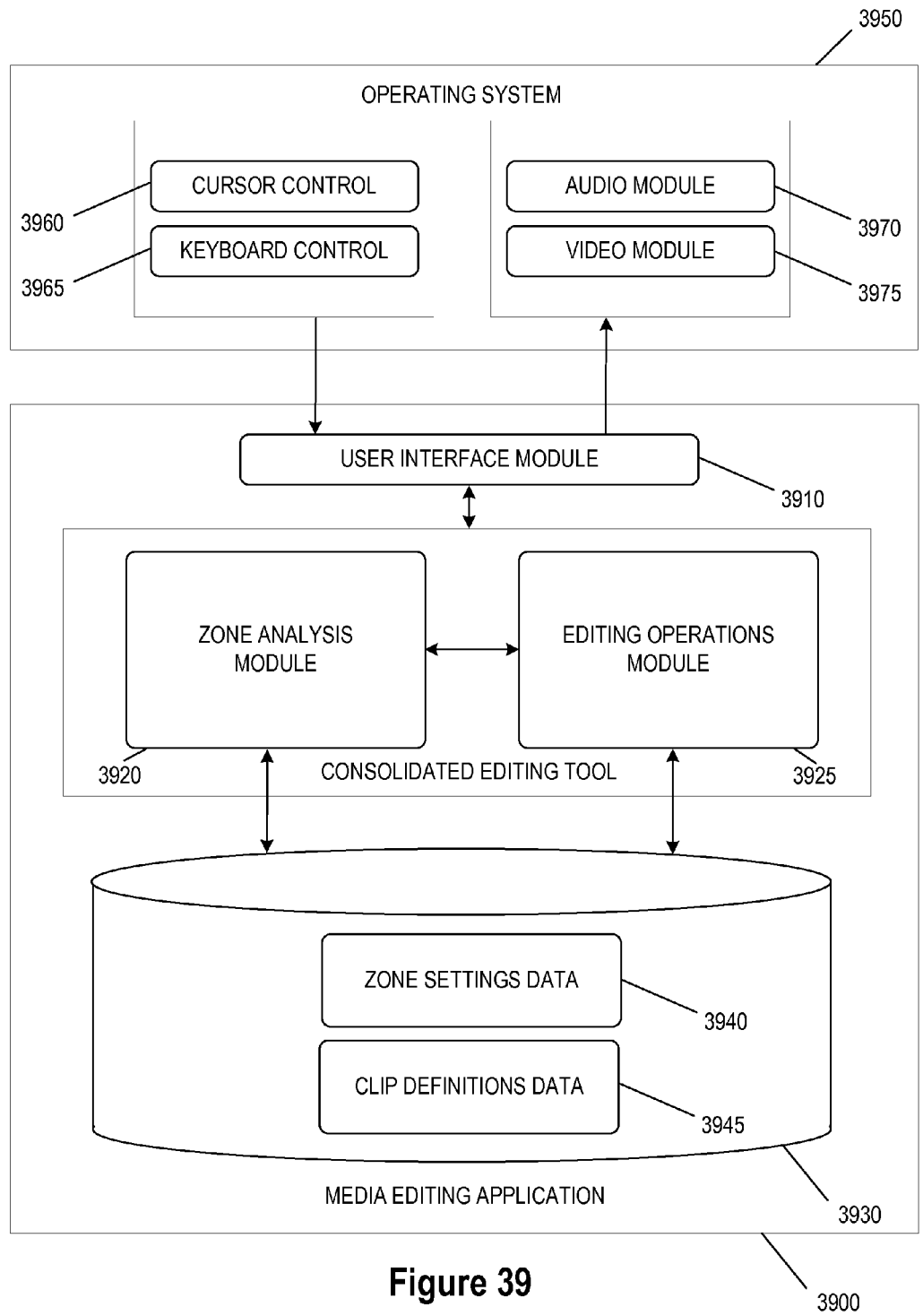
FIG. 39 conceptually illustrates the software architecture of a media editing application as implemented in some embodiments of the invention.

In some embodiments, the processes described above are implemented as software running on a particular machine, such as a computer or a handheld device, or stored in a computer readable medium. FIG. 39 conceptually illustrates the software architecture of an application 3900 of some embodiments for presenting media editing operations such as those described in the preceding sections. In some embodiments, the application is a stand-alone application or is integrated into another application (for instance, application 3500 might be a portion of a video-editing application), while in other embodiments the application might be implemented within an operating system. Furthermore, in some embodiments, the application is provided as part of a server-based (e.g., web-based) solution. In some such embodiments, the application is provided via a thin client. That is, the application runs on a server while a user interacts with the application via a separate client machine remote from the server (e.g., via a browser on the client machine). In other such embodiments, the application is provided via a thick client. That is, the application is distributed from the server to the client machine and runs on the client machine.

As shown in FIG. 39, the media editing application 3900 includes a user interface module 3910 for sending data to and receiving data from a user, a zone analysis module 3920 for determining a corresponding zone for a cursor location and for determining an associated editing operation for a zone, an editing operations module 3925 for presenting an associated editing operation for selection and activation, for activating the editing operation, and for performing the editing operation, and storage 3930 for storing data used by the application 3900. Storage 3930 stores zone settings data 3940, clip definitions data 3945, as well as other data used by media editing application 3900.

Zone settings data 3940 include data that establishes the zones used by zone analysis module 3920 for analyzing a cursor location. In some embodiments, zone settings data 3940 is a location rule set that is specified by the media editing application's author. In other embodiments, the location rule set is specified by the media application's user. In still other embodiments, this rule set is initially specified by the media editing application's author, but later can be modified by the media application's user.

In some embodiments, zone settings data 3940 include zone width data (e.g., in pixels), zone location data (e.g., a zone begins at two pixels from the edge of a clip shape), zone association data (e.g., a zone is associated with the ripple trim editing operation), and zone priority data (e.g., a zone is the default zone when a clip shape is smaller than a threshold size). Clip definitions data 3945 include data that defines the content of a clip shape, including the starting point and ending point of a media source that defines the clip represented by the clip shape.

FIG. 39 also illustrates several components of operating system 3950 that provide input to, and receives output from, media editing application 3900 via user interface module 3910. Such components include cursor control 3960 that allows the application 3900 to receive data from a cursor control device, keyboard control 3965 that allows the application 3900 to receive data from a keyboard, audio module 3970 for processing audio that that will be supplied to an audio output device (e.g. speakers), and video module 3975 for processing video data that will be supplied to a display device (e.g., a monitor).

A user interacts with items in the user interface of the media editing application 3900 via input devices (not shown) such as a pointing device (e.g., a mouse, touchpad, trackpad, etc.) and keyboard. The input from these devices is processed by the cursor control 3960 and keyboard control 3965, and passed to the user interface interaction module 3910.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The user interface module 3910 translates the data from the controls 3960 and 3965 into the user's desired effect on the media editing application 3900. Zone analysis module 3920 and editing operations module 3925 use such input to carry out the operations as described with reference to FIG. 19 above. For example, when a user moves a cursor near or onto a clip shape, uses a pointing device to select an editing operation to perform, or directs media editing application to perform the editing operation, user interface module 3910 receives such input from the user, and translates the input into commands that can be processed by zone analysis module 3920 or editing operations module 3925.

The following describes the interaction between the modules according to one example of some embodiments of the invention. Zone analysis module 3920 receives data indicating the location of a user-controlled cursor. Zone analysis module 3920 uses such data, in conjunction with zone settings data 3940 and clip definitions data 3945, to determining the corresponding zone for the cursor location. Zone analysis module 3920 also uses zone settings data 3940 to determine the associated editing operation for the corresponding zone.

Editing operations module 3925 receives data from zone analysis module 3920 indicating the associated editing operation that was determined based on the detected cursor location. Editing operations module 3925 receives input from user interface module 3910 indicating that the associated editing operation has been selected by the user, and activates the editing operation. Editing operations module 3925 performs the editing operation by receiving user input from user interface module 3910 that directs the editing operation. Editing operations module 3925 also adjusts clip definition data 3945 in performing the editing operation. The editing operations module 3925 may provide editing tools in addition to the consolidated trimming tool. Examples of such editing tools may include zoom, color enhancement, blemish removal, audio mixing, etc.

While many of the features have been described as being performed by one module (e.g., the user interface module 3910 or zone analysis module 3920), one of ordinary skill would recognize that a particular operation might be split up into multiple modules, and the performance of one feature might even require multiple modules in some embodiments.

One of ordinary skill in the art will recognize that the conceptual descriptions provided above in reference to FIG. 39 may be implemented using different embodiments without departing from the spirit of the invention. For instance, storage 3930 described above with reference to FIG. 39 may be implemented as various storage elements.

VI. Process for Defining a Media Editing Application

Figure 40:
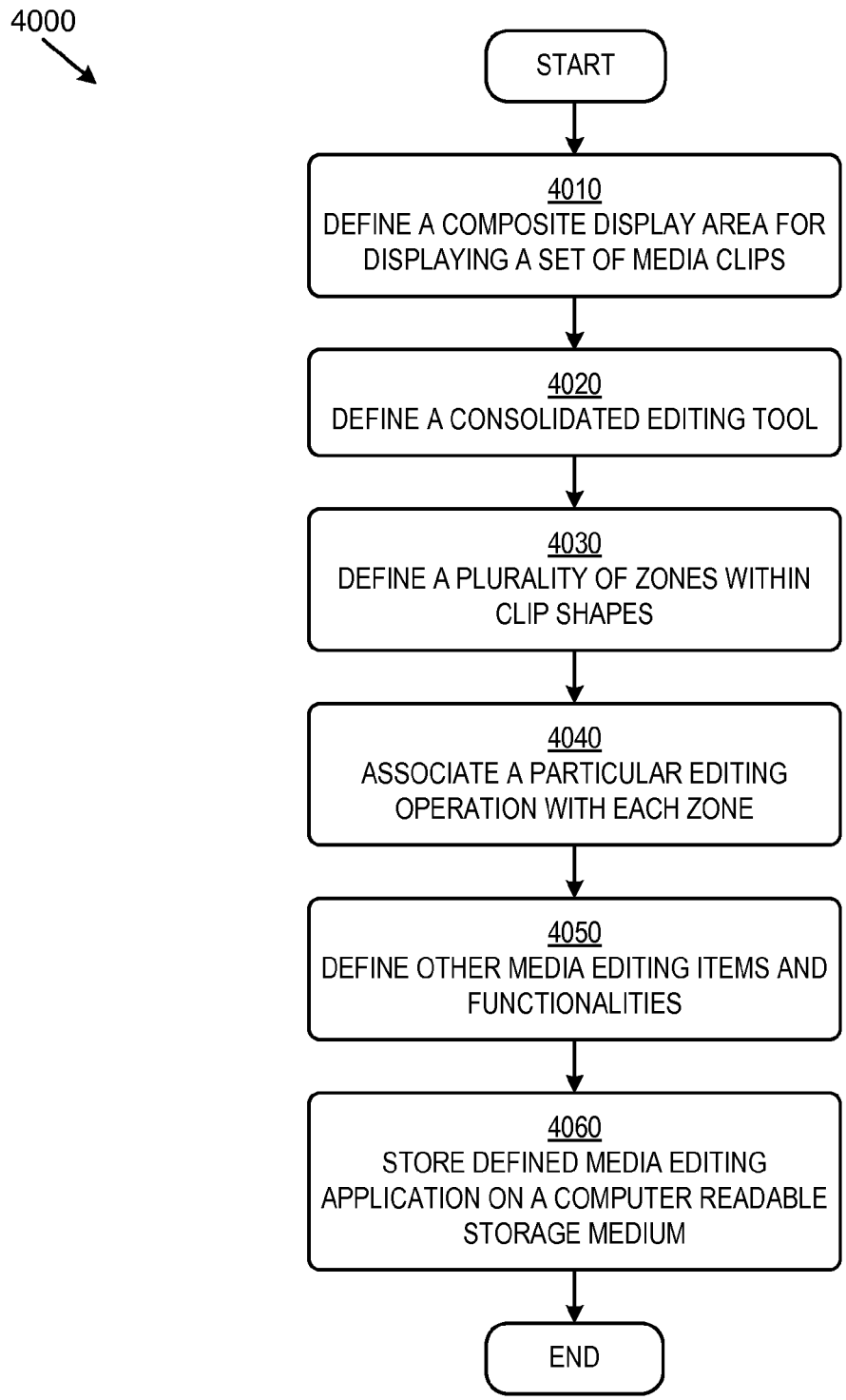
FIG. 40 conceptually illustrates a process of some embodiments for defining and storing a media-editing application of some embodiments.

FIG. 40 conceptually illustrates a process 4000 of some embodiments for defining and storing a media-editing application of some embodiments, such as application 3900. Specifically, process 4000 illustrates the operations used to define several of the elements shown in GUI 300. As shown, process 4000 begins by defining (at 4010) a composite display area for displaying graphical representations of a set of media clips. Composite display area 105 is one example of such a display area.

The process then defines (at 4020) a consolidated editing tool for (1) detecting a location of a cursor in the composite display area; determining a zone of a plurality of zones in which the cursor is located; (2) determining a particular editing operation that is associated with the zone; and (3) presenting the particular editing operation of a plurality of editing operations for selection and activation. This editing tool is also defined to include the process for performing the multi-track selection operation and the other processes described above. Next, the process defines (at 4030) a plurality of zones within clip shapes in which the cursor is located.

After defining (at 4030) a plurality of zones within clip shapes in which the cursor is located, the process associates (at 4040) a particular editing operation with each of the zones defined at 4030.

The process then defines (at 4050) other media editing items and functionalities. Examples of such editing tools may include zoom, color enhancement, blemish removal, audio mixing, etc. In addition, various other media editing functionalities may be defined. Such functionalities may include library functions, format conversion functions, etc. The process defines these additional tools in order to create a media editing application that has many additional features to the features described above.

Figure 41:
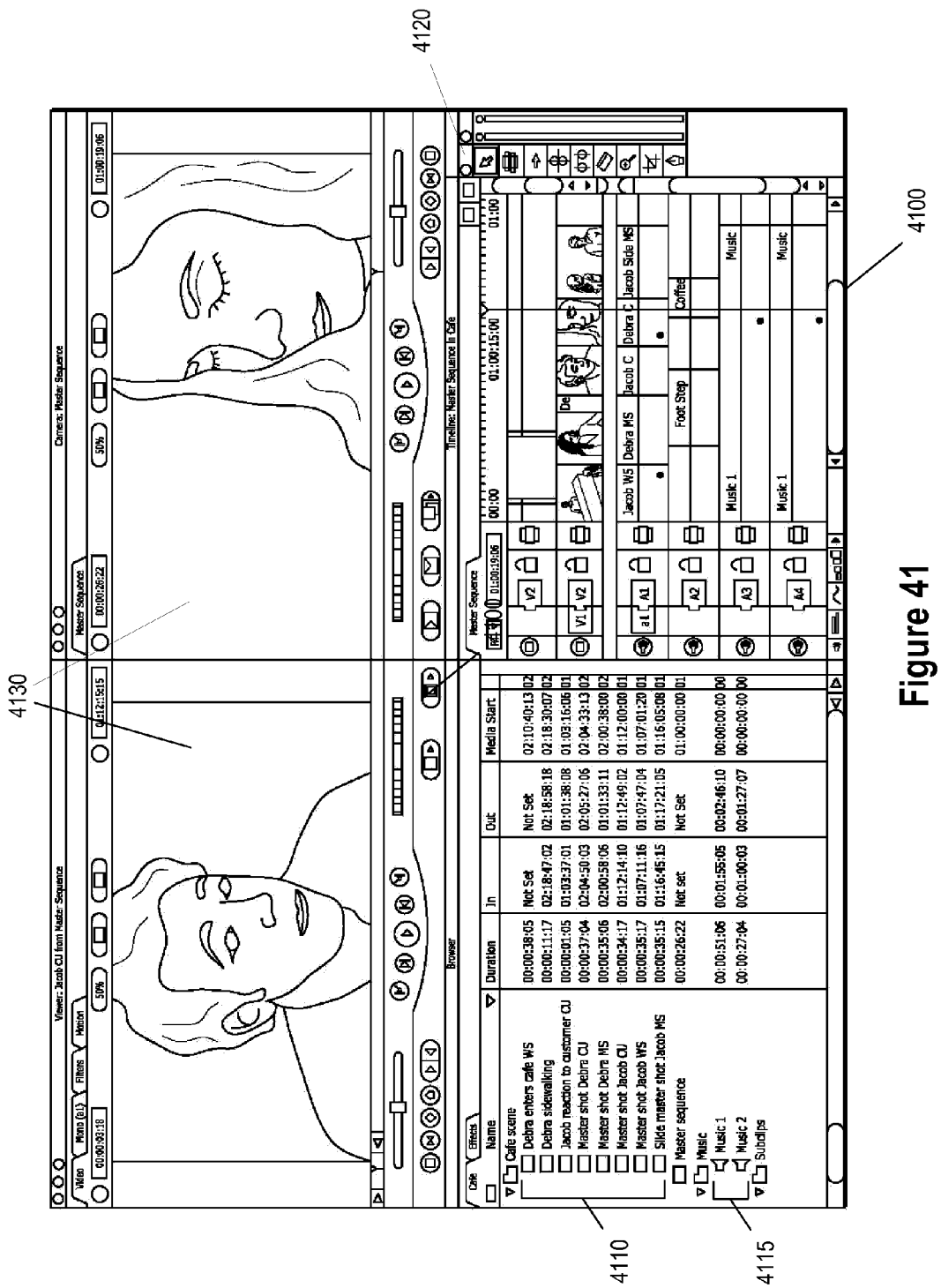
FIG. 41 illustrates a more detailed view of a media editing application with additional features of some embodiments.

A more detailed view of a media editing application with these additional features is illustrated in FIG. 41. Specifically, this figure shows a media editing application with these additional tools. FIG. 41 illustrates lists of video clips 4110 and audio clips 4115, video editing tools 4120, and video displays 4130. The lists of video clips 4110 and audio clips 4115 includes clips along with metadata (e.g., timecode information) about the clips. In some embodiments, the list of video clips is the list of video clips in a particular sequence of video clips, and the metadata specifies in and out points, durations, etc. for the video clips.

The video editing tools 4120 include tools that allow a user to graphically set in and out points for video clips (in other words, where in the final product a specific clip or part of a clip will be shown). For instance, the video editing tools 4120 include a number of timelines that can be used to modify the temporal sequence of the video frame and to synchronize audio tracks with video tracks (e.g., in order to add music over a video clip). In some embodiments, video editing tools 4120 also give users the ability to edit in effects or perform other video editing functions.

Video displays 4130 allow a user to watch multiple video clips at once, thereby enabling easier selection of in and out points for the video clips. The screen shot 4100 illustrates a few of many different editing tools that a video editing application of some embodiments may have to edit digital video.

In some cases, some or all of the video clips that are displayed in the lists of video clips 4110 and audio clips 4115, played in displays 4130, and edited by a user with video editing tools 3820, are video clips of real-world objects (e.g., people, landscapes, etc.) filmed by a camera and include real-world audio (e.g., conversations, real-world noises, etc.) recorded by a camera, microphone, etc. In some cases, some or all of the video clips are computer-generated animations or include computer generated animations (e.g., animated objects, computer-generated effects, etc.).

Process 4000 then stores (at 4060) the defined media editing application (i.e., the defined modules, UI items, etc.) on a computer readable storage medium. The computer readable storage medium may be a disk (e.g., CD, DVD, hard disk, etc.) or a solid-state storage device (e.g., flash memory) in some embodiments. One of ordinary skill in the art will recognize that the various elements defined by process 4000 are not exhaustive of the modules, rules, processes, and UI items that could be defined and stored on a computer readable storage medium for a media editing application incorporating some embodiments of the invention. In addition, the process 4000 is a conceptual process, and the actual implementations may vary. For example, different embodiments may define the various elements in a different order, may define several elements in one operation, may decompose the definition of a single element into multiple operations, etc. In addition, the process 4000 may be implemented as several sub-processes or combined with other operations within a macro-process.

VII. Computer System

Many of the above-described processes and modules are implemented as software processes that are specified as a set of instructions recorded on a computer readable storage medium (also referred to as "computer readable medium" or "machine readable medium"). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc.

In this specification, the term "software" is meant in its broadest sense. It can include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

FIG. 42 illustrates a computer system 4200 with which some embodiments of the invention are implemented. For example, the system described above in reference to FIG. 22 may be at least partially implemented using sets of instructions that are run on the computer system 4200. As another example, the processes described in reference to FIGS. 19, 22, and 26-27 may be at least partially implemented using sets of instructions that are run on the computer system 4200.

Such a computer system includes various types of computer readable mediums and interfaces for various other types of computer readable mediums. Computer system 4200 includes a bus 4210, a processor 4220, a system memory 4230, a read-only memory (ROM) 4240, a permanent storage device 4250, a graphics processing unit ("GPU") 4260, input devices 4270, output devices 4280, and a network connection 4290. The components of the computer system 4200 are electronic devices that automatically perform operations based on digital and/or analog input signals. The various examples of user interfaces shown in FIGS. 3, 6, 7, 28 and 35 may be at least partially implemented using sets of instructions that are run on the computer system 4200 and displayed using the output devices 4280.

One of ordinary skill in the art will recognize that the computer system 4200 may be embodied in other specific forms without deviating from the spirit of the invention. For instance, the computer system may be implemented using various specific devices either alone or in combination. For example, a local PC may include the input devices 4270 and output devices 4280, while a remote PC may include the other devices 4210-4260, with the local PC connected to the remote PC through a network that the local PC accesses through its network connection 4290 (where the remote PC is also connected to the network through a network connection).

The bus 4210 collectively represents all system, peripheral, and chipset buses that communicatively connect the numerous internal devices of the computer system 4200. For instance, the bus 4210 communicatively connects the processor 4220 with the system memory 4230, the ROM 4240, and the permanent storage device 4250. From these various memory units, the processor 4220 retrieves instructions to execute and data to process in order to execute the processes of the invention. In some cases, the bus 4210 may include wireless and/or optical communication pathways in addition to or in place of wired connections. For example, the input devices 4270 and/or output devices 4280 may be coupled to the system 4200 using a wireless local area network (W-LAN) connection, Bluetooth®, or some other wireless connection protocol or system.

The ROM 4240 stores static data and instructions that are needed by the processor 4220 and other modules of the computer system. The permanent storage device 4250, on the other hand, is a read-and-write memory device. This device is a non-volatile memory unit that stores instructions and data even when the computer system 4200 is off. Some embodiments of the invention use a mass-storage device (such as a magnetic or optical disk and its corresponding disk drive) as the permanent storage device 4250.

Other embodiments use a removable storage device (such as a floppy disk, flash drive, or CD-ROM) as the permanent storage device. Like the permanent storage device 4250, the system memory 4230 is a read-and-write memory device. However, unlike storage device 4250, the system memory 4230 is a volatile read-and-write memory, such as a random access memory (RAM). The system memory stores some of the instructions and data that the processor needs at runtime. In some embodiments, the sets of instructions used to implement the invention's processes are stored in the system memory 4230, the permanent storage device 4250, and/or the read-only memory 4240.

In addition, the bus 4210 connects to the GPU 4260. The GPU of some embodiments performs various graphics processing functions. These functions may include display functions, rendering, compositing, and/or other functions related to the processing or display of graphical data.

The bus 4210 also connects to the input devices 4270 and output devices 4280. The input devices 4270 enable the user to communicate information and select commands to the computer system. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 4280 include printers, electronic display devices that display still or moving images, and electronic audio devices that play audio generated by the computer system. For instance, these display devices may display a GUI. The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computer system.

Finally, as shown in FIG. 42, bus 4210 also couples computer 4200 to a network 4290 through a network adapter (not shown). In this manner, the computer can be a part of a network of computers (such as a local area network ("LAN"), a wide area network ("WAN"), an Intranet, or a network of networks, such as the Internet. For example, the computer 4200 may be coupled to a web server (network 4290) so that a web browser executing on the computer 4200 can interact with the web server as a user interacts with a GUI that operates in the web browser.

As mentioned above, the computer system 4200 may include one or more of a variety of different computer-readable media (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, ultra density optical discs, any other optical or magnetic media, and floppy disks. The computer-readable media may store a computer program that is executable by at least one processor and includes sets of instructions for performing various operations.

For the purposes of this Specification, a computer is a machine and the terms display or displaying mean displaying on an electronic device. It should be recognized by one of ordinary skill in the art that any or all of the components of computer system 4200 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. For example, several embodiments were described above by reference to particular media editing applications with particular features and components (e.g., particular composite display areas). However, one of ordinary skill will realize that other embodiments might be implemented with other types of media editing applications with other types of features and components (e.g., other types of composite display areas).

Moreover, while the examples shown illustrate many individual modules as separate blocks (e.g., the preview generator 3340, the rendering engine 3350, etc.), one of ordinary skill in the art would recognize that some embodiments may combine these modules into a single functional block or element. One of ordinary skill in the art would also recognize that some embodiments may divide a particular module into multiple modules. In addition, although the examples given above may discuss accessing the system using a particular device (e.g., a PC), one of ordinary skill will recognize that a user could access the system using alternative devices (e.g., a cellular phone, PDA, smartphone, BlackBerry®, or other device).

One of ordinary skill in the art will realize that, while the invention has been described with reference to numerous specific details, the invention can be embodied in other specific forms without departing from the spirit of the invention. For instance, alternate embodiments may be implemented by using a generic processor to implement the video processing functions instead of using a GPU. One of ordinary skill in the art would understand that the invention is not to be limited by the foregoing illustrative details, but rather is to be defined by the appended claims.

What is claimed is:

1. A method of defining a media editing application for creating composite presentations, the method comprising:
   providing a composite display area comprising a plurality of tracks to display a plurality of clip shapes representing media clips in the composite presentation; and
   providing a consolidated editing tool for:
      identifying edit locations of different zones of different clip shapes on multiple different tracks that are at or near a location indicator as the location indicator moves from track to track in the composite display area;
      displaying, for each of the identified edit locations, a graphical indication of an editing operation to perform on the different clip shapes; and
      collectively selecting the identified edit locations of the different clip shapes along the different tracks in order to collectively perform the editing operation on the different clip shapes at the identified edit locations.

2. The method of claim 1, wherein identifying edit locations of different zones of the different clip shapes comprises:
   detecting, in the composite display area, the location of the location indicator with respect to a particular clip shape; and
   associating the detected location with an edit location of the particular clip shape.

3. The method of claim 1, wherein identifying edit locations of different zones of the different clip shapes comprises:
   detecting that the location indicator has traversed back to a first track with a first clip shape after having previously traversed near the first clip shape on the first track to a second clip shape on a second track and after edit locations for the first and second clip shapes have been selected; and
   removing the selected edit location for the second clip shape after said detecting.

4. The method of claim 3, wherein identifying edit locations of different zones of the different clip shapes further comprises:
   removing the edit location that was selected for the first clip shape in the previous traversal of the location indicator near the first clip shape.

5. The method of claim 4, wherein identifying edit locations of different zones of the different clip shapes further comprises identifying a new edit location for the first clip shape.

6. The method of claim 4, wherein identifying edit locations of different zones of the different clip shapes further comprises identifying an edit location for a third clip shape on the first track, said edit location for the third clip shape near the location of the location indicator when the location indicator traverses back to the first track from the second track.

7. A non-transitory computer readable medium storing a media editing application that when executed by at least one processing unit creates media presentations, the media editing application comprising sets of instructions for:
   displaying, in a composite display area, at least first and second clip shapes that represent first and second media clips in the media presentation, wherein each clip shape spans at least a portion of the composite display area in a horizontal direction, and the first clip shape is displayed above or below the second clip shape so that at least parts of the first and second clip shapes span a same portion of the composite display area;
   identifying edit locations of different zones of the first and second clip shapes that are at or near a location indicator as the location indicator moves substantially in a vertical direction in the composite display area;
   displaying, for each of the identified edit locations, a graphical indication of an editing operation to perform on the first and second clip shapes; and
   collectively selecting the identified edit locations of the first and second clip shapes in order to collectively perform the editing operation on the first and second clip shapes at the identified edit locations.

8. The non-transitory computer readable medium of claim 7, wherein the set of instructions for identifying edit locations of different zones of clip shapes comprises sets of instructions for:
   detecting, in the composite display area, the location of the location indicator with respect to a particular clip shape; and
   associating the detected location with an edit location of the particular clip shape.

9. The non-transitory computer readable medium of claim 7, wherein the composite display area comprises a plurality of tracks, wherein the first clip shape is display on a first track and the second clip shape is displayed on a second track, wherein the set of instructions for identifying edit locations comprises sets of instructions for:

detecting that the location indicator has traversed back to the first track with the first clip shape after having previously traversed near the first clip shape on the first track to the second clip shape on the second track and after edit locations for the first and second clip shapes have been selected; and removing the selected edit location for the second clip shape after said detecting.

10. The non-transitory computer readable medium of claim 9, wherein the set of instructions for identifying edit locations further comprises a set of instructions for removing the edit location that was selected for the first clip shape in the previous traversal of the location indicator near the first clip shape.

11. The non-transitory computer readable medium of claim 10, wherein the set of instructions for identifying edit locations of different zones of clip shapes further comprises a set of instructions for identifying a new edit location for the first clip shape.

12. The non-transitory computer readable medium of claim 10, wherein the set of instructions for identifying edit locations further comprises a set of instructions for identifying an edit location for a third clip shape on the first track, said edit location for the third clip shape near the location of the location indicator when the location indicator traverses back to the first track from the second track.

13. The non-transitory computer readable medium of claim 7, wherein the media editing application further comprises a set of instructions for specifying the edit operation for each selected edit location.

14. The non-transitory computer readable medium of claim 7, wherein the media editing application further comprises a set of instructions for specifying the same edit operation for each selected edit location.

15. The non-transitory computer readable medium of claim 14, wherein the set of instructions for specifying the same edit operation for each selected edit location comprises sets of instructions for:

identifying a particular edit operation based on the location of the location indicator with respect to a first-selected clip shape; and assigning the particular edit operation to each subsequently selected edit location.

16. A non-transitory computer readable medium storing a media editing application that when executed by at least one processing unit provide a graphical user interface (GUI) for creating a composite presentation, the GUI comprising:

a composite display area comprising a plurality of tracks to display a plurality of clip shapes representing media clips in the composite presentation; and a consolidated editing tool for:

identifying edit locations at different zones of different clip shapes on multiple different tracks that are at or near a position identifier as the position identifier moves from track to track in the composite display area;

displaying, for each of the identified edit locations, a graphical indication of an editing operation to perform on the different clip shapes, and collectively selecting the identified edit locations of the different clip shapes along the different tracks in order to collectively perform the editing operation on the different clip shapes at the identified edit locations.

17. The non-transitory computer readable medium of claim 16, wherein the GUI further comprises a timeline representing a duration of the composite presentation, wherein the plurality of tracks spans the timeline in a horizontal direction and the position identifier moves substantially in a vertical direction across the plurality of track to identify the edit locations of the different clip shapes.

18. The non-transitory computer readable medium of claim 16, wherein each clip shape is defined by at least two boundaries, wherein identifying the edit locations comprises identifying the boundaries of the different clip shapes as the position identifier moves from track to track in the composite display area.

* * * * *